(12) United States Patent
Galstian et al.

(10) Patent No.: US 9,798,217 B2
(45) Date of Patent: Oct. 24, 2017

(54) ELECTRO-OPTICAL DEVICES USING DYNAMIC RECONFIGURATION OF EFFECTIVE ELECTRODE STRUCTURES

(71) Applicant: LensVector Inc., San Jose, CA (US)

(72) Inventors: Tigran Galstian, Quebec (CA); Vladimir Presniakov, Quebec (CA); Karen Asatryan, Quebec (CA); Amir Tork, Quebec (CA); Armen Zohrabyan, Quebec (CA); Aram Bagramyan, Quebec (CA)

(73) Assignee: LensVector Inc., San Jose, CA (US)

( * ) Notice: Subject to any disclaimer, the term of this patent is extended or adjusted under 35 U.S.C. 154(b) by 0 days.

(21) Appl. No.: 15/348,237

(22) Filed: Nov. 10, 2016

(65) Prior Publication Data

US 2017/0219909 A1    Aug. 3, 2017

Related U.S. Application Data

(60) Continuation of application No. 14/995,293, filed on Jan. 14, 2016, now Pat. No. 9,500,889, which is a division of application No. 14/670,763, filed on Mar. 27, 2015, now Pat. No. 9,244,297, which is a division of application No. 14/501,964, filed on Sep. 30, 2014, now Pat. No. 9,229,254, which is a division of application No. 13/683,253, filed on Nov. 21, 2012, now Pat. No. 8,860,901, which is a division of application No. 13/234,456, filed on Sep. 16, 2011,
(Continued)

(51) Int. Cl.
*G02F 1/133* (2006.01)
*G02F 1/29* (2006.01)

(52) U.S. Cl.
CPC ............ *G02F 1/29* (2013.01); *G02F 2203/24* (2013.01)

(58) Field of Classification Search
CPC ................................................... G02F 1/13306
See application file for complete search history.

(56) References Cited

U.S. PATENT DOCUMENTS

| 4,066,333 A | 1/1978 | Dargent et al. |
| 4,236,150 A | 11/1980 | Chern |

(Continued)

FOREIGN PATENT DOCUMENTS

| CA | 2298354 | 6/2007 |
| CA | 2470493 | 11/2012 |

(Continued)

OTHER PUBLICATIONS

A.F.Naumov, M.Yu Loktev, I.R.Guralnik and G.Vdovin, Liquid-Crystal Adaptive Lenses with Modal Control, Optics Letters, pp. 992-994, Jul. 1, 1998, vol. 23, No. 13, Optical Society of America.
(Continued)

*Primary Examiner* — Timothy L Rude
(74) *Attorney, Agent, or Firm* — J-Tek Law PLLC; Jeffrey D. Tekanic; Scott T. Wakeman

(57) ABSTRACT

Variable liquid crystal devices for controlling the propagation of light through a liquid crystal layer use a frequency dependent material to dynamically reconfigure effective electrode structures in the device. The drive signal source uses pulse-width modulation to set a frequency and an amplitude of the drive signal.

3 Claims, 46 Drawing Sheets

Related U.S. Application Data now Pat. No. 8,319,908, which is a division of application No. 13/019,992, filed on Feb. 2, 2011, now Pat. No. 8,028,473, which is a division of application No. 13/000,601, filed as application No. PCT/IB2009/052658 on Jun. 21, 2009, now Pat. No. 8,033,054.

(60) Provisional application No. 61/142,186, filed on Dec. 31, 2008, provisional application No. 61/080,404, filed on Jul. 14, 2008, provisional application No. 61/074,654, filed on Jun. 22, 2008, provisional application No. 61/074,653, filed on Jun. 22, 2008, provisional application No. 61/074,621, filed on Jun. 21, 2008, provisional application No. 61/074,618, filed on Jun. 21, 2008.

(56) References Cited

U.S. PATENT DOCUMENTS

| | | | |
|---|---|---|---|
| 4,279,474 | A | 7/1981 | Belgorod |
| 4,394,069 | A | 7/1983 | Kaye |
| 4,834,508 | A | 5/1989 | Fergason |
| 4,838,657 | A | 6/1989 | Miura et al. |
| 4,919,520 | A | 4/1990 | Okada et al. |
| 5,047,847 | A | 9/1991 | Toda et al. |
| 5,473,338 | A | 12/1995 | Prince et al. |
| 5,805,243 | A | 9/1998 | Hatano et al. |
| 6,011,930 | A | 1/2000 | Okubo et al. |
| 6,456,419 | B1 | 9/2002 | Winker et al. |
| 6,469,683 | B1 | 10/2002 | Suyama et al. |
| 6,652,075 | B2 | 11/2003 | Jacobson |
| 6,888,590 | B1 | 5/2005 | Nishioka et al. |
| 7,218,429 | B2 | 5/2007 | Batchko |
| 7,221,429 | B1 | 5/2007 | Cavanaugh et al. |
| RE39,874 | E | 10/2007 | Berge |
| 7,427,201 | B2 | 9/2008 | Meisner |
| 7,633,671 | B2 | 12/2009 | Maram et al. |
| 7,724,347 | B2 | 5/2010 | Tseng et al. |
| 7,738,344 | B2 | 6/2010 | Ooi et al. |
| 7,755,583 | B2 | 7/2010 | Meredith |
| 8,028,473 | B2 | 10/2011 | Galstian et al. |
| 9,036,102 | B2 | 5/2015 | Galstian et al. |
| 9,239,479 | B2 * | 1/2016 | Khodadad ............ G02F 1/13306 |
| 2002/0145701 | A1 | 10/2002 | Sun et al. |
| 2005/0018127 | A1 | 1/2005 | Galstian et al. |
| 2005/0073739 | A1 | 4/2005 | Meredith et al. |
| 2005/0099594 | A1 | 5/2005 | Blum et al. |
| 2006/0159610 | A1 | 7/2006 | Stenzel et al. |
| 2007/0211207 | A1 | 9/2007 | Lo et al. |
| 2007/0229754 | A1 | 10/2007 | Galstian et al. |
| 2007/0263293 | A1 | 11/2007 | Batchko et al. |
| 2015/0055037 | A1 * | 2/2015 | Galstian ................ C08J 3/28 349/36 |
| 2015/0198830 | A1 | 7/2015 | Galstian et al. |
| 2015/0309342 | A1 | 10/2015 | Galstian et al. |

FOREIGN PATENT DOCUMENTS

| | | |
|---|---|---|
| EP | 1783538 A1 | 5/2007 |
| JP | 2008203360 A | 9/2008 |
| WO | 2007098602 A1 | 9/2007 |
| WO | 2009146530 A1 | 12/2009 |

OTHER PUBLICATIONS

Gleb Vdovin, Mikhail Loktev, Alexander Naumov, on the possibility of intraocular adaptive optics, Optics Express, Apr. 7, 2003, pp. 810-817, vol. 11, No. 7.

International Preliminary Report on Patentability for corresponding PCT/IB2009/052658 application.

International Search Report for corresponding PCT/IB2009/052658.

Lara Scolari, Thomas Alkeskjold, Jesper Riishede, Anders Bjarklev, David Hermann, Anawati Anawati, Martin Nielsen, and Paolo Bassi, Continuously tunable devices based on electrical control of dual-frequency liquid crystal filled photonic bandgap fibers, Opt. Express 13, 2005, pp. 7483-7496.

M. Amberg, A. Oeder, S. Sinzinger, P. J. W. Hands, and G. D. Love. Tuneable Planar Integrated Optical Systems, Optics Express, 2007, pp. 10607-10614, vol. 15, Issue 17.

M.Ye, B.Wang and S.Sato, Realization of Liquid Crystal Lens of Large Aperture and Low Driving Voltages Using Thin Layer of Weakly Conductive Material, Optics Express, pp. 4302-4308, Mar. 17, 2008, vol. 16, No. 6, Optical Society of America.

Mao Ye, Bin Wang, Maki Yamaguchi and Susumu Sato, Reducing Driving Voltages for Liquid Crystal Lens Using Weakly Conductive Thin Film, Japanese Journal of Applied Physics, pp. 4597-4599, Jun. 13, 2008, vol. 47, No. 6, 2008.

Mao Ye, Bin Wang, Masaru Uchida, Satoshi Yanase, Shingo Takahashi, Maki Yamaguchi and Susumu Sato, Low-Voltage-Driving Liquid Crystal Lens, Japanese Journal of Applied Physics, Oct. 10, 2010, pp. 1-3, vol. 49.

P. J.W. Hands, A. K. Kirby, and G. D. Love, Adaptive modally addressed liquid crystal lenses, Liq. Cryst. VIII, I.-C. Khoo ed., 2004, pp. 136-143, Proc. SPIE 5518.

Pishnyak, S. Sato, O. Lavrentovich, Electrically tunable lens based on a dual-frequency nematic liquid crystal, Applied Optics, 2006, pp. 4576-4582, V. 45, No. 19.

R.Guralnik, V.N. Belopukhov, G.D.Love and A.F.Naumov, Interdependence of the Electrical and Optical Properties of Liquid Crystals for Phase Modulation Applications, Journal of Applied Physics, May 1, 2000, pp. 4069-4074, vol. 87, No. 9.

Shiro Suyama, Munekazu Date and Hideaki Takada, Three-Dimensional Display System with Dual-Frequency Liquid-Crystal Varifocal Lens, Japanese Journal of Applied Physics, Feb. 2000, pp. 480-484, vol. 39, Part1, No. 2A.

Written Opinion for corresponding PCT/IB2009/052658.

* cited by examiner

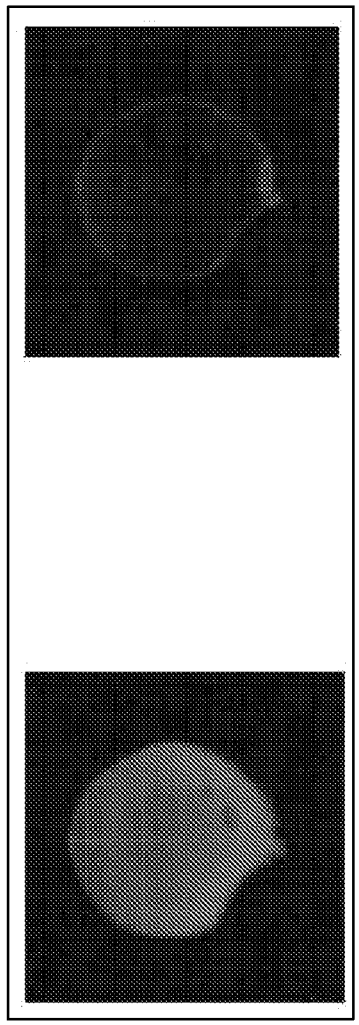
FIGURE 10A
FIGURE 10B
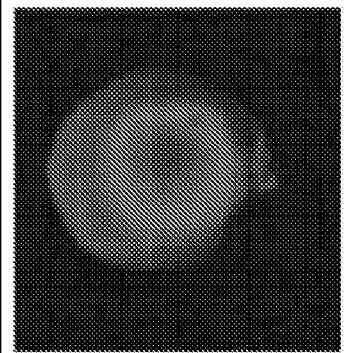
FIGURE 10E
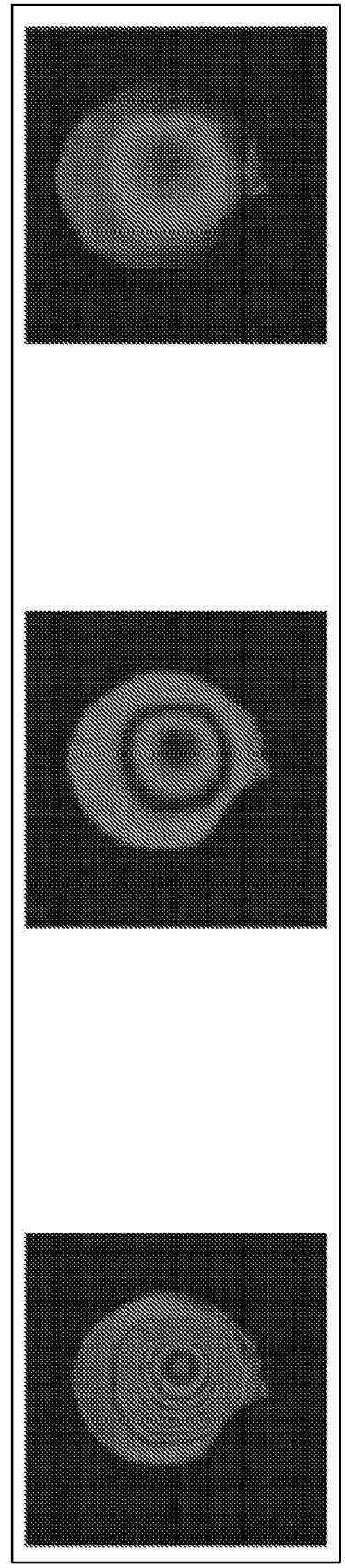
FIGURE 10C
FIGURE 10D

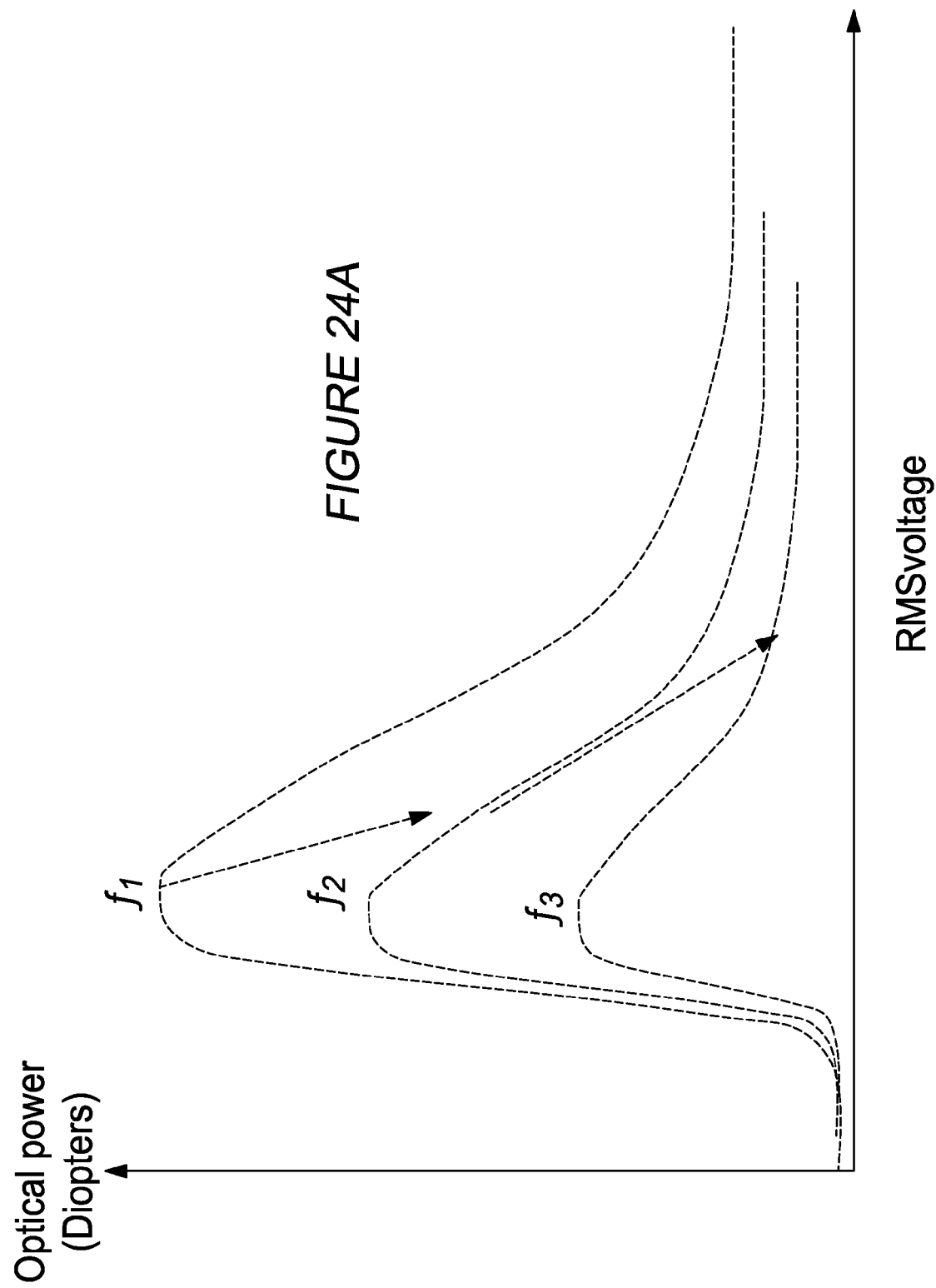

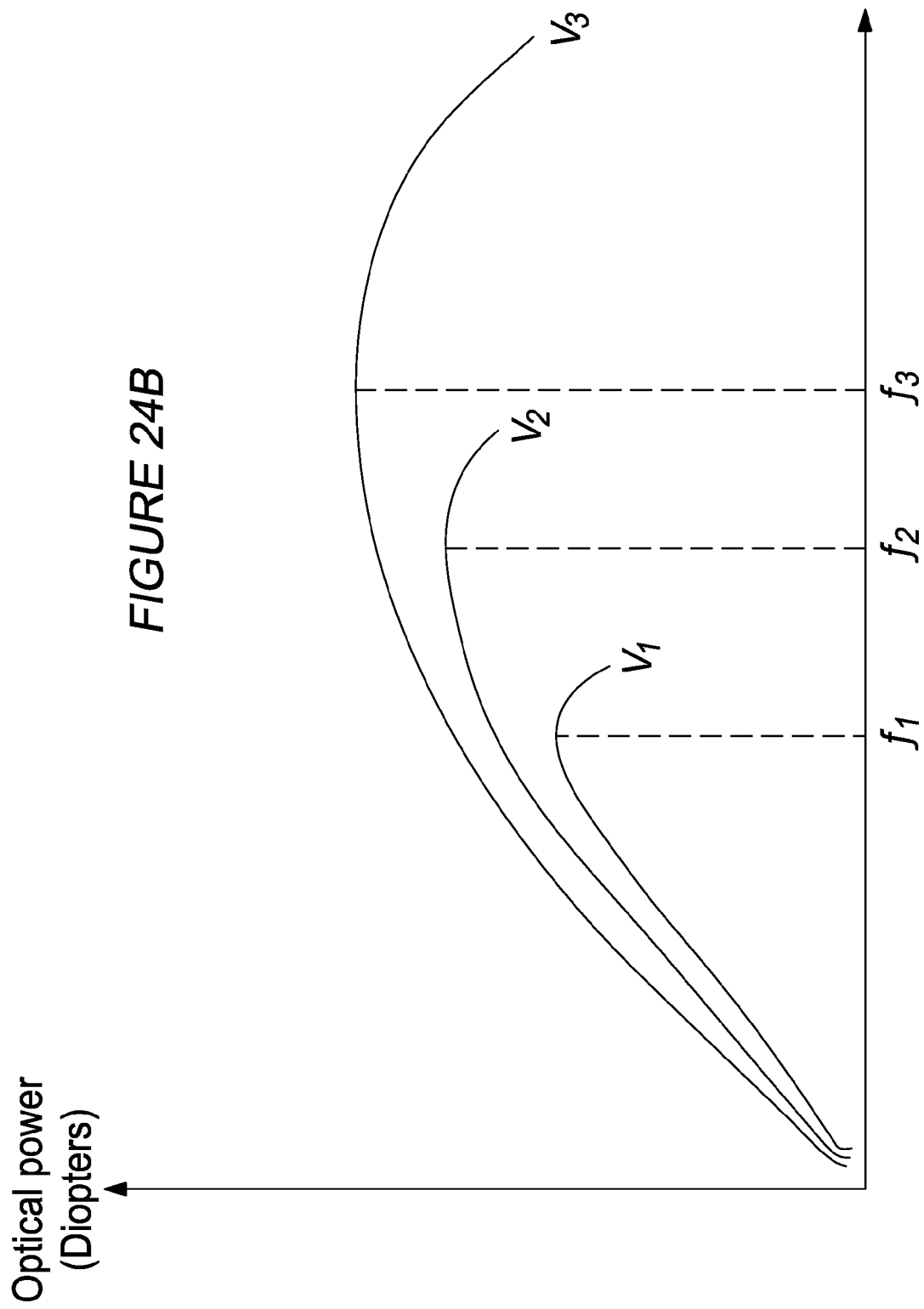

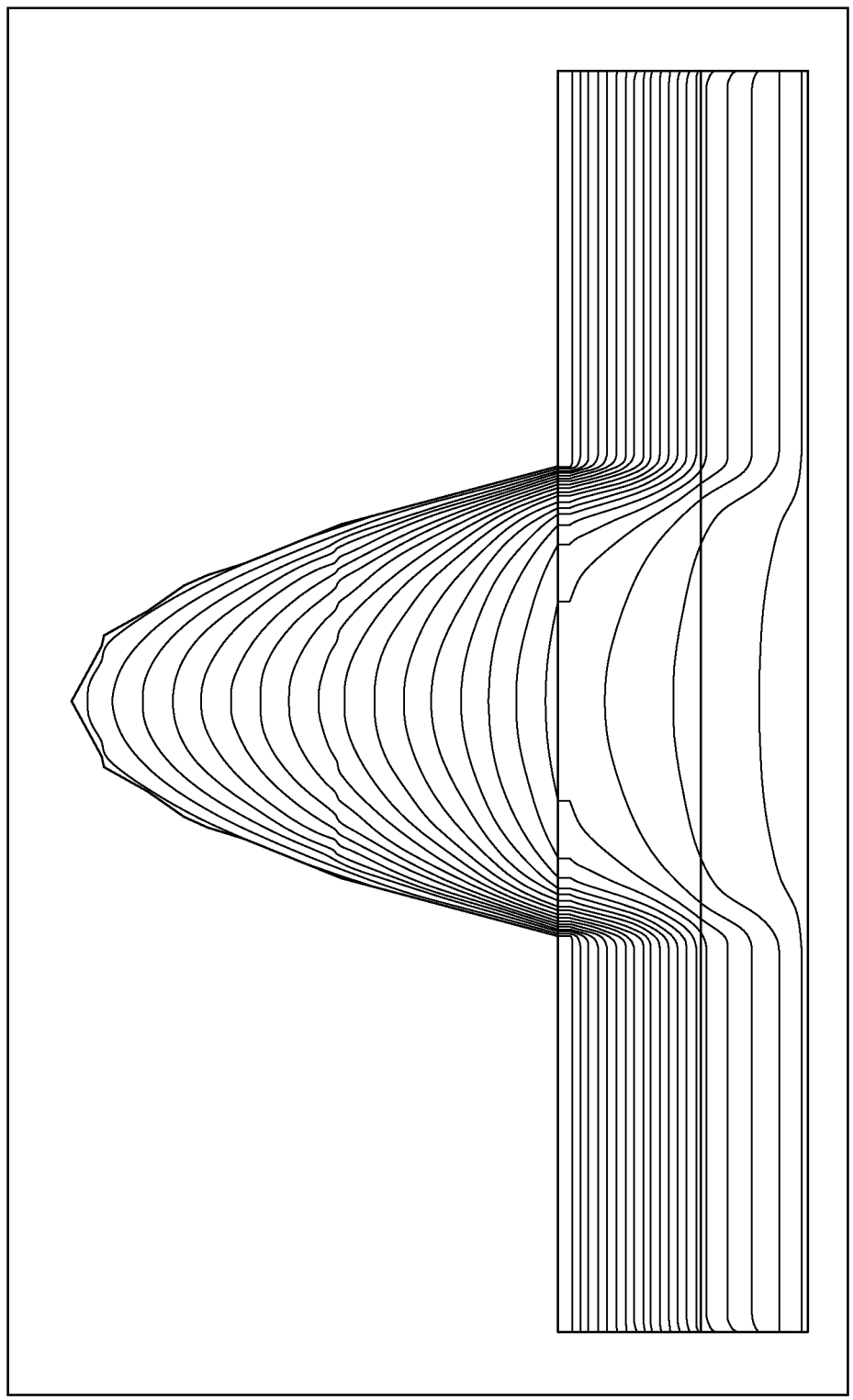

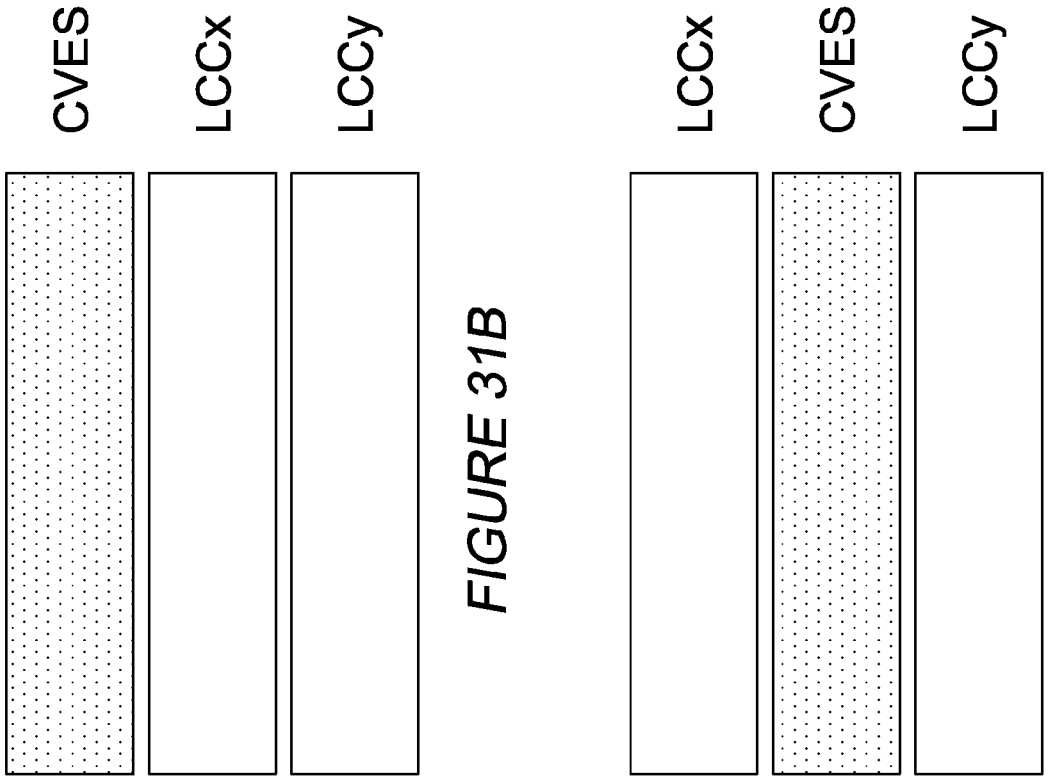
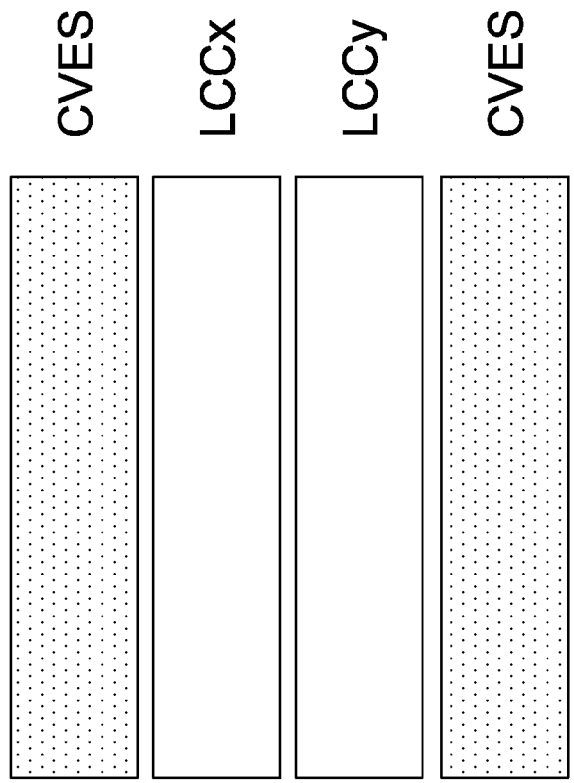
FIGURE 31A
FIGURE 31B
FIGURE 31C

ELECTRO-OPTICAL DEVICES USING DYNAMIC RECONFIGURATION OF EFFECTIVE ELECTRODE STRUCTURES

CROSS-REFERENCE TO RELATED APPLICATIONS

This application is a continuation of U.S. patent application Ser. No. 14/995,293, filed Jan. 14, 2016, now U.S. Pat. No. 9,500,889, issued Nov. 22, 2016, that is a divisional of U.S. patent application Ser. No. 14/670,763, filed Mar. 27, 2015, now U.S. Pat. No. 9,244,297, that issued Jan. 26, 2016, that is a divisional of U.S. patent application Ser. No. 14/501,964, filed Sep. 30, 2014, now U.S. Pat. No. 9,229,254, issued Jan. 5, 2016, that is a divisional of U.S. patent application Ser. No. 13/683,253, filed Nov. 21, 2012, now U.S. Pat. No. 8,860,901, issued Oct. 14, 2014, that is a divisional of U.S. patent application Ser. No. 13/234,456, filed Sep. 16, 2011, now a divisional of U.S. Pat. No. 8,319,908 issued on Nov. 27, 2012, that is a divisional of U.S. patent application Ser. No. 13/019,992 filed Feb. 2, 2011, now U.S. Pat. No. 8,028,473, issued Oct. 4, 2011, that is a divisional of U.S. application Ser. No. 13/000,601, filed Dec. 21, 2010, now U.S. Pat. No. 8,033,054, issued Oct. 11, 2011 and is a 35 U.S.C 371 National Stage of International Application Ser. No. PCT/182009/052658 filed Jun. 21, 2009 claiming priority of U.S. Provisional Application Ser. No. 61/074,618, filed Jun. 21, 2008; U.S. Provisional Application Ser. No. 61/074,621, filed Jun. 21, 2008; U.S. Provisional Application Ser. No. 61/074,653, filed Jun. 22, 2008; U.S. Provisional Application Ser. No. 61/074,654, filed Jun. 22, 2008; U.S. Provisional Application Ser. No. 61/080,404, filed Jul. 14, 2008; and U.S. Provisional Application Ser. No. 61/142,186, filed Dec. 31, 2008, which are incorporated herein by reference in their entirety.

FIELD OF THE INVENTION

This invention relates to the field of electrically tunable optical devices, particularly those using liquid crystal.

BACKGROUND OF THE INVENTION

Tunable liquid crystal (LC) optical devices, such as lenses, beam steering devices and shutters are known in the art. While some tunable LC lenses operate with a uniform electric or magnetic control field, most use a spatially modulated field. In the case of electric fields, there are a few prior art techniques used to spatially modulate the electric field. Spatially inhomogeneous dielectric layers have been used to attenuate the electric field to have a desired spatial profile. Electrodes have been spherically shaped to provide a desired spatial profile to the electric field. Another approach to spatially modulating the electric field is to use a planar electrode whose impedance properties are such that the voltage drop over the electrode as AC drive current is fed to the electrode leads to a spatially modulated electric field.

As shown in FIG. 1, one type of conventional LC cell is built by sandwiching the liquid crystal 102 between two substrates 104,106, each of which is first coated by a transparent electrode 108, 110, which may be a layer of material such as indium tin oxide (ITO), and then coated by polymer layers 112 (typically polyimide) which are rubbed in a predetermined direction to align LC molecules in a ground state, namely in the absence of the controlling electric field. The application of voltage to two ITOs creates a uniform electric field and correspondingly uniform LC reorientation (and correspondingly uniform refractive index distribution). In such a device, the index of refraction is different in a direction lengthwise with respect to the molecules than transverse to the molecules.

FIG. 2 illustrates a prior art LC cell configuration, in which a hole patterned electrode ring 204 of low resistivity surrounding a disk-shaped zone 205 of high resistivity material is used to generate an electric field gradient thanks to its strong "resonant" attenuation. This geometry has the advantages of being very thin (which is a key requirement, e.g., in cell phone applications) and of using only two electrodes (and thus one voltage for control). Unfortunately, it is difficult to produce the required thickness of high resistivity material with high optical transparency, as well as an LC cell with good uniformity, and the manufacturing process typically has a low yield. Different lenses will have slightly different electrode resistances and this, coupled with the fact that modal control is also very dependent on the precise cell thickness, means that each individual lens needs to be calibrated separately. Also, the minimum diameter of a modal lens is limited to about 2 mm—below this size the required resistivity of the ITO layer exceeds some 10MΩ/sq. Finally, such (so called "modal control") lenses must always be either positive or negative. It is not possible to switch between a diverging and converging lens.

FIG. 3 illustrates another prior art LC cell configuration with electric field gradient generation, using three distinct electrodes 304, 305, 307 (two of them in the inter-hole pattern formed on the same plane), two voltages V1 and V2 and an additional distinct weakly conductive layer (WCL) 306. The role of the external hole patterned electrode 304 (with voltage V1 applied thereto) is to create a lens-like electric field profile, while the role of the central disk-shaped electrode 305 (with voltage V2 applied thereto) is to avoid disclinations and to control the value of the gradient (e.g., to erase the lens). The role of the WCL 306 is to soften the profile created by V1 and to allow the reduction of the overall thickness of the lens. Unfortunately, the complex patterning of the top electrode, the necessity of using two distinct voltages and a separate WCL are difficult to manufacture and inhibit the practical use of this approach. For example, the use of this approach to build a polarization independent lens would require the use of six to seven thick glasses, which is a difficult task.

SUMMARY OF THE INVENTION

In accordance with the present invention, a variable optical device is provided for controlling the propagation of light passing therethrough, where the device makes use of a frequency dependent material and an electrical signal generator that generates a drive signal at a plurality of different frequencies. The device includes a liquid crystal (LC) layer through which the light passes, the LC layer controlling the light propagation. An electrode system is also provided that is connected to the electrical signal generator and arranged to generate an electric field that acts on the LC layer to alter its optical properties. The electrical signal generator generates a drive signal at a plurality of different frequencies and supplies the drive signal to the electrode system so as to generate the electric field. The frequency dependent material is located in the device so that it interacts with the electric field. This material has a charge mobility that is dependent on a frequency of the drive signal such that a spatial profile of the electric field varies as a function of the drive signal frequency to alter the properties of the LC layer. "Charge mobility" is used to describe the property of the frequency dependent material instead of "conductivity" because the latter can be understood to describe the mean free path of electrons. At low frequencies, some frequency dependent materials that exhibit high charge mobility may actually have lower conductivity (i.e. a shorter mean free path of electrons) than at higher frequencies, however, since the time for the charge to flow within the frequency dependent material is longer at low frequencies, this can result in less charge flow. Similarly, at higher frequencies, the mean free path of electrons in some materials may be longer, however, given the shorter time that the electric potential is available in each positive or negative cycle, the resulting charge flow may be greatly reduced. Thus "charge mobility" is used to refer to the overall ability of charge to flow within the frequency dependent material within the constraints of the alternating electric signal applied.

In some embodiments, the electrode system comprises a fixed conductor electrode connected to a body of the frequency dependent material. The electric field may have a portion substantially defined by the fixed conductor electrode, and a portion defined by the frequency dependent material. The electric field may also be substantially defined by the frequency dependent material. The electrode system can have a fixed conductor electrode whose electric field is shaped by a body of the frequency dependent material that is not connected to the fixed conductor electrode.

In some embodiments, the electrode system is made using elements having a substantially flat layer geometry.

The electrode system may also be essentially optically hidden and thus may not interfere with the propagation of light through the optical device.

In some embodiments, the electrode system comprises a patterned electrode in contact with a layer of the frequency dependent material.

In some embodiments, the device is a tunable focus lens. The lens can be refractive or diffractive.

In some embodiments, the device includes a variable frequency control signal circuit configured to cause the device to control propagation of light as a function of control signal frequency.

The use of a frequency dependent material and a drive signal at different frequencies allows for a variety of different embodiments of the optical device. Some examples of variations are the number, shape and configuration of electrodes, the number of different frequency dependent materials and their positions relative to the electrodes and each other, the application of different drive signal frequencies and voltages and the use of additional materials in the optical device structure. In one embodiment, the drive signal comprises a single frequency signal for which the frequency is used to change the optical characteristics of the device. This may be done without any significant variation in the signal voltage, or it may also include changes in signal amplitude. In another embodiment, a plurality of frequencies are mixed together and applied simultaneously to create a particular interaction with the frequency dependent layer and, correspondingly, to create a desired profile for the electric field.

A basic concept of the invention is using a frequency dependent material in conjunction with different drive signal frequencies in order to change an effective electrode structure within the optical device. The electrode structure determines the profile of the electric field which, in turn, determines the optical properties of the LC layer. The frequency dependent material may be selected to exhibit different charge mobility at different frequencies such that, at different frequencies, it may appear as a conductive or as a non-conductive material. For frequencies at which it appears as a conductor, the frequency dependent material may create an effective electrode structure that is positioned differently than one of the fixed electrodes. However, for frequencies at which charge mobility in the frequency dependent material is relatively low, it does not appear as a conductor, and the effective electrode structure is determined by the actual position of the fixed electrodes. Thus, with proper positioning of a frequency dependent material, and the selection of different drive frequencies, the effective conductor configuration may be altered and the optical properties of the LC layer dynamically changed.

In one group of embodiments, a frequency dependent material is used in conjunction with a patterned electrode that, in the absence of a different electrode structure, would create a spatially non-uniform electric field. Such a structure may be used for creating a particular characteristic in the LC layer, such as a lens structure, resulting from the non-uniform reorientation of the LC molecules by the electric field. In such an embodiment, however, it may also be desirable to create a spatially uniform electric field so as to provide an initial common alignment tendency to all of the LC molecules (e.g., to avoid disclinations). In this embodiment of the invention, the frequency dependent material may be located such that, when a frequency of the drive signal is selected that provides a high degree of charge mobility (which allows charges to travel larger distances) in the frequency dependent material, an effective electrode structure is created that causes the spatial profile of the electric field to be essentially uniform. For example, the patterned electrode could be a ring electrode, and a space in the center of the electrode filled with the frequency dependent material. In such a case, the application of the drive signal at a first frequency, such as a relatively high frequency, for which there is little charge mobility (i.e., relatively small distances travelled by charges) in the frequency dependent material, results in no effective extension of the electrode surface, and a non-uniform electric field is generated based on the ring structure of the electrode. However, changing to a frequency, such as a relatively low frequency, at which the frequency dependent material has a relatively high amount of charge mobility causes the material to appear as an extension of the ring electrode, and the effective electrode structure becomes planar. As such, the electric field generated thereby is essentially uniform. In the foregoing embodiment, other shapes may be used for the fixed electrode, such as a disk shape, and the frequency dependent material may form a layer with the fixed electrode located near either the top or bottom of the layer, or surrounding it in the same plane.

In another embodiment of the invention, the variable optical device includes a central layer positioned between two LC layers. Each of the liquid crystal layers may have a different direction of LC orientation. A pair of electrodes to which the drive signal is applied are located, respectively, adjacent to each LC layer, to the side away from the central layer. The central layer includes a particular geometric arrangement of a fixed electrode, such as a hole patterned electrode, and a frequency dependent material, and functions as a gradient control layer by shaping the electric field seen by each of the LC layers in a symmetrical way. This electric field shaping is dependent on the frequency of the drive signal, which determines the extent of charge mobility in the frequency dependent layer. At a frequency corresponding to low charge mobility, the gradient control layer shapes the electric field according to the shape of the fixed central layer electrode. At a frequency corresponding to high charge mobility, however, the frequency dependent layer creates an effective electrode surface, and the gradient control layer shapes the electric field according to an overall electrode geometry resulting from the electrode and the frequency dependent layer together.

In another embodiment of the invention, the optical device has a plurality of frequency dependent materials that have differing amounts of charge mobility at certain frequencies. These materials may be arranged together in a particular geometrical configuration to create a dynamically adjustable effective electrode shape. For example, the two materials may be located in a common layer with one of the materials having a lens-like shape and being surrounded by the other. With this layer and a LC layer being located together between two planar electrodes, the electric field profile may be changed by changing the frequency of the drive voltage and thereby changing whether or not the effective electrode structure adopts a shape created by the frequency dependent materials, such as might be created along a border between the two materials. The different materials may also be arranged with surfaces perpendicular to an optical axis of the device, if desired, for better optical efficiency, and non-conductive materials may also be used together with the other materials to construct desired effective electrode shapes.

Another variation of the invention makes use of a frequency dependent layer that has a frequency dependent charge mobility that varies along a gradient through the layer. Thus, one portion of the layer exhibits a higher degree of charge mobility in response to a first frequency than that of another portion of the layer. As such, for a frequency of a drive voltage applied to the device, adjustment of the frequency changes the portion of the layer that behaves as a conductor. The shape of the gradient in the layer may therefore be used to create an effective electrode shape that varies with changing drive signal frequency. This type of a layer may also be combined with different fixed electrode structures, including a patterned electrode, to produce more complex effective electrode shapes.

The frequency dependent materials may consist of a variety of different possible materials. In one embodiment, the material is a thermally polymerizable conductive material, while in another embodiment it is a photo polymerizable conductive material. Other possibilities include vacuum (or otherwise, e.g., sol-gel) deposited thin films, high dielectric constant liquids, electrolyte gels, conductive ionic liquids, electronic conductive polymers or material with electronic conductive nanoparticles. The key feature of the material is that it has a charge mobility that is frequency dependent.

When the frequency dependent material is a thermally or photo polymerizable conductive material, it may include: a polymerizable monomer compound having at least one ethylenically unsaturated double bond; an initiator that is a combination of UV-vis, NIR sensitive or thermally sensitive molecules; an additive to change the dielectric constant of the mixture, where the additive is selected from the group consisting of organic ionic compounds and inorganic ionic compounds; and a filler to change a viscosity of the mixture. The material may also include an adhesive selective from the group consisting of adhesives sensitive to UV-Vis, adhesives sensitive to NIR and adhesives polymerized using a thermal intitiator. An optical elastomer may also be included.

When the frequency dependent material is a high dielectric constant liquid, it may include a transparent liquid material having an epsilon between 2.0 and 180.0 at a relatively low frequency that allows electric charge to move in a frequency dependent manner.

When the frequency dependent material is an electrolyte gel material, it may include: a polymer material; an ionic composition; and an ion transporter.

When the frequency dependent material is a conductive ionic liquid, it may include an ionic species selected from the group consisting of cholorate, perchlorate, borate, phosphate and carbonate.

The various embodiments of the invention also include a drive signal that may be varied in signal frequency. The drive signal generator may output a single frequency signal for which the frequency may be changed, a signal that is a mixture of different individual frequencies, or some other form of signal for which the frequency content may be varied. In one embodiment, the drive signal generator generates a pulse width modulated signal for which the filling factor may be varied. In such a case, the filling factor may be modified to change the amount of high frequency content in the signal. In another embodiment, the drive signal generator generates an amplitude modulated signal in its basic mode or in the mode for which a signal at a first frequency is modulated by a signal at a second frequency. In yet another embodiment, the drive signal generator generates a drive signal that is a combination of several different individual frequency signals having predetermined relative frequencies and amplitudes. The selection of the appropriate drive signal may be made taking into account the specific electrode and frequency dependent layer configuration of a particular application.

In a particular group of embodiments of the invention, an electrode system is used that includes a fixed conductor electrode having a non-flat geometry. A frequency dependent material that has a non-flat geometry may also be used either alternatively, or in combination with, the non-flat fixed electrode. The structural configurations in this embodiment are varied, and may include a fixed conductor electrode that comprises a curved layer of conductive material coated atop a lens-like polymer structure. In another embodiment, the fixed conductor electrode is a multi-level flat-surface layer of conductive material coated atop a flat-aperture polymer structure. The frequency dependent material may also be a flat layer of material located between the LC layer and the fixed conductor electrode. In a variation, a flat-surface polymer structure may be formed of a pair of lens-like polymer structures having opposite and matching curved surfaces. The curved layer of frequency dependent material may also include a layer of optically transparent glue that attaches the matching curved surfaces together.

In still another embodiment of the invention, a variable optical device includes a LC layer that itself has a frequency dependent charge mobility. In one version of this embodiment, no external frequency dependent material is necessary, as the LC layer itself changes its degree of charge mobility with changes in the drive frequency. Thus, the spatial profile of the electric field interacting with the LC layer may be frequency dependent resulting in an LC layer the optical properties of which may be modified by changing the frequency content of the drive signal. In one version of this embodiment, the electrode assembly generates a spatially non-uniform electric field and, when a frequency is generated that creates a high degree of charge mobility in the LC layer, the electric field is modified to be more spatially uniform. In another variation, the electrode system includes a hole-patterned electrode with an optically transparent material in the central zone of the electrode.

Those skilled in the art will recognize that the various principles and embodiments described herein may also be mixed and matched to create optical devices with various electric field generating characteristics. Electrodes of different shapes and configurations, frequency dependent materials of different types, shapes and positions, different drive signal generators, and all of the other variations described herein may be used in combination to create an optical device with a particular characteristic. The devices may also be frequency controlled, voltage controlled, or a combination of the two.

For example, an LC layer may be used that has a low angle pre-tilt alignment layer, and a first frequency may be applied for which the effective electrode structure is uniform. At this frequency, the voltage may then be increased to a level at which the LC molecules all have an initial reorientation at a uniform tilt. The frequency of the voltage may then be changed to modify the effective voltage structure and introduce non-uniformities into the electric field so as to change the optical characteristic of the liquid crystal, such as to form a lens structure. By applying an initial uniform electric field strength to the liquid crystal before introducing field non-uniformities, disclinations in the LC layer are avoided. The drive signal may also be applied so as to prevent the liquid crystals from remaining close to a ground state, and to thereby reduce image aberrations. In another example, frequency control may be used to alter the optical power of LC lens, but the voltage of the drive signal switched from one level to another at different optical powers so as to improve the performance of the lens. Many other similar control paradigms are likewise possible.

BRIEF DESCRIPTION OF THE DRAWINGS

FIGS. 10A-10E are illustrative images showing the tunable lens effect for a configuration like that of FIG. 5A.

FIG. 24A is a graphical view showing transfer functions (optical power versus RMS voltage) of the LC lens driven at three different frequencies.

FIG. 24B is a graphical view showing transfer functions of optical power versus frequency for a frequency tunable LC lens for three different control voltages.

FIG. 27B is a graphical view showing equipotential planes for the configuration of FIG. 27A when using a drive signal having a relatively high frequency.

FIG. 31A is a schematic view of a LC cell configuration for controlling two orthogonal polarizations of light.

FIG. 31B is a schematic view of a LC cell configuration like that of FIG. 31A, but for which a single combined variable electrode structure controls both LC cells.

FIG. 31C is a schematic view of an LC cell configuration like that of FIG. 31B, but for which the combined variable electrode structure is located in between two cross oriented LC cells.

DETAILED DESCRIPTION

The present invention is directed to a tunable liquid crystal (LC) lens using a frequency dependent material to modify a spatial profile of the electric field via frequency tuning. Thus, tuning of the lens can be frequency controlled. The devices of the present invention may be used for tunable focusing, diffracting, steering, etc. The devices of the present invention may also be used for controlling a LC optical device that is fixed.

Figure 1:
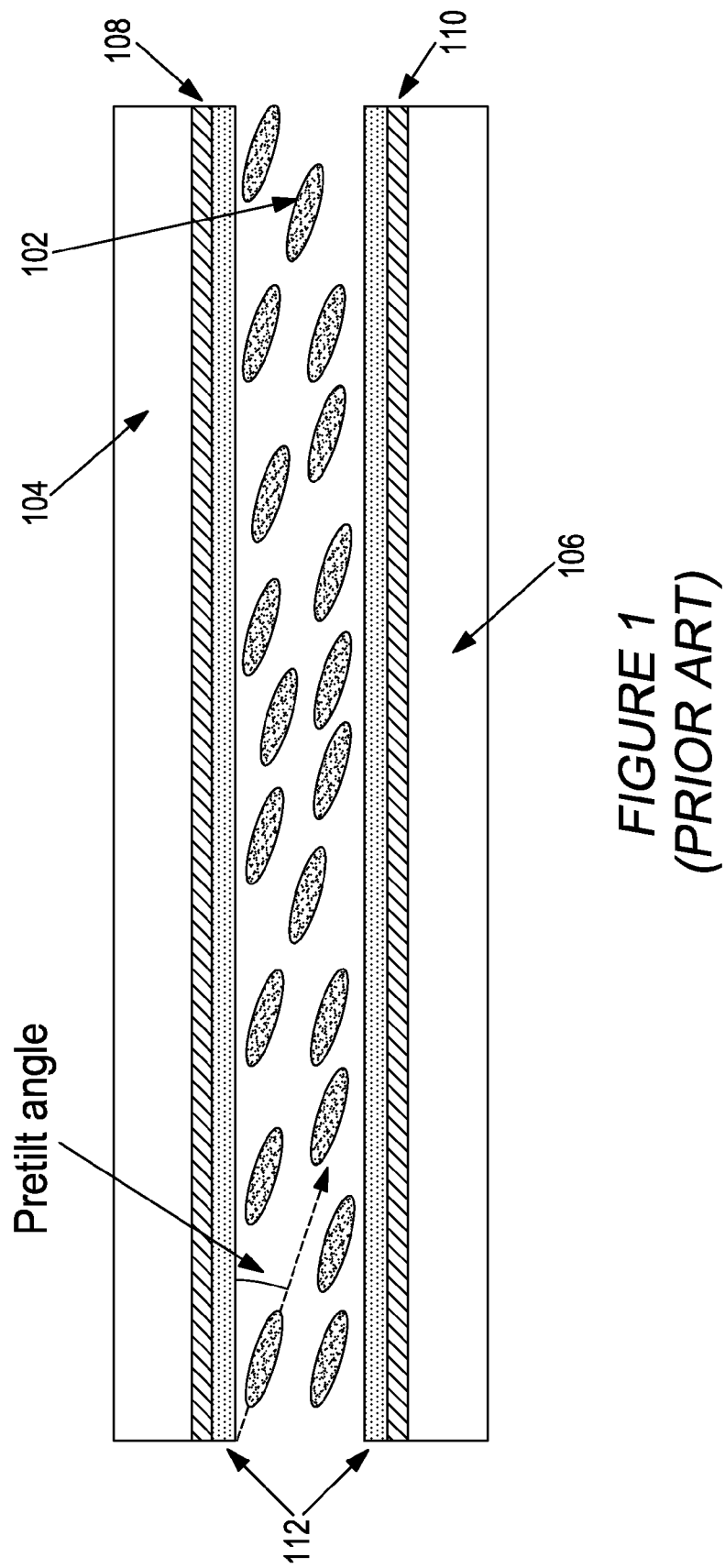
FIG. 1 is a schematic view of a prior art tunable liquid crystal (LC) lens structure.
Figure 2:
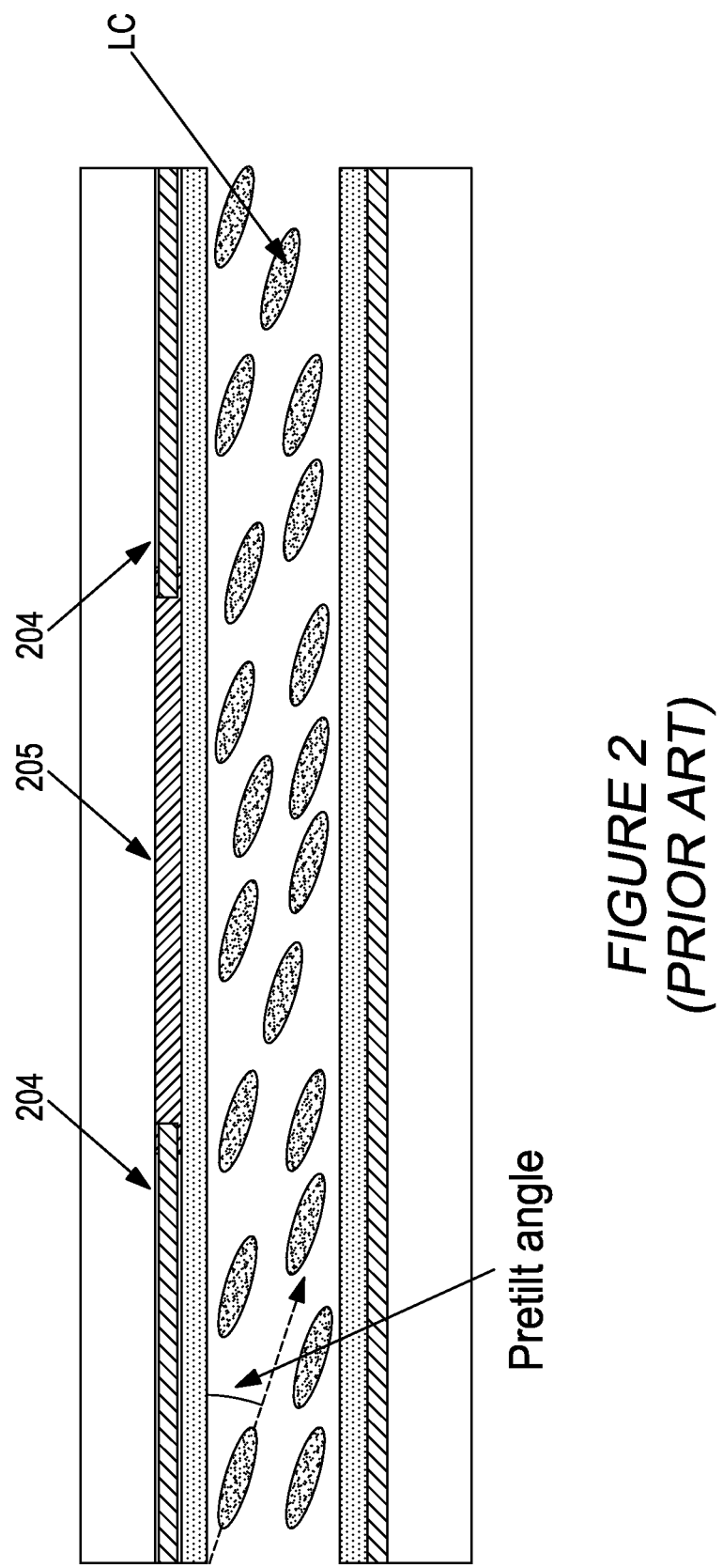
FIG. 2 is a schematic view of a prior art tunable LC lens structure having a hole patterned electrode.
Figure 3:
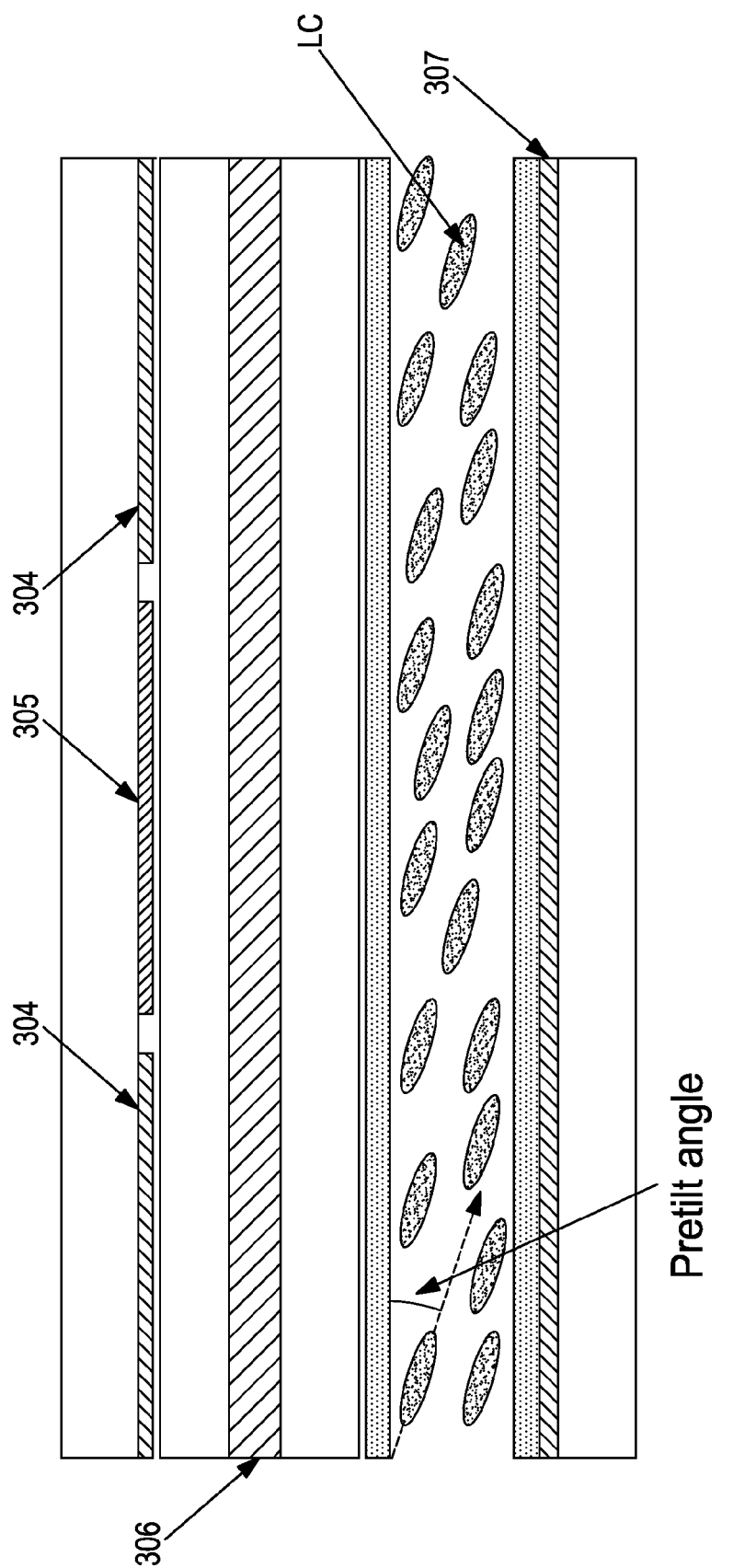
FIG. 3 is a schematic view of a prior art tunable LC lens structure having a three segment top electrode.
Figure 4A:
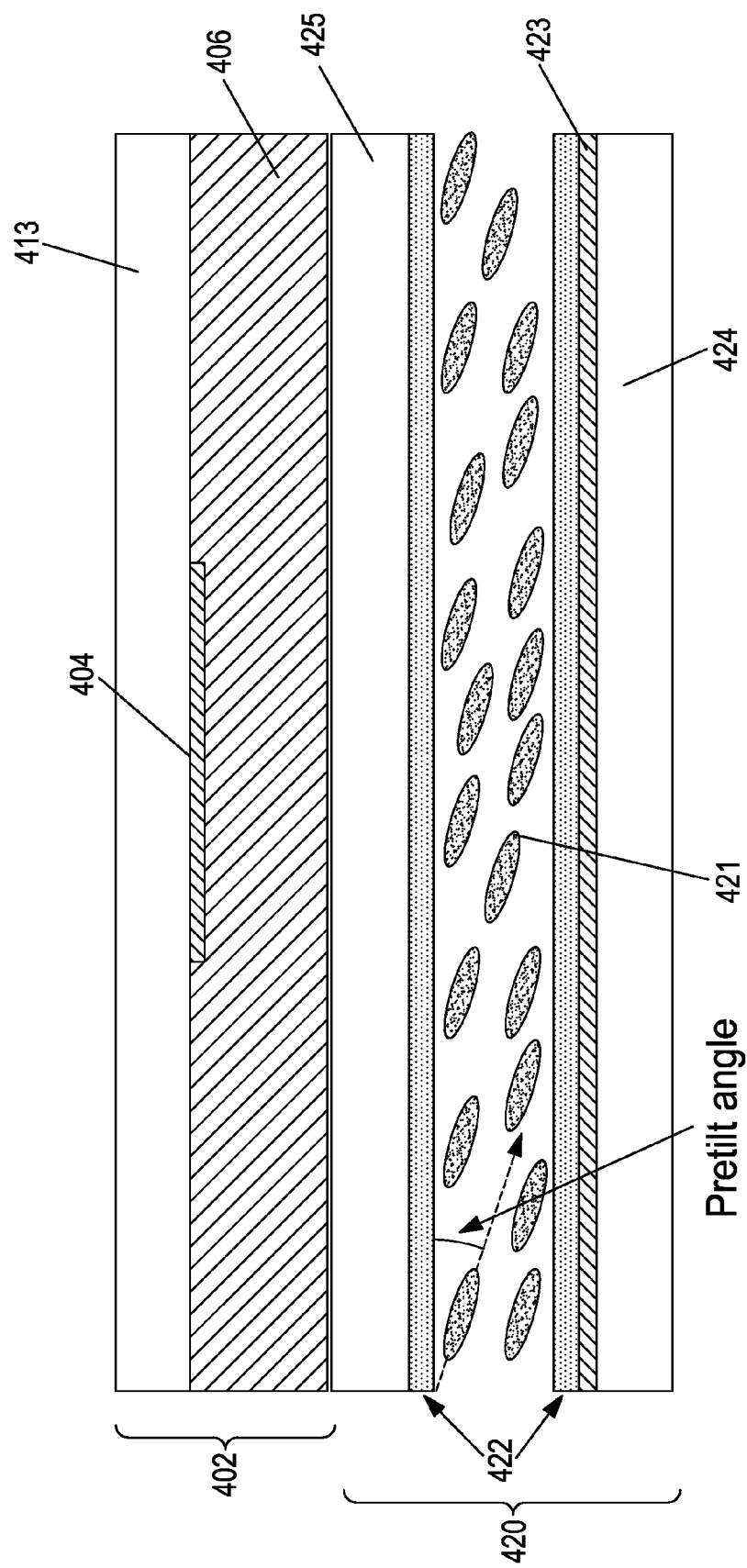
FIG. 4A is a schematic view of a tunable LC lens structure having a frequency dependent material layer and a disc-shaped top electrode located near the top of the layer.

FIG. 4A schematically illustrates a tunable LC lens using a layer 406 of a material having a frequency dependent characteristic. This material may be, for example, a high dielectric constant material, or a material of weak conductivity, and is hereinafter referred to, for brevity, as the "frequency dependent material." Functionally, the material has the characteristic of allowing a limited degree of charge mobility through it, and that degree of charge mobility is dependent on the frequency of the electrical signal applied to the device. Thus, for a given frequency dependent material, an electrical signal of relatively low frequency may result in a high degree of charge movement (transport distance) in the material, while a relatively high frequency results in a relatively low degree of charge mobility. When using the frequency dependent material in conjunction with an electrode pair that generates an electric field in response to an applied drive signal, the extent of charge mobility determines the depth of penetration of charge into the material and, therefore, the portion of the material that behaves like a "good" conductive layer, as well as the portion that behaves like a "poor" conductor, in the context of electric field formation. Thus, with a high degree of charge mobility, a larger segment of the material will appear as a conductor and therefore appear as an extension of a nearby electrode. This frequency dependent characteristic is therefore used in the present invention to create dynamically configurable effective electrode surfaces which may be changed by changing the frequency of the drive signal. Changing the effective electrode profile in this manner results in a corresponding change in the profile of an electric field between the two electrodes. With an LC layer located between the electrodes, the dynamically changeable electric field profile may thus be used to dynamically change the optical properties of the LC layer.

Referring again to FIG. 4A, the liquid crystal cell (LCC) 420 is composed of a layer of LC material 421, which is sandwiched between "oriented" coatings 422, formed of a material such as rubbed polyimide. The lower surface of the LCC includes a relatively uniform transparent conductive layer (i.e., electrode) 423 formed from a suitable material such as indium tin oxide (ITO). A substrate 424 is provided on the lower surface, and supports the transparent conductive layer. Optionally, a middle layer 425 may be provided on the upper surface of the LCC, above the uppermost of the oriented coatings 422.

The gradient control structure 402, which controls the electric field gradient, is composed of an optically transparent central electrode 404 of fixed (preferably low) electrical resistance, while the peripheral part of the same layer (on the same plane) and the area below that plane is filled by a layer 406 of the frequency dependent material. This layer 406 is the portion of the structure that may also be referred to herein as a hidden electrode. In the present embodiment, the electrode 404 is disk-shaped and located in the center of the gradient control structure 402. An optional cover substrate 413 may also be provided in the upper portion of the gradient control structure, above the transparent central electrode 404 and the frequency dependent layer 406.

As mentioned above, the frequency dependent layer 406 is a complex dielectric material for which the depth of penetration of electrical charge resulting from an applied AC excitation voltage will be different for different frequencies. The different depths of charge penetration for different frequencies allows for the reconfiguration of the electrode structures by moving the effective electrode surfaces. In other words, a depth of penetration of electrical charge for one frequency may create an effective, or "virtual," electrode surface that is in a different position for the effective electrode surface for a different frequency. As the electrodes are used to generate an electric field that is applied to the LC layer, the different effective electrode surfaces can be used to change the electric field experienced by the LC layer, and therefore to change its optical properties. Thus, for example, a tunable LC lens can be made frequency tunable, since optical properties of the LC cell are controllable by the frequency applied to the electrodes. Moreover, the frequency tuning may be voltage independent, in that the tuning can be accomplished using essentially the same RMS voltage for the excitation signals of different frequencies.

Referring again to FIG. 4A, the lens shown can operate in different possible regimes. For control frequencies that have a high degree of charge transport in the frequency dependent layer 406, electrode 404 and layer 406 will together appear as a uniform "top" electrode. That is, the high degree of charge penetration into the layer 406 will create an "extension" of the electrode 404, and the effective electrode will extend across the entire length of the layer 406. Since the bottom electrode structure 423 is also flat and uniform, the electric field across the LC layer will be approximately uniform, and the LC molecules will be reoriented uniformly and without orientation defects (known as disclinations) which can affect LC structures that are reoriented by changing the voltage on a patterned electrode. In contrast, if a frequency is applied to the electrodes for which the charge transport through the layer 406 is very limited, the effective top electrode shape will be close to that of just the electrode 404 alone, and the resulting electric field generated across the LC layer will be non-uniform. In this example the non-uniform field will be concentrated around the disc-shaped electrode 404, and will change the optical properties of the LC layer 421 in a predetermined way.

By frequency tuning instead of essentially voltage tuning, voltage ranges can be used that are more efficient, either for power consumption purposes or for liquid crystal modulation purposes, while frequency control can be used to provide the desired optical tuning. Frequency control can also be used to provide the capacity of dynamic control of the effective shape of the electrodes, and thus of the shape of the electric field generated by these electrodes. Furthermore, the use of this "hidden and frequency controlled" electrode to provide for the spatial modulation of the electric field opens up a very large choice of optically transparent materials. Such a configuration of an LC lens is also simple and cost-effective to fabricate, while being insensitive to variations of physical parameters. Finally, the frequency dependence of conductivity is an additional tool, which allows the building of thicker films, and the control of the electric field spatial profile by its conductivity.

Figure 4B:
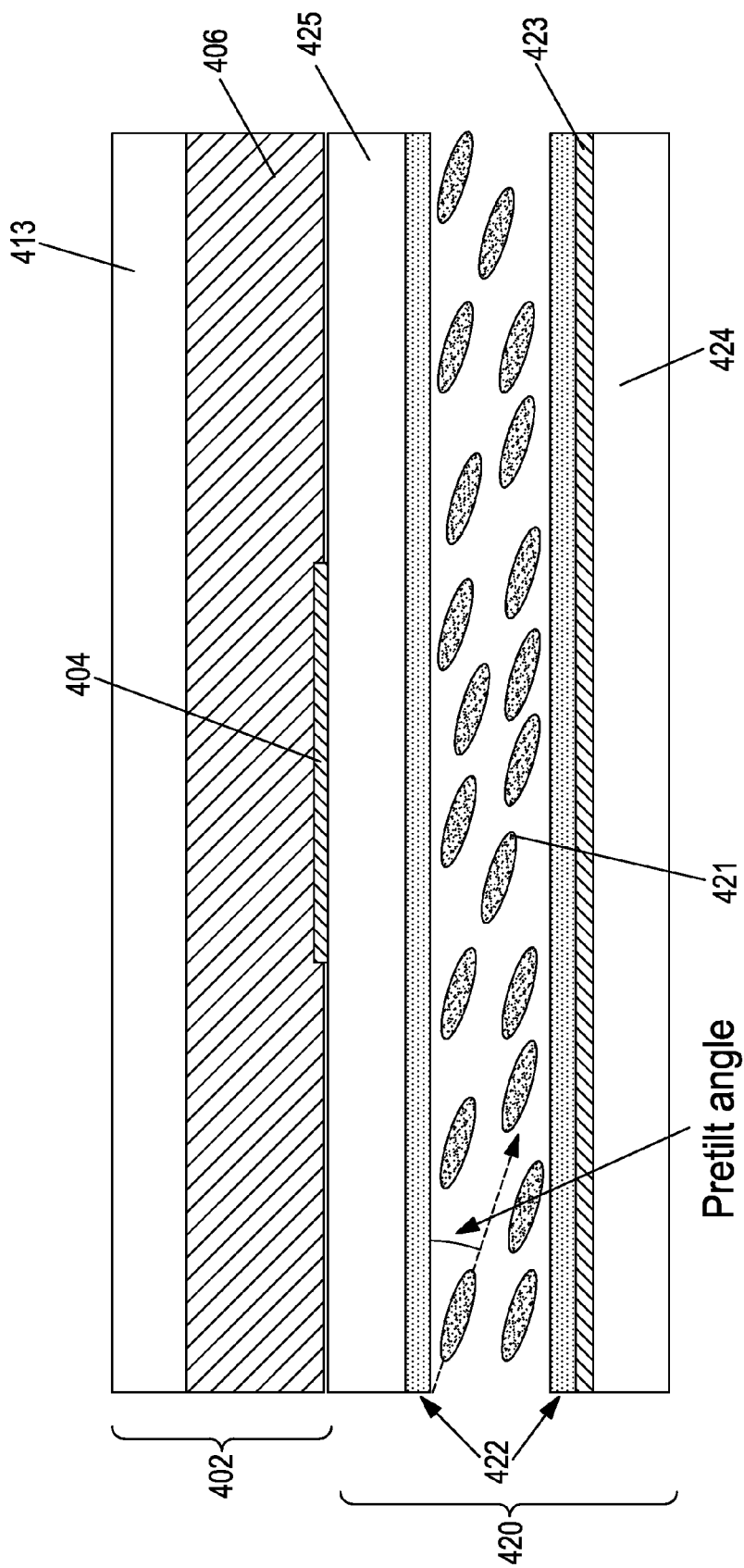
FIG. 4B is a schematic view of a tunable LC lens structure having a frequency dependent material layer and a disc-shaped top electrode located near the bottom of the layer.

A variant of the above example is shown in FIG. 4B, where the optically transparent disk-shaped central electrode 404 is positioned such that the peripheral part of the plane of the disk-shaped electrode and the area above that plane is filled by the frequency dependent material 406. That is, in this variation, the electrode 404 is in the lower region of the material 406 rather than in the upper region. The other components, and the functional aspects of the system, however, are effectively the same.

It will be appreciated that the tunable LC optical device can be fabricated using a layer by layer assembly and, preferentially, in a parallel way (many units simultaneously, called "wafer level"), the final product being obtained by singulation and, optionally, joining lenses with operation axes (directors) in cross directions to focus both orthogonal polarizations of light.

The control signal for tuning the optical device can be provided by a variable frequency control signal circuit configured to cause said device to control propagation of light in the device as a function of control signal frequency. Such circuits are of known design, and are not discussed in any further detail herein.

Figure 5A:
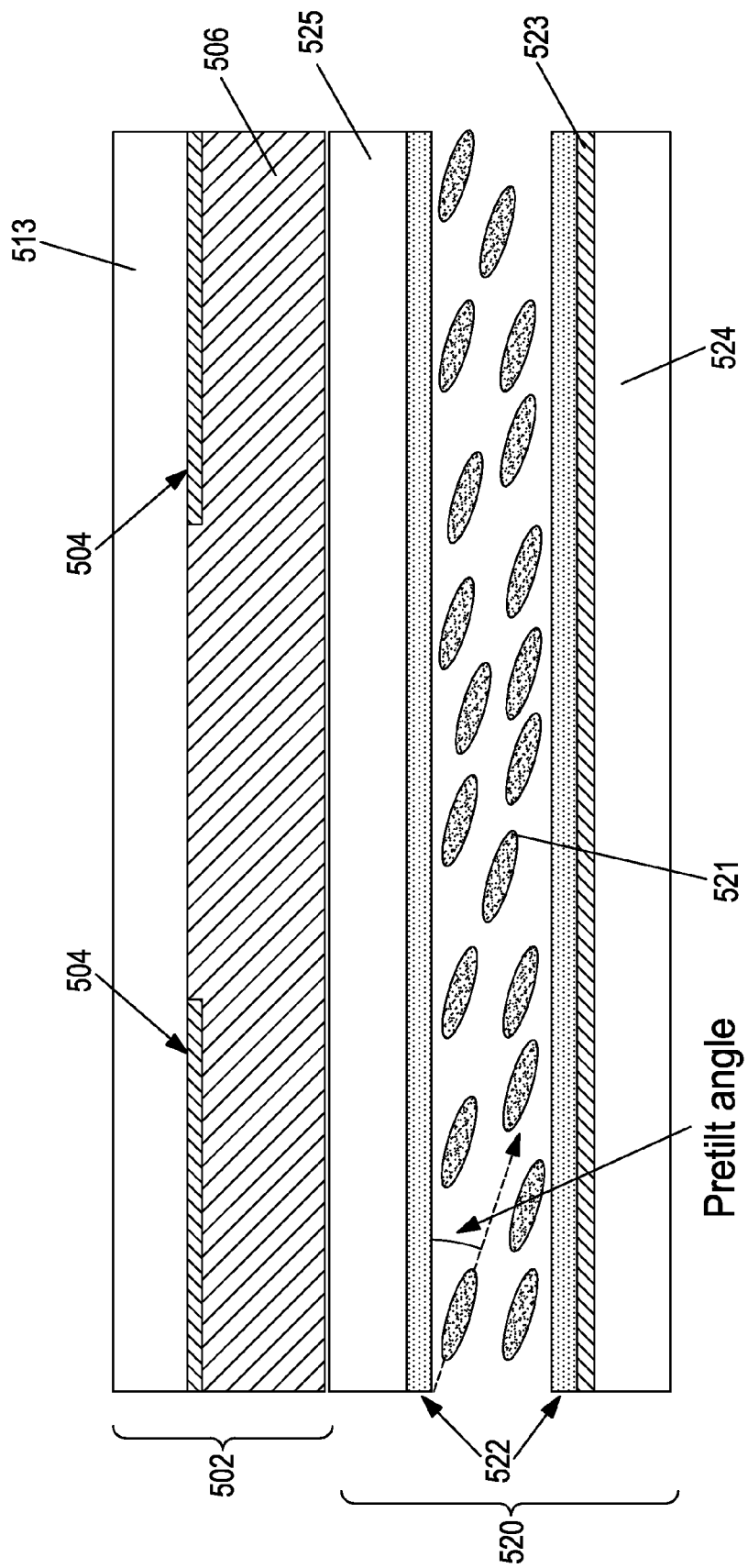
FIG. 5A is a schematic view of a tunable LC lens structure having a frequency dependent material layer and a hole patterned top electrode located near the top of the layer.
Figure 5B:
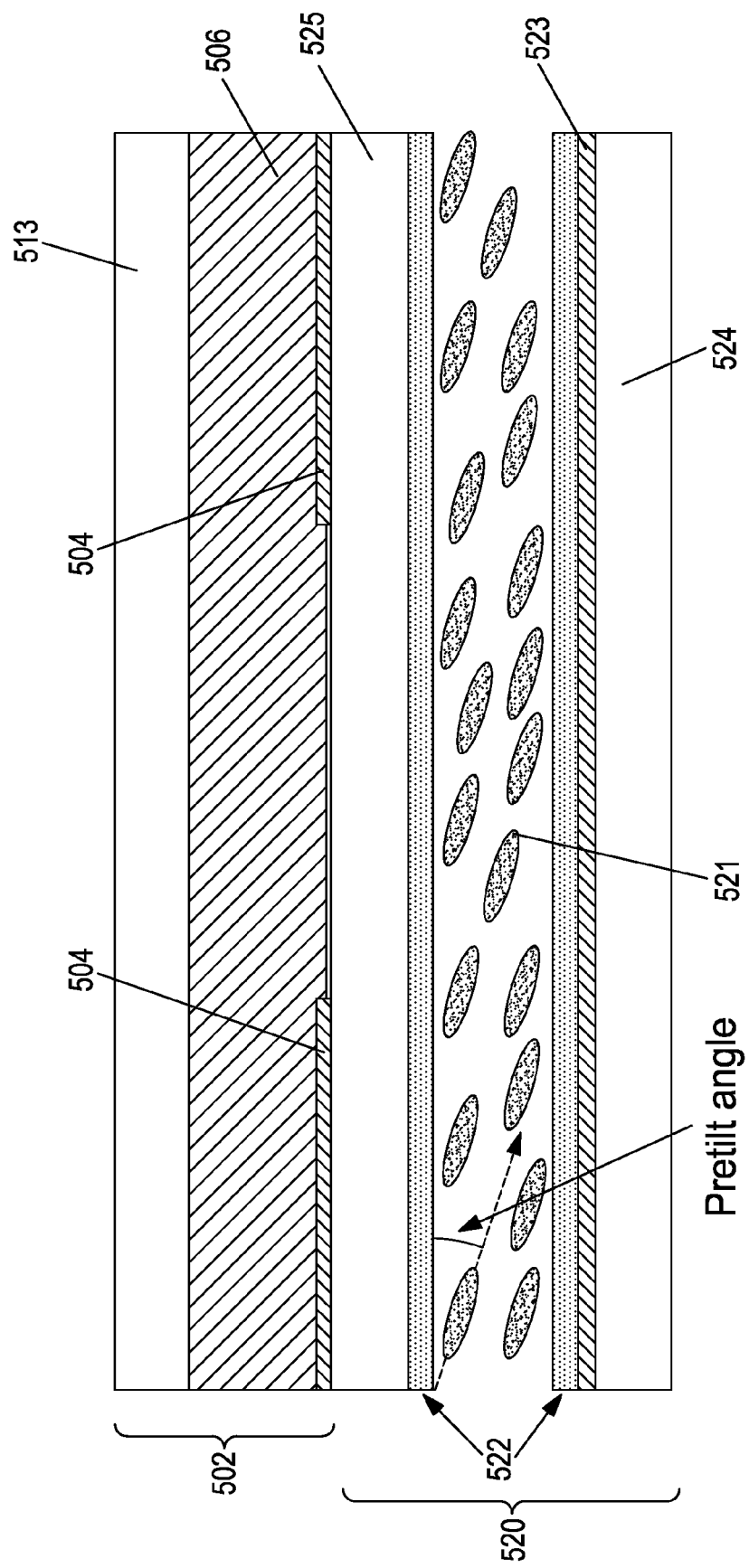
FIG. 5B is a schematic view of a tunable LC lens structure having a frequency dependent material layer and a hole patterned top electrode located near the bottom of the layer.

FIGS. 5A and 5B illustrate variant configurations of a tunable LC lens using a hidden electrode to provide spatial modulation of the electric field via frequency tuning. In these two examples, the gradient control structure 502 is composed of a hole-patterned fixed conductive electrode ring 504 that, optionally, may be made optically transparent.

In FIG. 5A, the electrode 504 is located at the top of the layer of frequency dependent material 506, while the arrangement in FIG. 5B has the electrode 504 located at the bottom of the material 506. In each of these embodiments, as with the FIGS. 4A and 4B embodiments, an electric field can be generated that is either spatially uniform or spatially non-uniform, depending on the frequency of the control signal applied to the electrodes. A low frequency signal provides deep charge penetration into the material 506, creating an effective electrode shape that extends the length of the layer and that, in conjunction with lower electrode 523, creates a uniform electric field. In contrast, a relatively high frequency signal allows lower charge penetration, and results in a non-uniform electric field that modifies the optical properties of the LC layer 521. The different electrode shapes (FIGS. 5A and 5B as compared to FIGS. 4A and 4B) provide different electric field characteristics, as discussed further below. However, the other components of the structures, such as liquid crystal cell 520 having oriented coatings 522, bottom substrate 524, optional mid layer 525, bottom conductive layer 523 and liquid crystal 521, as well as the optional top substrate 513, function in the same manner as the corresponding components of FIGS. 4A and 4B.

Figure 6:
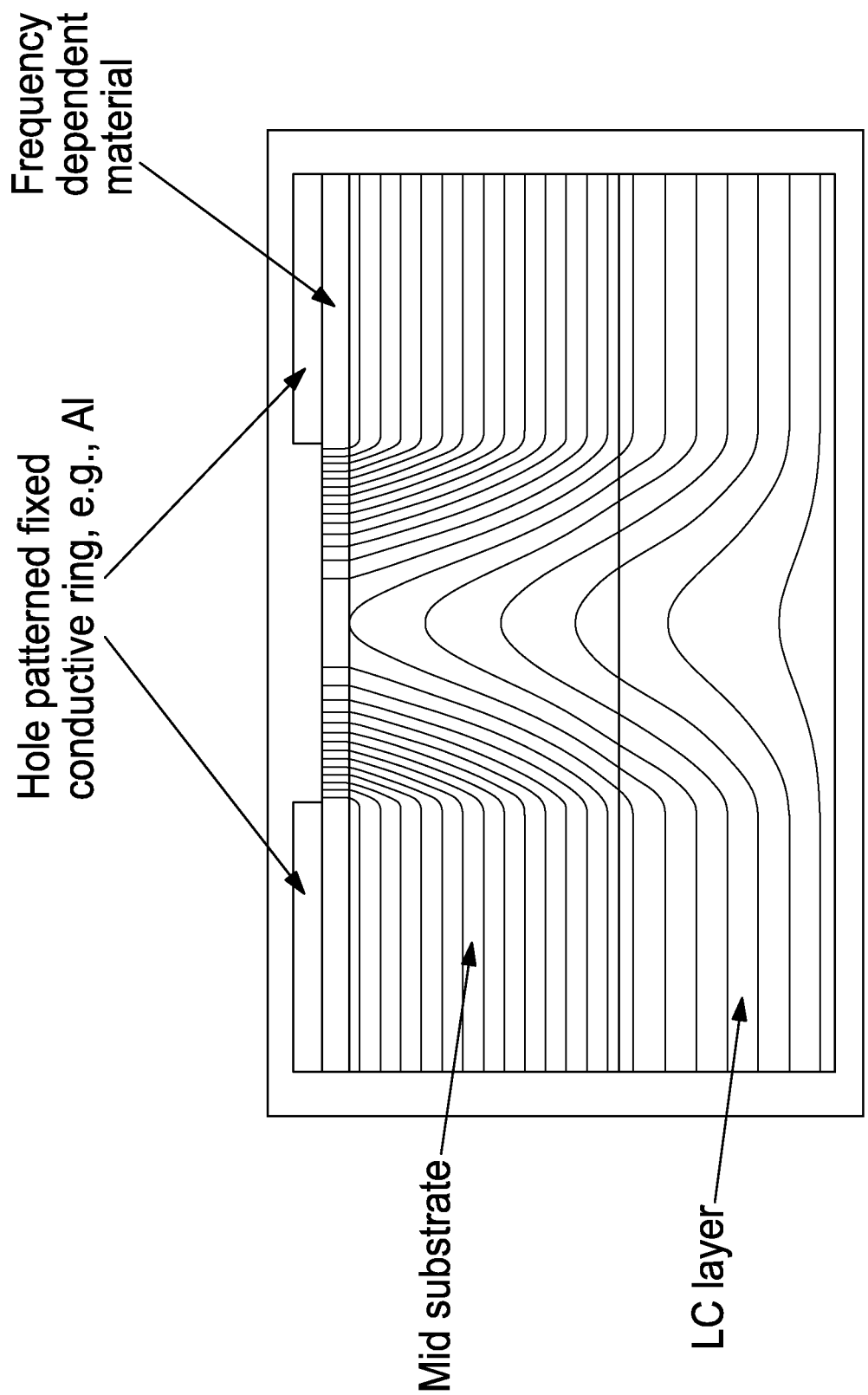
FIG. 6 is a graphical view showing equipotential planes for the configuration of FIG. 5A when using a drive signal having a relatively high frequency.
Figure 7:
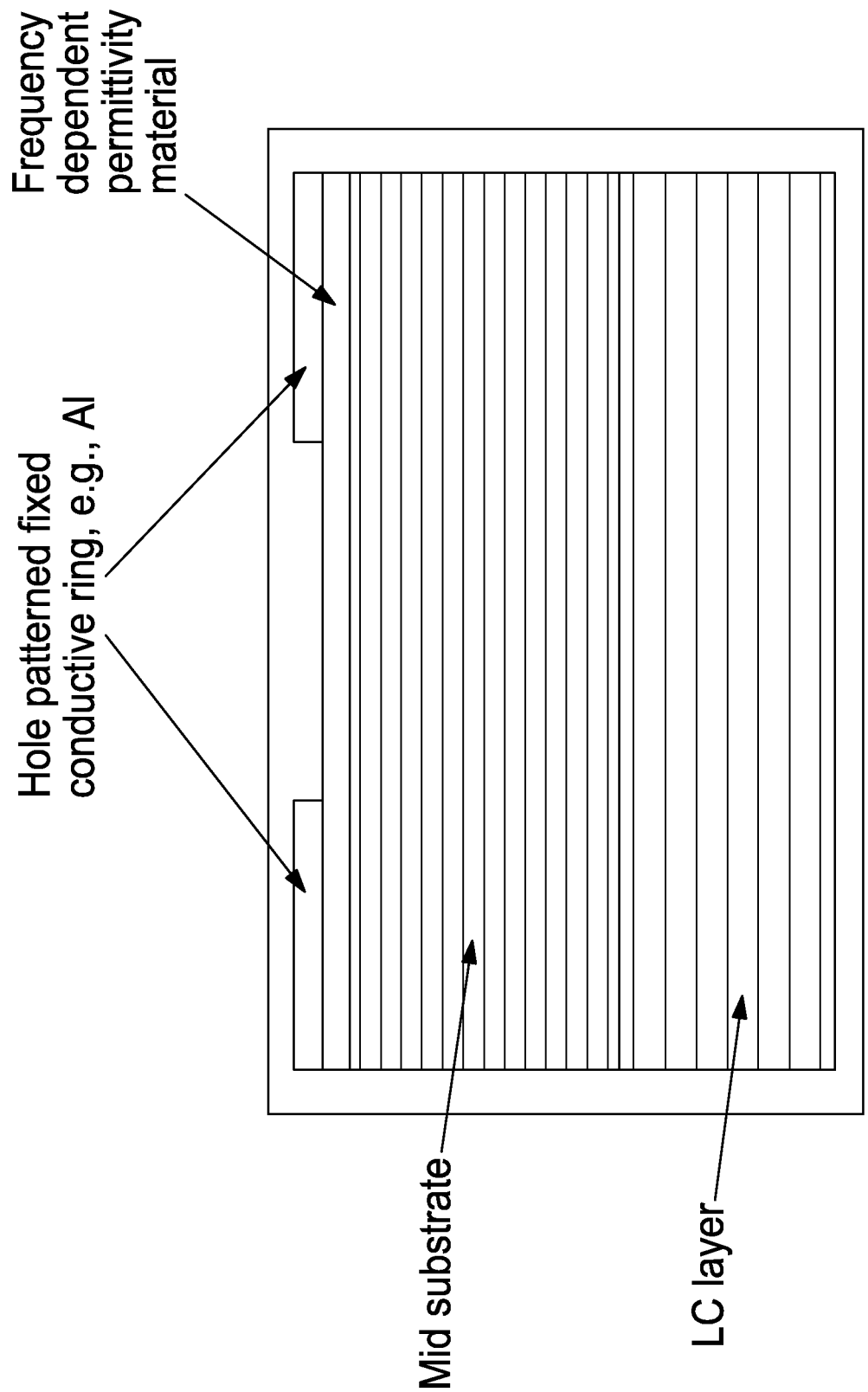
FIG. 7 is a graphical view showing equipotential planes for the configuration of FIG. 5A when using a drive signal having a relatively low frequency.

FIGS. 6 and 7 illustrate corresponding equi-potential planes for the configuration of FIG. 5A. As shown, in FIG. 6, the use of a moderate/high frequency driving signal (in this case 3 kHz at 20 V) creates a moderate amount of charge movement in the frequency dependent layer that generates a particular electric field, shown in the figure as a smooth gradient. Necessarily, the frequency range selected depends upon the parameters of the frequency dependent material used. As shown in FIG. 7, the use of a relatively low frequency driving signal (in this case 100 Hz at 20 V) results in more movement of charges in the frequency dependent layer. This flattens the electric field profile, introducing correspondingly uniform director reorientation, and allows one to easily avoid orientation defects, or so called disclinations. This type of profile also allows the "erasure" of the lens at low RMS voltages without necessitating a third electrode or a change in the driving voltage to very low (e.g., 0 Volts) or very high voltages (e.g., 100 Volts), which tend to reduce performance or violate voltage limits of a host device. The flat equi-potential planes correspond to a flat electric field across the diameter of the lens. Here also, the "low" frequency range depends upon the parameters of the frequency dependent material used.

Figure 8:
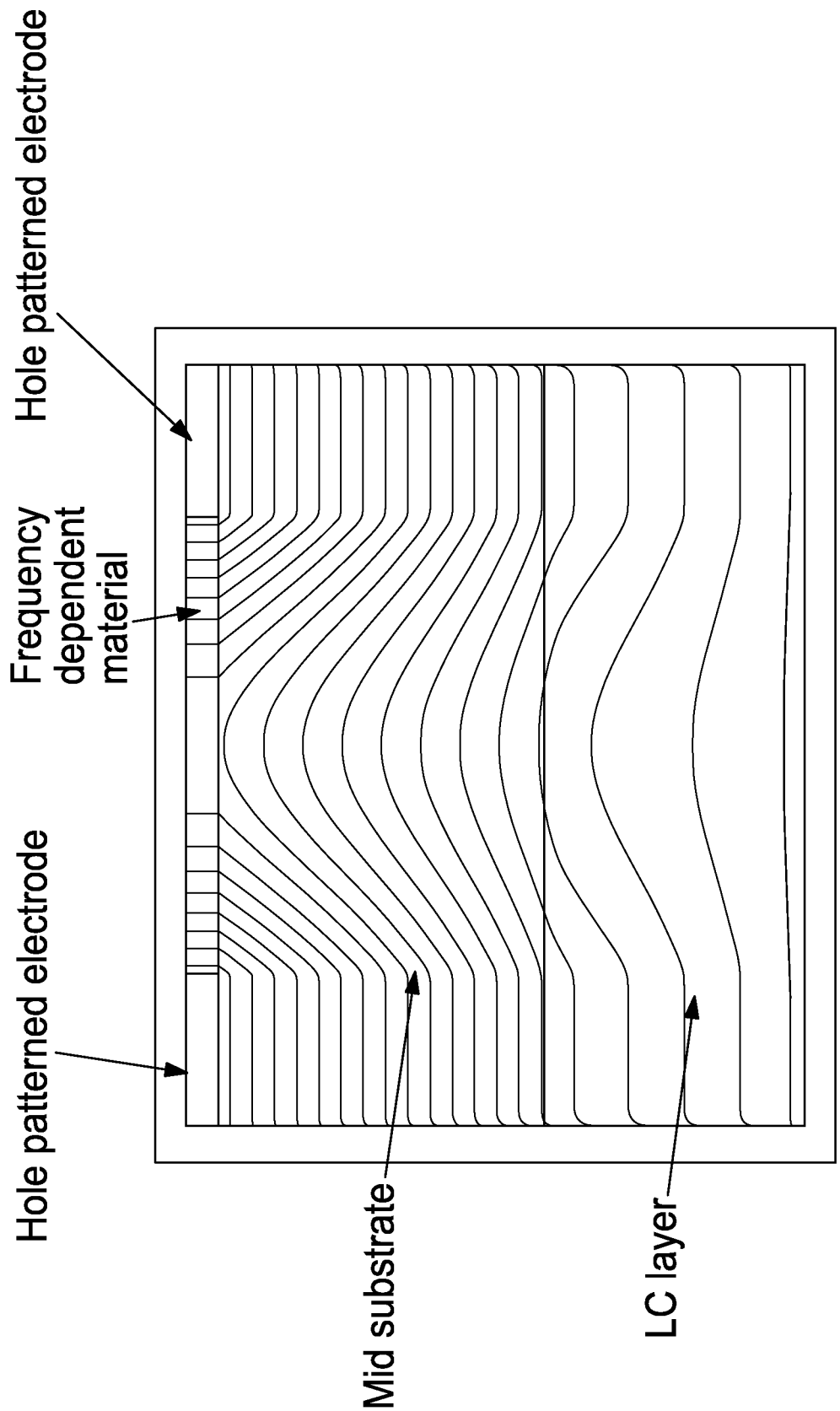
FIG. 8 is a graphical view showing equipotential planes for the configuration of FIG. 5B when using a drive signal having a relatively high frequency.
Figure 9:
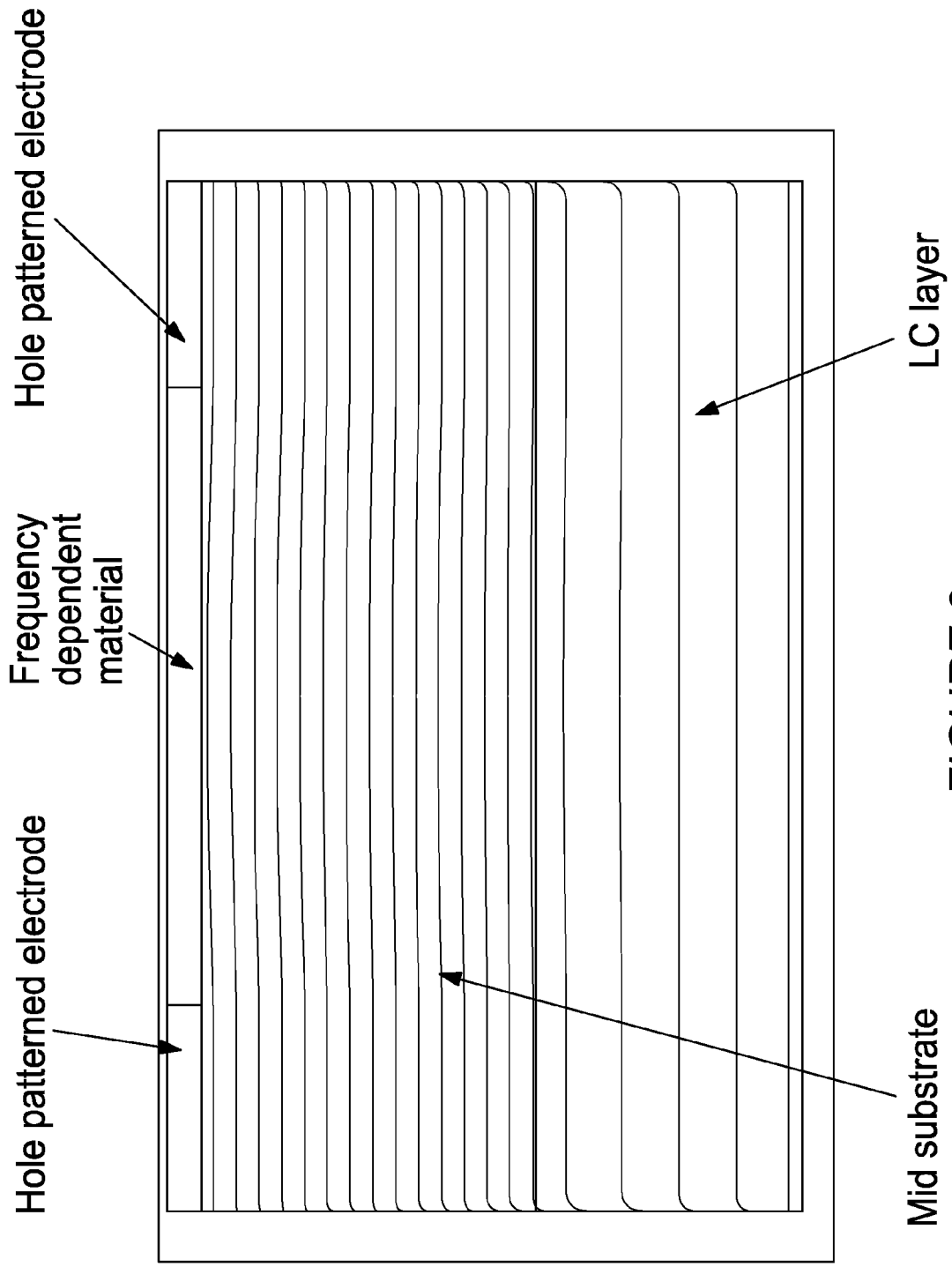
FIG. 9 is a graphical view showing equipotential planes for the configuration of FIG. 5B when using a drive signal having a relatively low frequency.

FIGS. 8 and 9 illustrate the corresponding equi-potential planes for the configuration of FIG. 5B. FIG. 8 shows the electric field profile for the arrangement of FIG. 5B given a drive voltage having a frequency of 700 Hz at 25V. This relatively high frequency voltage creates a moderate charge movement in the frequency dependent material that results in a spatially variable electric field profile having a smooth variation, as indicated by the figure. In contrast, a low frequency drive signal (e.g., 100 Hz at 25V) produces a relatively flat spatial distribution of the electric field, as shown in FIG. 9.

FIGS. 10A to 10E illustrate an experimental demonstration of the tunable LC lens (TLCL) effect for the cell configuration shown in FIG. 5A. To obtain the images shown, a tunable lens with a single liquid crystal layer is placed (at 45) between two cross polarizers. FIG. 10A demonstrates the uniform profile of LC alignment before excitation with a control voltage. FIG. 10B shows the uniform profile of LC orientation when excited by a voltage applied to the electrodes at a relatively low excitation frequency. The uniform electric field profile generated by this low frequency excitation gives the corresponding uniform profile of LC orientation without a lensing effect. The increase of voltage from 0 V (FIG. 10A) to 35 V (FIG. 10B) changes the orientation of the liquid crystals, but does not create a gradient of orientation, so there is no lensing effect. FIGS. 10C-10E show the operation of the lens at driving frequencies where the charge mobility of the frequency dependent permittivity layer is moderate. Thus, at 1.1 MHz, 10 $V_{RMS}$ (FIG. 10C) many interferential rings show the presence of a gradient and corresponding lens effect. The increase of voltage to 35 $V_{RMS}$ (FIG. 10D) partially decreases that gradient and, correspondingly, the optical power of the lens (less rings). As shown in FIG. 10E, a similar effect may be obtained if the voltage is the same but the frequency is reduced to the point where the charge mobility of the frequency dependent layer is higher (approaching the situation shown in FIG. 10B).

Figure 11B:
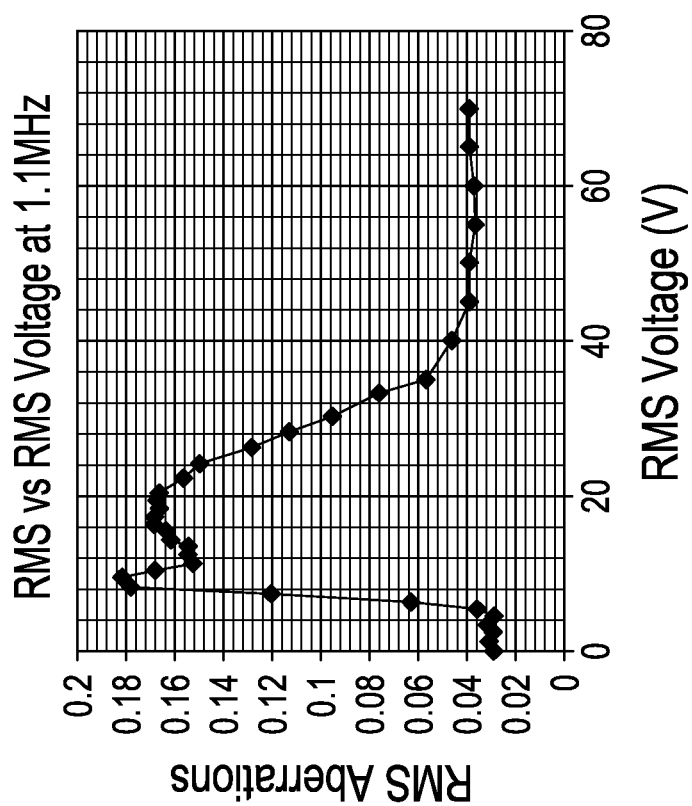
FIG. 11B shows graphically experimental data on RMS aberration versus RMS voltage for the configuration like that of FIG. 5A.
Figure 11A:
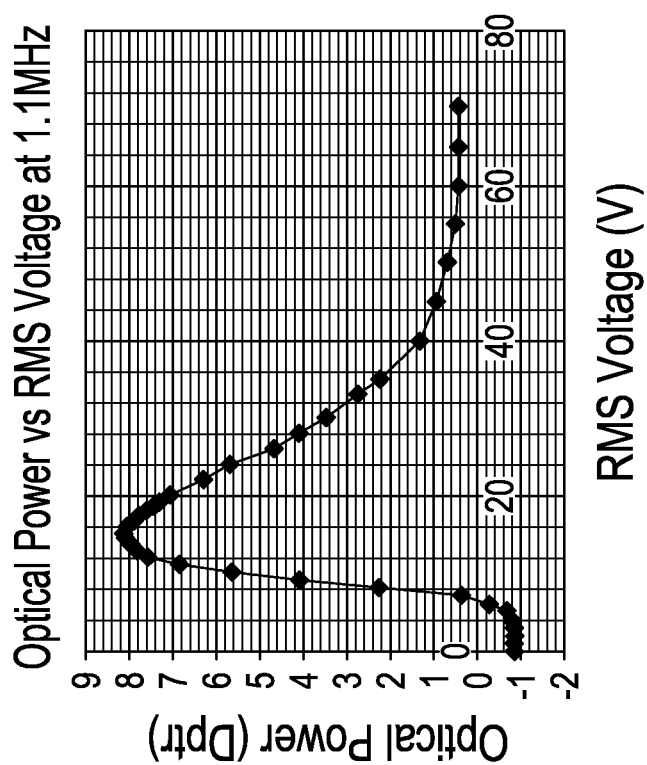
FIG. 11A shows graphically experimental data on optical power versus RMS voltage for the configuration of FIG. 5A.

FIGS. 11A and 11B show experimental data (Shack-Hartmann data) on the optical power and RMS aberrations, respectively, vs. RMS voltage in an amplitude modulation regime, for the cell configuration shown in FIG. 5A. In this example, a drive voltage of 1.1 MHz is applied to a LC lens having the FIG. 5a configuration, and the magnitude of the drive voltage is varied. The smooth change in optical power is clearly evident from FIG. 11A, while FIG. 11B demonstrates the excellent (very low) aberration levels that are obtained using a simple voltage control without any additional frequency adjustment. As shown, even at nine Diopters of optical power, the aberrations are below 0.18 micrometers. However, it should be noted that the "erasure" of the lens by increasing voltage is not efficient. Even at $V>70V_{RMS}$ there is a "residual optical power" of about 1.5 Diopters, making frequency control that much more attractive.

Those skilled in the art will recognize that the figures showing the different embodiments of the invention, such as FIGS. 4A-5B, are schematic and not to scale. Thus, while the frequency dependent layer is shown as being relatively thick as compared to other layers, it may actually be quite thin and used to dynamically create an effective electrode profile based on the location of the frequency dependent material. The "extension" of an electrode may also be in either or both of a direction parallel to, or a direction perpendicular to, an optical axis of the lens. Thus, for example, in the structure of FIG. 5B, a voltage between the hole patterned electrode 504 and the flat electrode layer 523 will, in the absence of any significant charge mobility in the frequency dependent layer 506, create a non-uniform electric field across the LC layer 521. This non-uniform field might, for example, give a desired lensing profile to the LC layer. However, when a driving voltage is applied that has a frequency for which there is a significant amount of charge mobility in the frequency dependent layer, the effective electrode structure is extended into the "hole" region in the center of the hole patterned electrode, thus creating an effective electrode that is flat across the entire structure. This "horizontal" extension of the hole patterned electrode changes the electric field profile to be uniform as a result of the two uniform electrode structures. This uniform field has a uniform reorienting effect on the liquid crystal molecules so that any lensing effect is erased.

Within a frequency range between the relatively high and relatively low frequencies discussed above, the frequency of the driving voltage may be adjusted so as to create a gradually changing optical parameter of the LC layer. An example of this is to create a lens with an optical power that can be varied between a minimum and a maximum by changing the frequency of the driving voltage. Prior art tunable LC lenses use a driving voltage of a constant frequency and adjust the voltage level to change the optical properties of the LC layer. Thus, changing the voltage between a flat electrode and a hole patterned electrode (like that of FIGS. 5A and 5B) can change an optical power of a lens, but with fixed electrode structures like those of prior art systems, there is no frequency tuning possible and no way to do complex shaping of the electric field profile, such as is available with the present invention.

Another problem with prior art systems having patterned electrodes is the effect of "disclination." In a typical LC lens, the LC molecules are all provided with a common pretilt angle so that they are aligned at a zero voltage. When using voltage tuning of a lens having a patterned electrode, the increasing voltage creates nonuniform electric field lines that cause some of the LC molecules to realign differently than others which experience the same electric field strength. These disclinations cause aberrations in the lens but they can be removed by aligning all of the molecules with a very high voltage that erases the lens, before reducing the voltage back to the appropriate range for providing a desired optical power. However, in an embodiment such as that of FIG. 5B, the initial application of a relatively low frequency excitation voltage creates an effective uniform electrode profile and corresponding electric field profile. By raising the voltage to a level beyond a threshold voltage, the molecules will all be reoriented in a common angular orientation (in which state, there is zero optical power). The frequency of the excitation voltage may then be increased to reduce the charge mobility in the frequency dependent material. As the frequency increases, the nonuniform profile of the electric field develops, creating a desired lensing effect. However, since all of the LC molecules were prealigned by a low frequency voltage above the threshold, no disclinations occur when the lens profile is introduced.

Figure 12B:
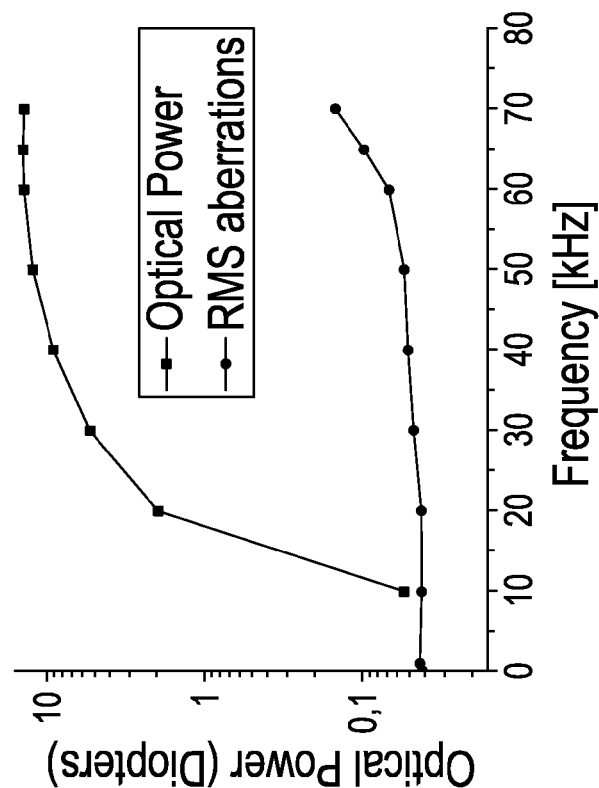
FIG. 12B shows graphically experimental data on optical power versus frequency for a configuration like that of FIG. 5A, as well as a corresponding indication of aberration over the same frequency range.
Figure 12A:
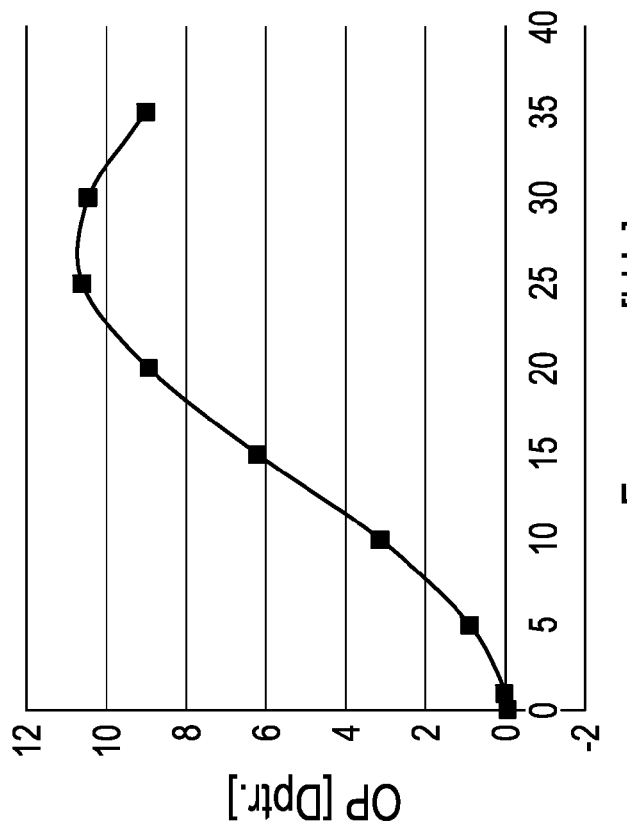
FIG. 12A shows graphically experimental data on optical power versus frequency for a configuration like that of FIG. 5A.

FIG. 12A shows a graphical example of how frequency tuning may be accomplished by a lens structure according to the present invention. Although the curve shown extends to zero frequency, as mentioned above, the initial voltage provided to the lens may be at a low AC frequency, such as 100 Hz. At this frequency, the optical power is low because all of the LC molecules are essentially commonly aligned. Without changing the voltage of the signal, the frequency may then be increased and, as shown in the figure, the optical power rises as the nonuniform electric field begins to develop a lens characteristic in the LC layer. In this example, a maximum optical power is reached at about 25 kHz, after which it begins to reduce again. It can thus be seen how frequency tuning may be used in place, or in addition to, voltage tuning of an LC lens. FIG. 12B is similar to FIG. 12A in that it shows another lens structure that is frequency tunable, in this case over a higher frequency range. However, FIG. 12B also shows the very low RMS aberration level produced over the active optical power range.

Figure 13:
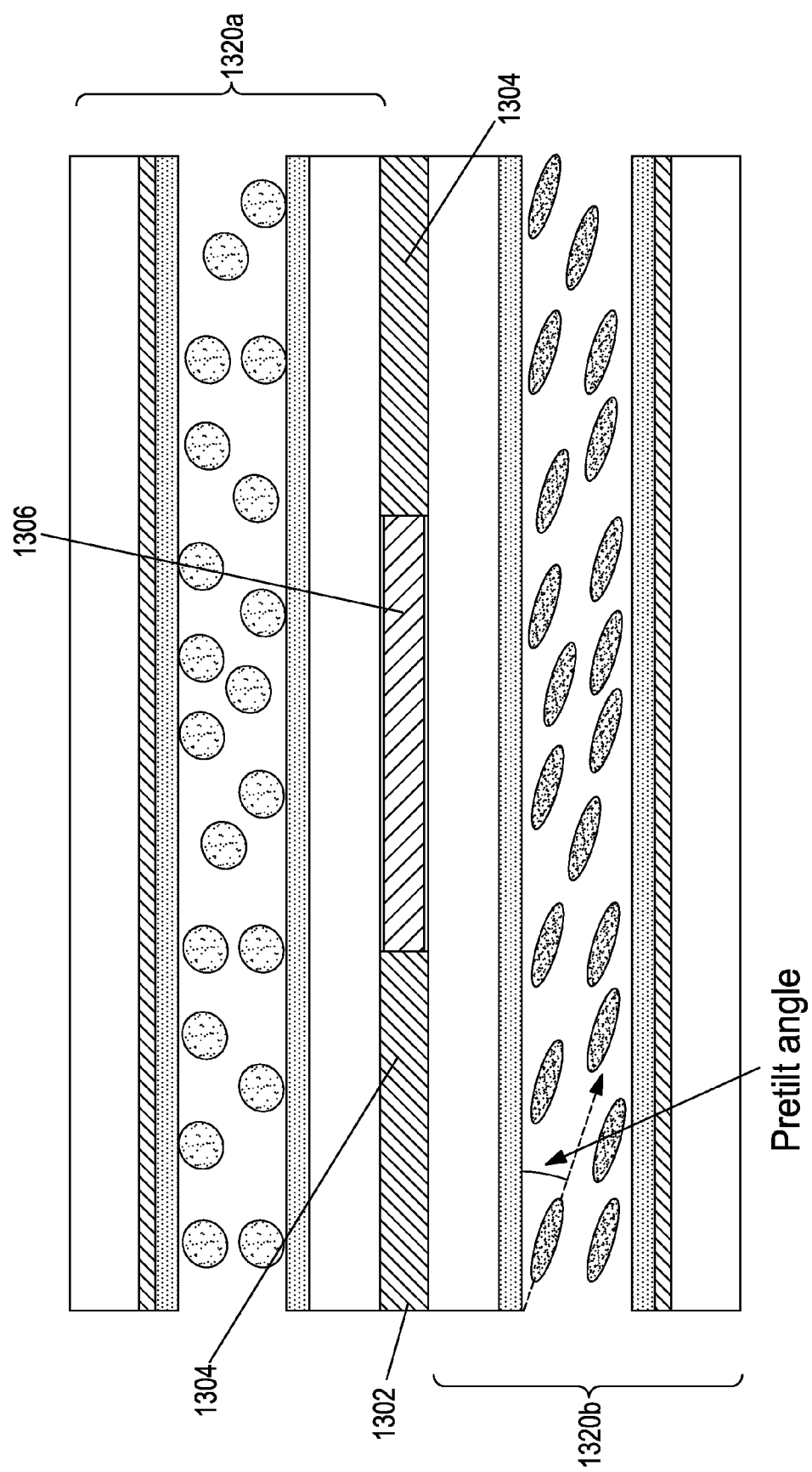
FIG. 13 is a schematic view of a structure according to the present invention in which a gradient control structure having a hole patterned electrode and frequency dependent material sandwiched between two LC cells.

In the case of gradient index liquid crystal lenses that use spatially uniform low-angle pre-tilt alignment layers, the liquid crystal material undergoes a reorientation from a ground state through to a desired maximum reorientation in a direction of the electric field. When the pre-tilt angle is close to 90 degrees with respect to the electric field, the ability of the field to reorient LC molecules is weakest. Therefore, it can be advantageous in some designs of tunable GRIN optical devices to select as the tunable range, orientations of liquid crystal that avoid the orientations at which the electric field has a weak ability to reorient the liquid crystal. This can be done by applying a uniform electric field that results in reorientation of the liquid crystal away from the ground state to thus have a new, more responsive, "ground" or base state and then on top of that uniform field, applying a modulated electric field to form the lens or other optical device. Alternatively, this can be achieved by having the variation in index of refraction resulting from an orientation close to alignment with an electric field (the lowest optical power) and a spatially modulated orientation deviating from that uniform field alignment in a direction of a ground state (the higher optical power). This avoids aberrations caused by the weak interaction between the electric field and the liquid crystal in the ground state. Thus, it will be appreciated that the present invention can use a frequency dependent material to form such a suitable electric field FIG. 13 illustrates an additional variant of a tunable LC lens using a hidden electrode to provide spatial modulation of the electric field via frequency tuning. In FIG. 13, the structure that controls the electric field gradient is composed of a hole patterned peripheral electrode 1304 of fixed (preferably low) electrical resistance, while the central disk-shaped region in the center of this electrode (on the same plane) and the area around that plane is filled by a frequency dependent material 1306. This gradient control structure (GCS) 1302 is sandwiched between two LC cells 1320a, 1320b having directors (average orientation of long molecular axis of LC) in the orthogonal planes. For example, one of the directors might be in the XZ plane with the second director being in the YZ plane, the normal of the sandwich being the Z axis. In this embodiment, one of the traditionally used "internal" electrodes of LC cells is removed to allow the formation of the electric field gradient within the LC layer. The position of the GCS 1302 may be advantageously used to combine multiple functions for the GCS, such as electrode, heater, and sheet resistance (of frequency dependent material) or temperature sensor. The heater and the temperature sensor may be used together to help keep the temperature of the device at an optimal level. Additional patterning of the electrode 1304 could also be used to measure the electrical properties of the material 1306, such as sheet resistance, which plays a crucial role in the formation of the electric field profile, and which might change part-to-part over time with aging. In this context, the GCS may be made in different forms and from a special alloy (e.g., Mo/Al) to perform these multiple functions. Providing the layer that determines the spatial modulation of the electric field in the middle of the assembly has the advantage that it equally affects the electric field in the layer or layers below the modulation layer as above. By providing a middle electrode, the separation between electrodes is essentially halved, and in spite of the need to drive two electrode cells, the voltage and part-to-part variations are less significant.

In the above embodiments, the structure of the TLCL is essentially all flat, namely, the frequency dependent layer, electrode layer (ITO or the like), LC layer, etc. are flat. The electric field shaping is either a result of patterning the electrode layer or the complex impedance of the frequency dependent layer, or both. It is however possible to use other structural configurations to provide the electric field shaping.

By way of a non-limiting example, the dimensions of a variable focus flat refractive lens embodiment of the invention will be provided. It will be appreciated that dimensions can vary greatly depending on design choice and the choice of materials. The cover substrate can be made of glass with a thickness of 50 to 100 microns. The hole-patterned electrode can be made of an opaque metal such as aluminum, or it can be made of Indium Tin Oxide (ITO) which is transparent. The thickness of the electrode can be in the range of 10 to 50 nm. The frequency dependent material can be made of titanium oxide with a thickness of about 10 nm. Titanium oxide has semiconductor properties that change with control signal frequency.

The frequency dependent permittivity (or complex dielectric) material can comprise a variety of materials as set out in the following. The essential property of such a material is that it can exhibit a weak conductivity that will provide for charge mobility that is variable as a function of the frequency of the control signal. This allows frequency tuning of the shape of the electric field to control optical quality or power, as well as frequency tuning of the on/off operation of the LC optical device.

Top and bottom alignment layers can be polyimide layers of about 20 to 40 nm thick that are rubbed to yield surfaces that induce a liquid crystal ground state alignment with a low angle pre-tilt. The layer of liquid crystal can be 5 to 30 microns thick, as an example. Such a single layer of liquid crystal with spatial modulation form a gradient index lens focuses a single linear polarization of light. In the embodiment of FIG. 13, a hole-patterned electrode 1304 and frequency dependent material 1306 are placed on the top substrate, and this electrode is shared between two LC layers or cells 1320a and 1320b.

It will be appreciated that a two to four layer TLCL can be assembled in this manner that can have a lens diameter of about 1 to 3 mm with a thickness of about 460 microns. The optical power of the TLCL can be roughly from 8 to 16 diopters, which is suitable for most camera applications. One TLCL can provide variable focusing, while two can provide a zoom lens.

Figure 14:
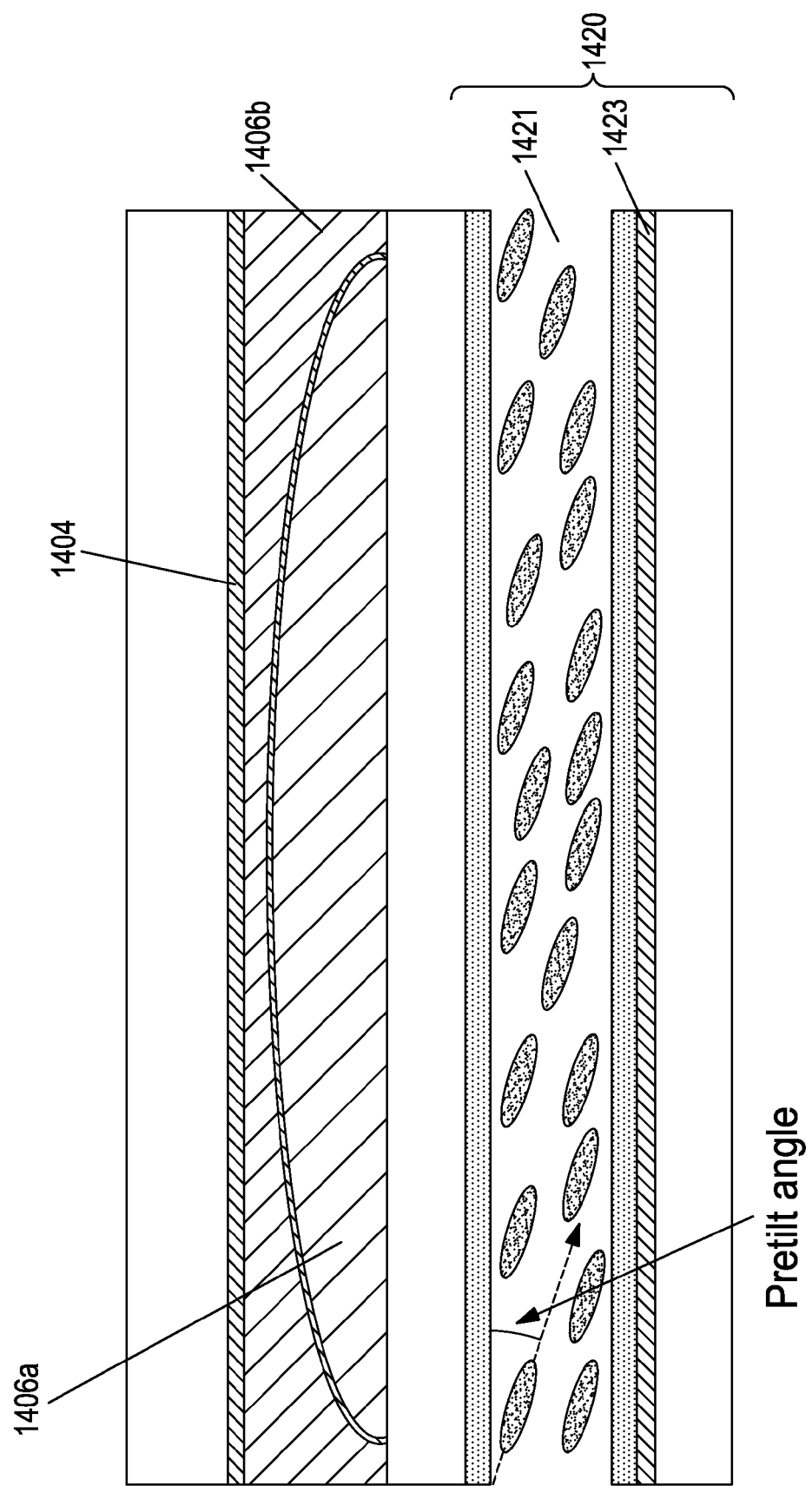
FIG. 14 is a schematic view of a structure in which two different frequency dependent materials are located in a common layer with a non-planar geometry.

In the embodiment of FIG. 14, two different frequency dependent materials are arranged to have a non-planar geometry. The different complex dielectric constants of the materials allow the shaping of the electric field as a function of control signal frequency to affect the effective 3D shape of the electrode. It is preferred that the two materials have their optical index of refraction matched, so that the non-planar geometry does not interfere with optical transmission and refraction, however, a lens system can also be designed to account for any effect of an electrode structure that would have an image altering effect.

In this embodiment, the two frequency dependent materials are located in the same layer, and occupy different regions of that layer. A first material 1406a has a lens-like shape and is centered relative to an optical axis of the lens. A second frequency dependent material 1406b occupies the remainder of the layer and has a different frequency dependent characteristic than the first material. Thus, as an electric field is applied to the layer, the response of the two materials 1406a, 1406b will be different. In this embodiment, both the upper electrode 1404 and the lower electrode 1423 are planar and parallel to one another, with the liquid crystal 1421 in between. As the frequency of the voltage potential between the two electrodes 1404, 1423 is changed, the distribution of the electric field applied to the liquid crystal will change. This allows the optical characteristics of the LC cell 1420 to be changed by changing the control frequency, as the "shape" of the electric field will be dictated by the relative location of the two materials 1406a, 1406b and their relative permittivities.

If, for example, an excitation frequency used with the FIG. 14 embodiment was such that the movement of charges was very limited, and the dielectric properties of materials 1406a and 1406b are similar, the electric field that is seen by the LC layer will be essentially uniform. This will result in a uniform reorientation of the LC molecules without any lensing effect and without disclinations. However, if a frequency is applied for which the movement of charges is substantial in the layer 1406b (but insignificant in layer 1406a), the electric field experienced by the LC layer will be stronger on the periphery, thus creating a gradient of reorientation and corresponding lensing effect. Moreover, the transition between these two states can be done smoothly and without disclinations. This is an important advantage provided by frequency control of the field profile, one which is not possible to obtain using only voltage control that changes the amplitude of the excitation field but not its profile.

Those skilled in the art will recognize that the relative shapes of the materials 1406a, 1406b and their permittivities may be selected as appropriate to a particular application. Moreover, a complex frequency dependent layer such as this may make use of more than two different frequency dependent materials. In addition, as with previous embodiments, a tunable lens using this construction may be tuned by varying the frequency of the drive voltage, or by varying the magnitude of the voltage having a particular frequency, or by a combination of both adjustments.

Figure 15:
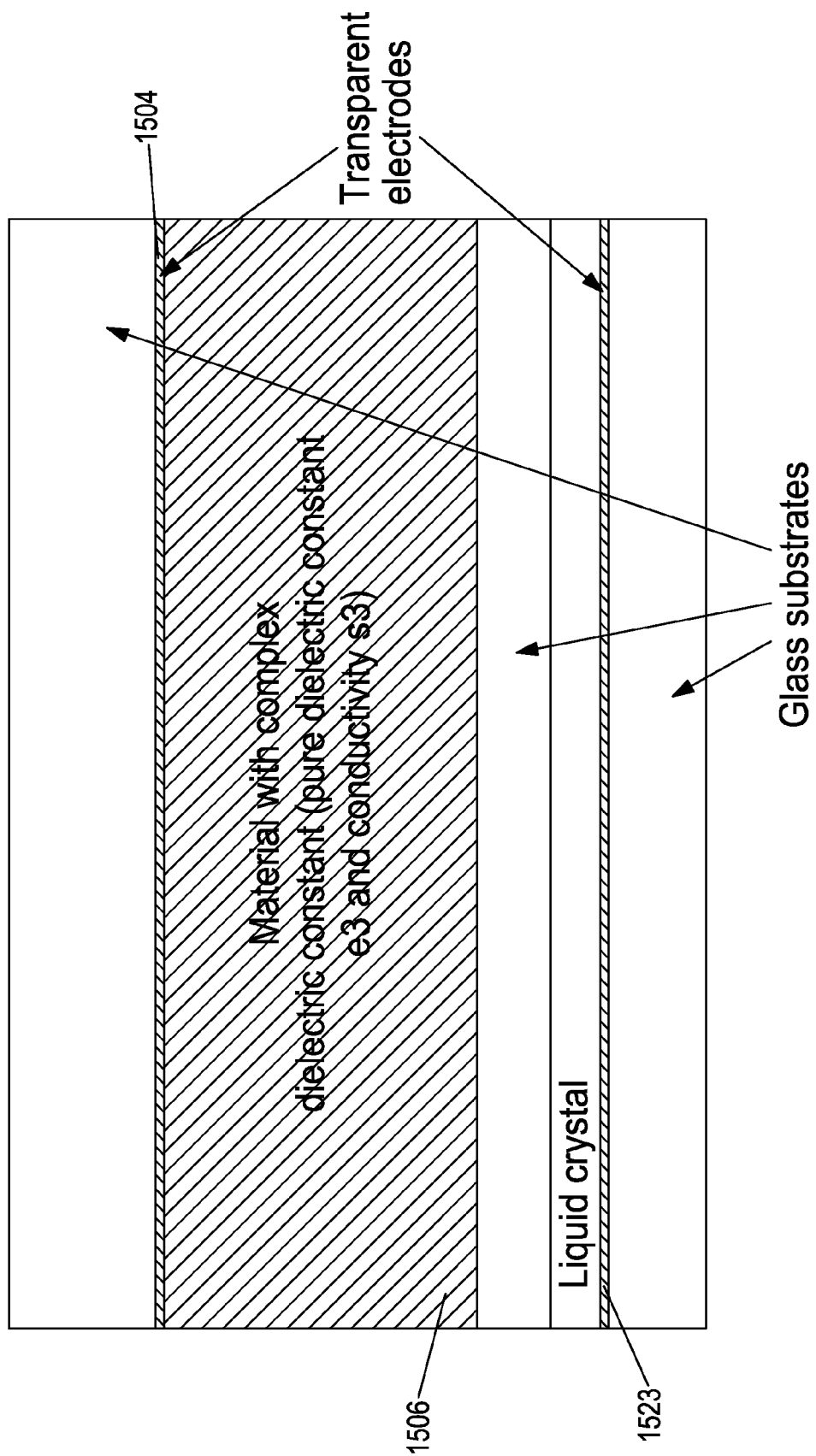
FIG. 15 is a schematic view of a structure in which a frequency dependent material has a gradient of frequency dependent characteristic.

In the embodiment of FIG. 15, a frequency dependent layer 1506 is provided that has a gradient of cross linking of a conductive polymer or gel, or another frequency dependent material, that provides a gradient of frequency-dependent charge mobility. This gradient structure can be created, for example, by a laser beam or other light (e.g., UV) or thermal source with gradient shaped intensity, a central drop and diffusion followed by polymerization, or a field induced (e.g. electrolytic) material separation followed by polymerization. In this embodiment, when the frequency of the voltage applied to the electrodes 1504, 1523 is very high, layer 1506 has little effect on the electric field, which appears as if generated by the uniform electrode pair with no such layer in between. That is, the effective upper electrode appears to be at the actual upper (top) electrode position. However, as the frequency is lowered, the frequency dependent material begins to experience a higher degree of movement of charges within certain regions of the material. As the frequency is lowered further, more of the material begins to experience charge movement according to the gradient structure. The shape of the gradient thus dictates the manner in which an effective electrode structure develops in the material 1506 and, correspondingly, how the shape of the effective electrode changes with frequency. Since the electrode shape is directly related to the profile of the electric field, this creates a frequency tunable electric field profile and, therefore, a frequency tunable effect on the LC layer.

When the frequency is lowered enough that the frequency dependent permittivity material is fully conductive, the effective upper electrode appears to be located at the bottom of the frequency dependent permittivity layer. Thus, the effective electrode follows a shape according to the gradient within the material 1506 when at a frequency that is between a low frequency at which the frequency dependent layer is fully "conductive," and a high frequency at which the whole frequency dependent layer is essentially "non-conductive." Thus, as with the embodiment of FIG. 14, the shape of the electric field applied to the liquid crystal can be adjusted by adjusting the frequency of the electrode voltage.

Figure 16:
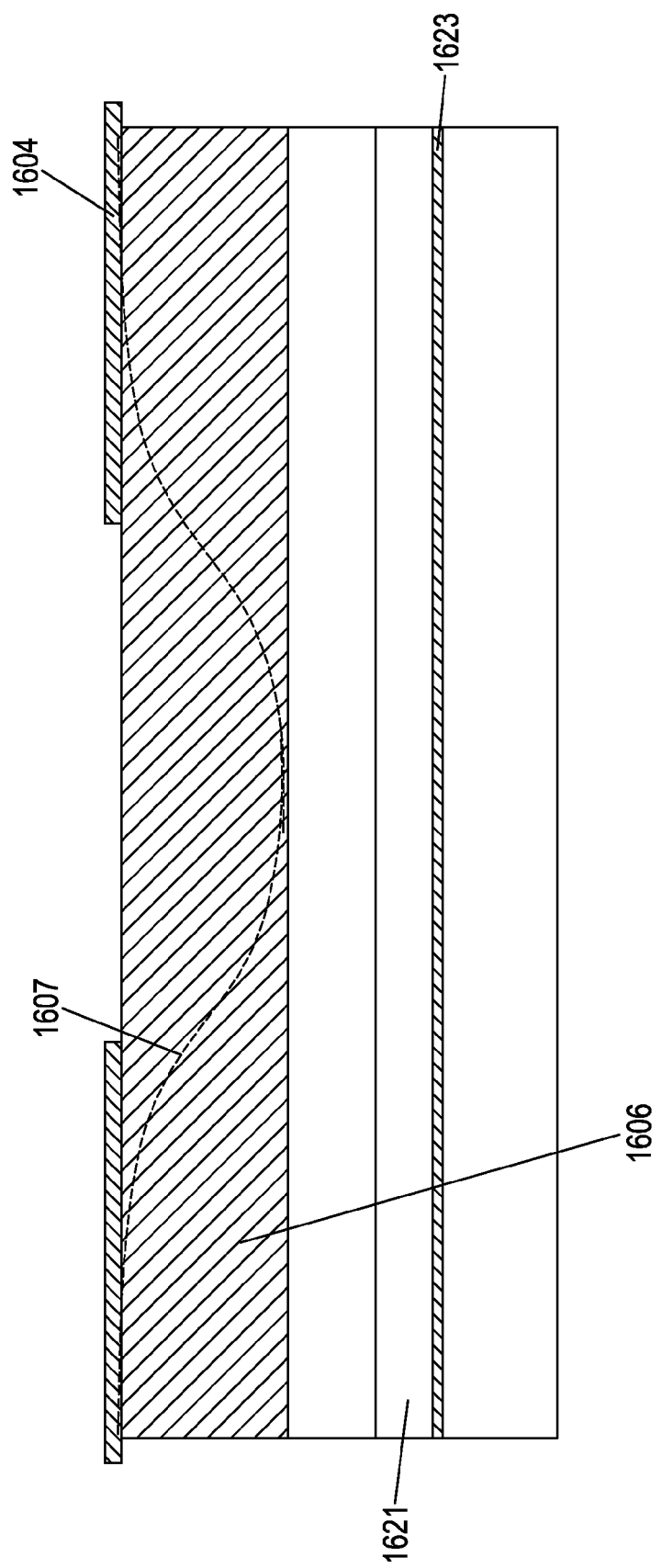
FIG. 16 is a schematic view of a structure that combines a gradient frequency dependent layer and a patterned electrode.

FIG. 16 illustrates an embodiment that combines the effect of a gradient frequency dependent layer 1606 (such as that shown in the embodiment of FIG. 15) with a patterned electrode 1604. Those skilled in the art will understand that the particular shape of the electrode 1604 and the effective frequency dependent variability of the conductive layer 1606 may be selected to provide a desired range of electric field shapes when the frequency of the electrode voltage is adjusted. The material 1606 may be, for example, a material with a complex dielectric constant of gradient form (the gradient is indicated in the figure by dashed line 1607), and has a different level of frequency dependent charge mobility in different gradient regions. The material 1606 may be constructed from one material with a gradient created therein, or from a combination of two or more materials. The material 1606 is adjacent to top electrode 1604, while an LC layer 1621 is adjacent to a bottom electrode 1623. The combination of the top electrode shape and the frequency dependent gradient structure in the layer 1606 is used to produce a desired range of effective electrode shapes and, therefore, a desired range of electric field profiles.

Figure 17:
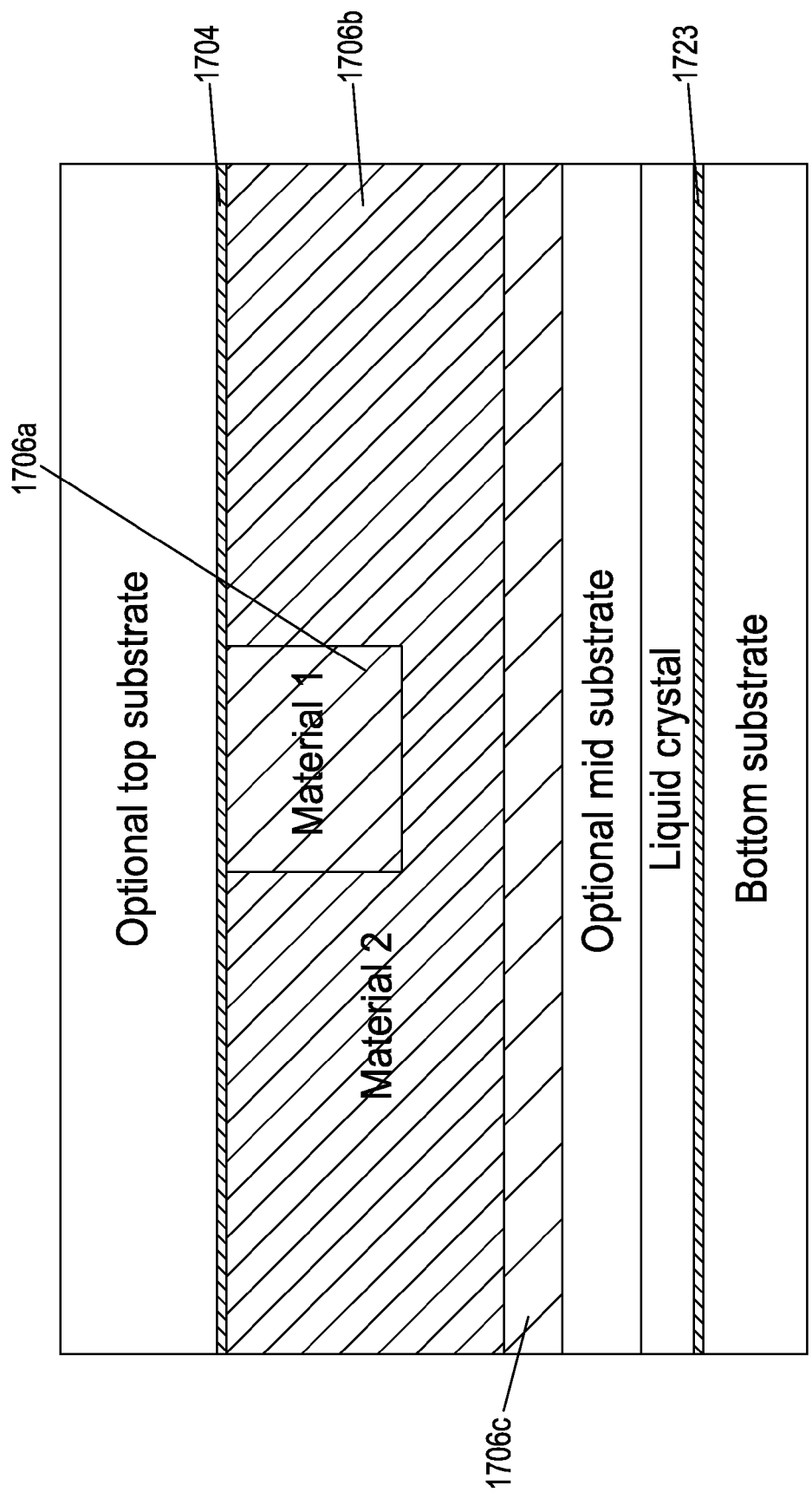
FIG. 17 is a schematic view of a structure having multiple frequency dependent materials with flat surfaces located in a common layer.

FIG. 17 illustrates another embodiment of the invention in which the electric field between planar upper and lower electrodes 1704 and 1723 is modulated by an optically transparent hidden structure of having different frequency dependent materials 1706a and 1706b, as well as a layer 1706c having a frequency dependent material with a gradient structure, like that of FIG. 15. The frequency dependent characteristics of materials 1706a and 1706b are different, and create a particular effective electrode structure in their common layer that is dependent on an applied excitation frequency. In addition, frequency dependent shaping of the electric field is done by frequency dependent layer 1706c. One advantage of this approach is that light traverses the flat surfaces of materials 1706a and 1706b, but the electric field seen by the LC layer may be flat or curved depending the frequency of the applied excitation voltage. Notably, the specific shapes and positions of the materials 1706a, 1706b, and the specific complex characteristic of the layer 1706c are selected according to a desired application. Those skilled in the art will recognize that a wide variety of different electric field shapes may be thereby created.

Figure 18:
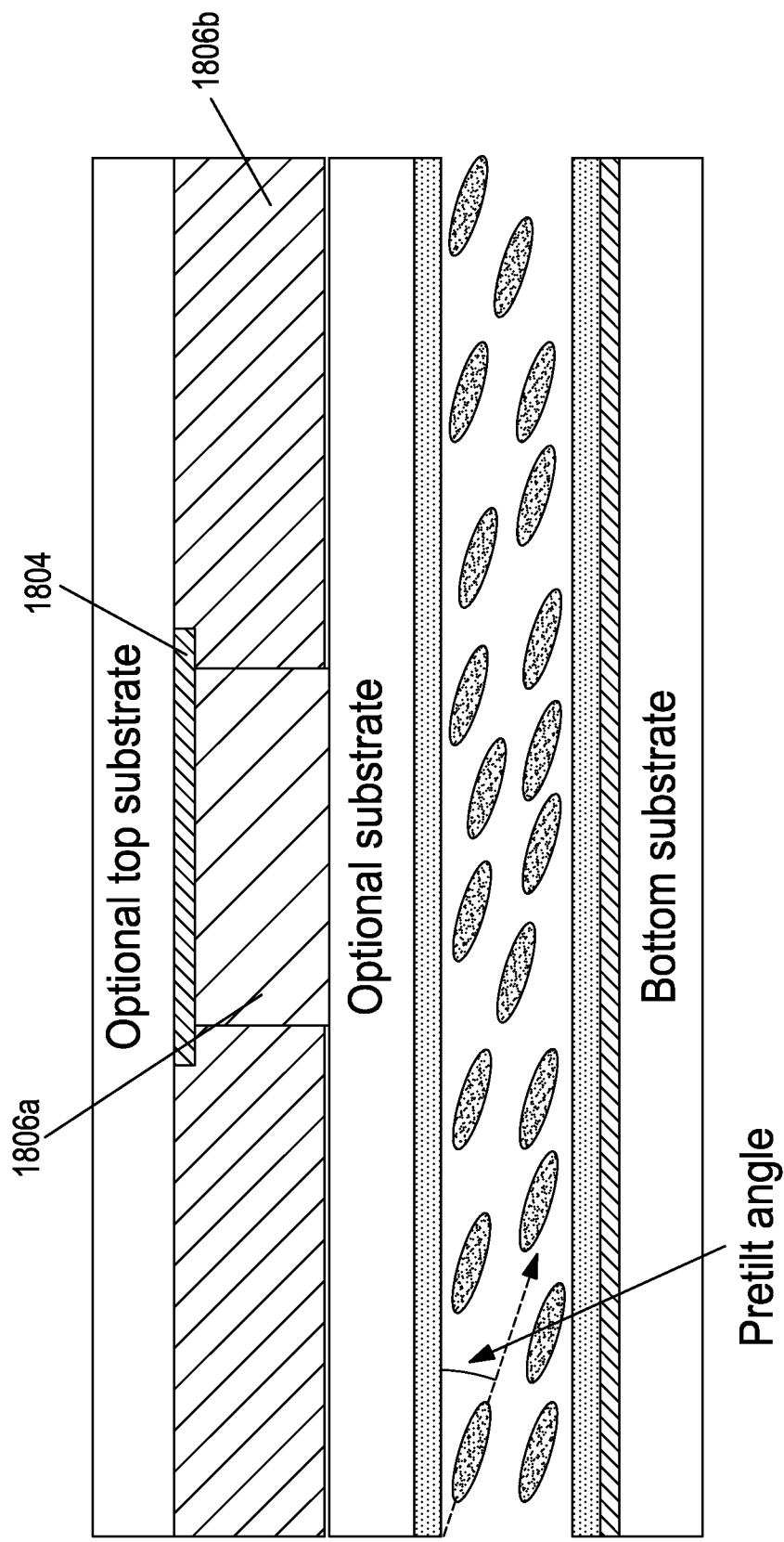
FIG. 18 is a schematic view of a structure that uses a shaped upper electrode and a frequency dependent layer having a non-conductive area.

FIG. 18 illustrates a further embodiment in which a frequency dependent material is arranged in a way to change the effective 3D shape of the electrode structure as a function of frequency. This embodiment combines the use of a shaped upper electrode 1804 (in this case disk-shaped) and a frequency dependent layer that includes a non-conductive area 1806a and a frequency dependent material 1806b. By carefully selecting the shape of the electrode 1804, the relative distribution of the non-conductive area 1806a and material 1806b, as well as the frequency dependent characteristic of the material, a desired electric field shape may be generated. Like the embodiment of FIG. 17, this embodiment benefits from the flat surfaces of the material layers, through which light easily propagates.

Figure 19A:
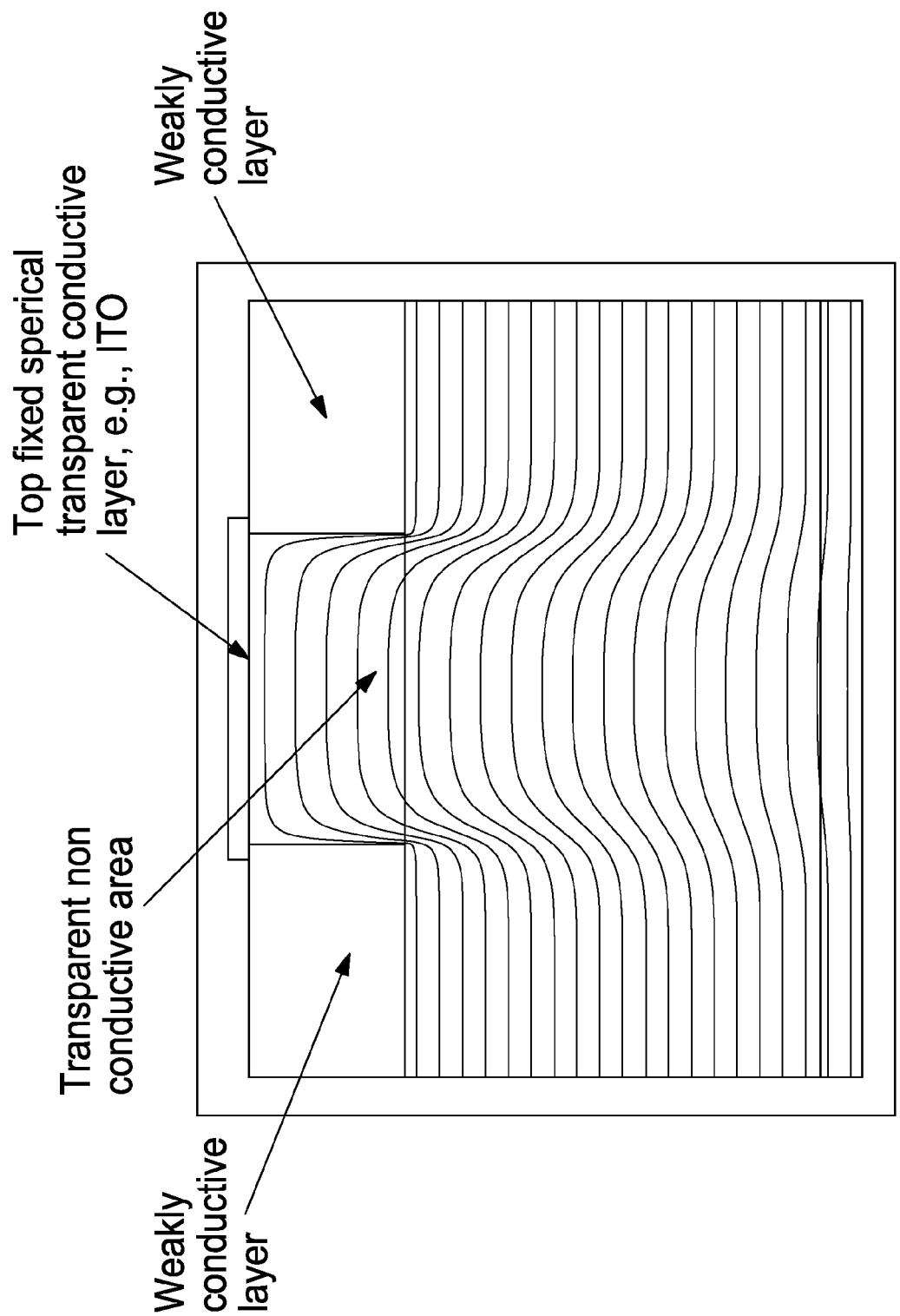
FIG. 19A is a graphical view showing equipotential planes for the configuration of FIG. 18 when using a drive signal having a relatively high frequency.
Figure 19B:
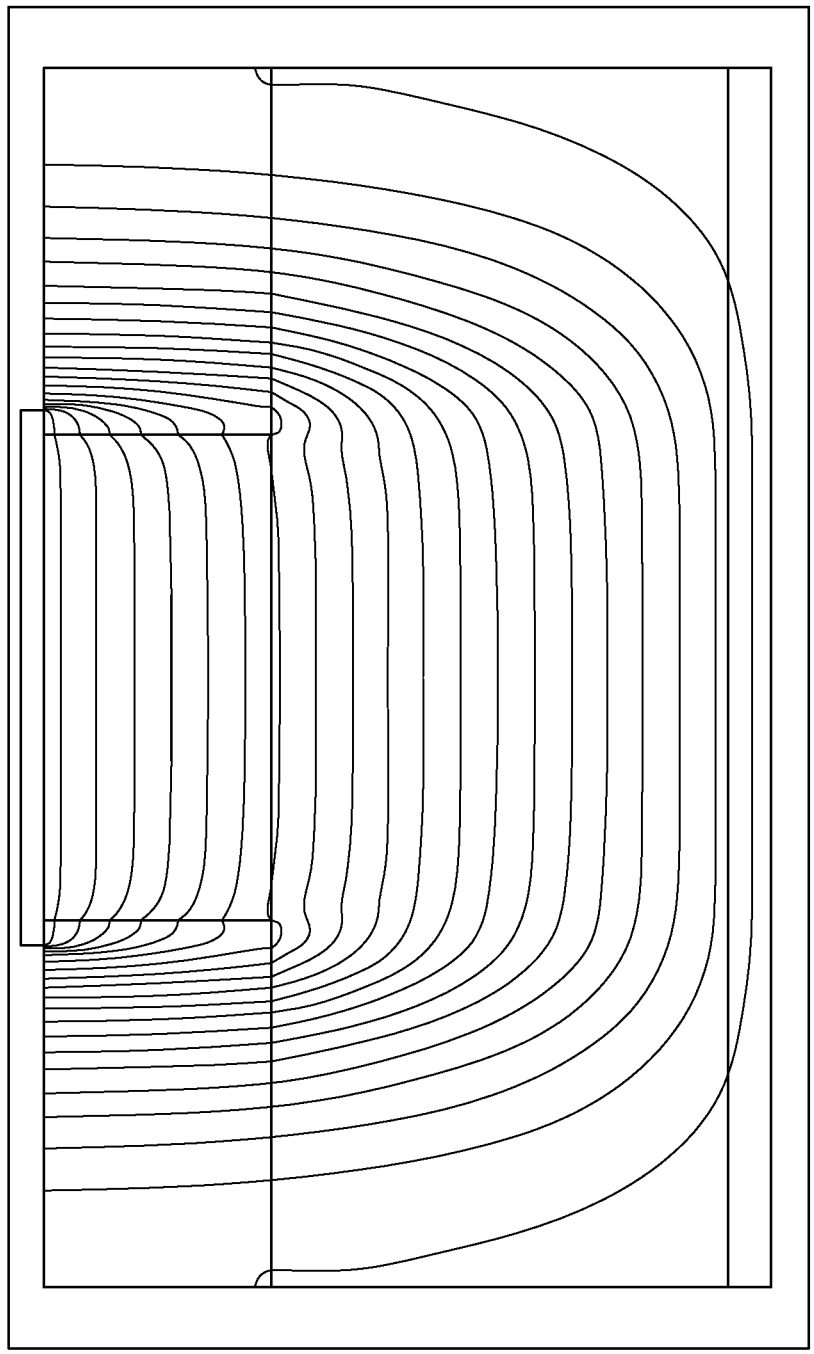
FIG. 19B is a graphical view showing equipotential planes for the configuration of FIG. 18 when using a drive signal having a relatively low frequency.

FIG. 19A illustrates the equipotential lines of the electric field resulting from the electrode structure of FIG. 18 at a relatively high frequency (in this case 10 kHz at 20V) at which the frequency dependent layer has only moderate charge mobility. The effective electric field shape in this instance appears as if generated by the central disk-shaped electrode, with no significant contribution from the frequency-dependent material. FIG. 19B illustrates the equipotential lines of the electric field resulting from the electrode structure of FIG. 18 at a relatively low frequency (in this case 100 Hz at 20V) at which the frequency dependent layer exhibits significantly more charge mobility. The effective electric field shape in this instance appears as if generated by the central disk-shaped electrode on the top of the electrode structure along with a ring electrode located at the bottom of the frequency dependent permittivity layer. It will be understood that at intermediary frequencies, the effective electrode shape will be smoother, and somewhat dome-shaped.

Figure 20:
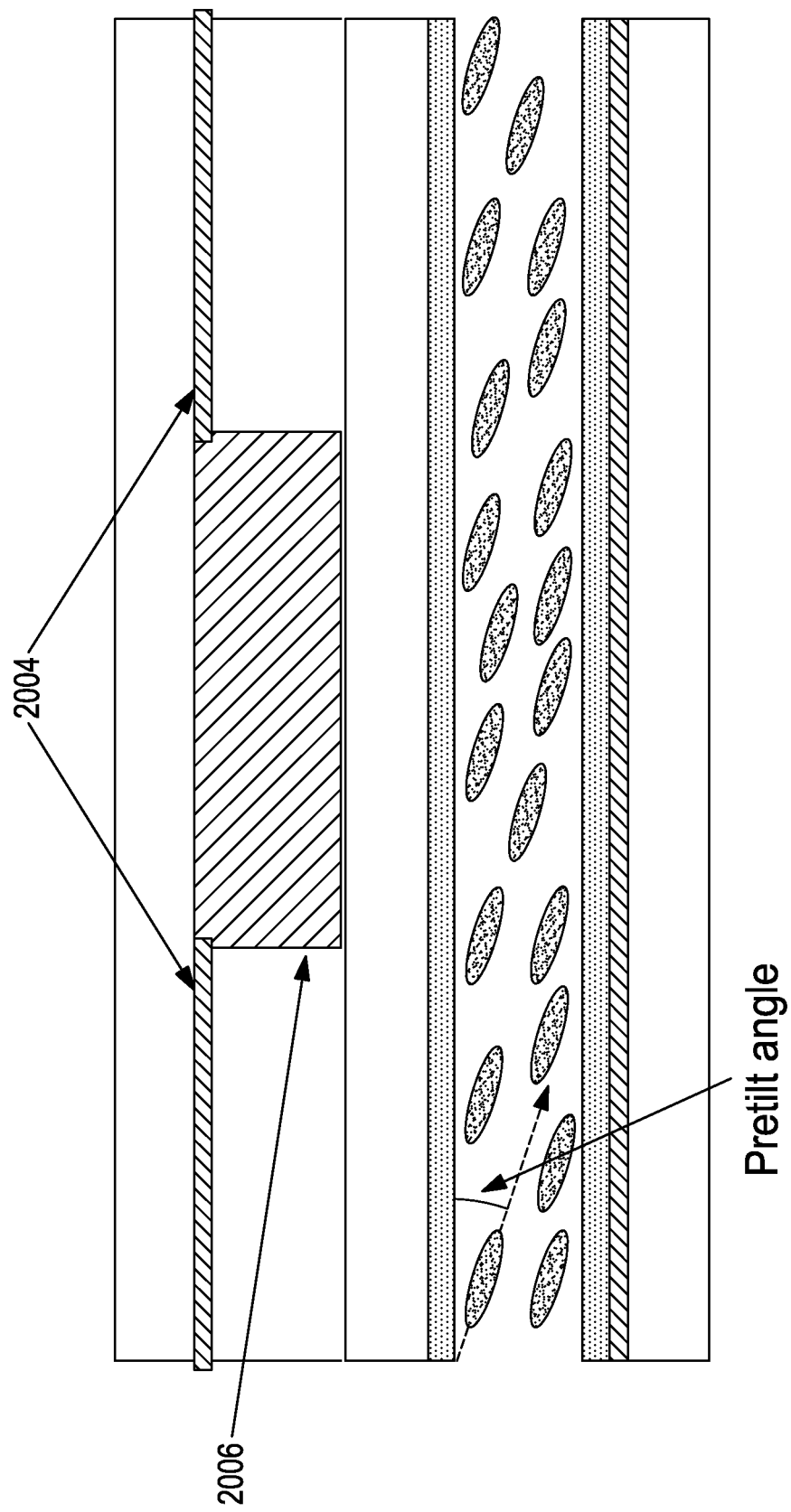
FIG. 20 is a schematic view of a structure having a hole patterned upper electrode and a frequency dependent material located below the hole of the electrode.
Figure 21A:
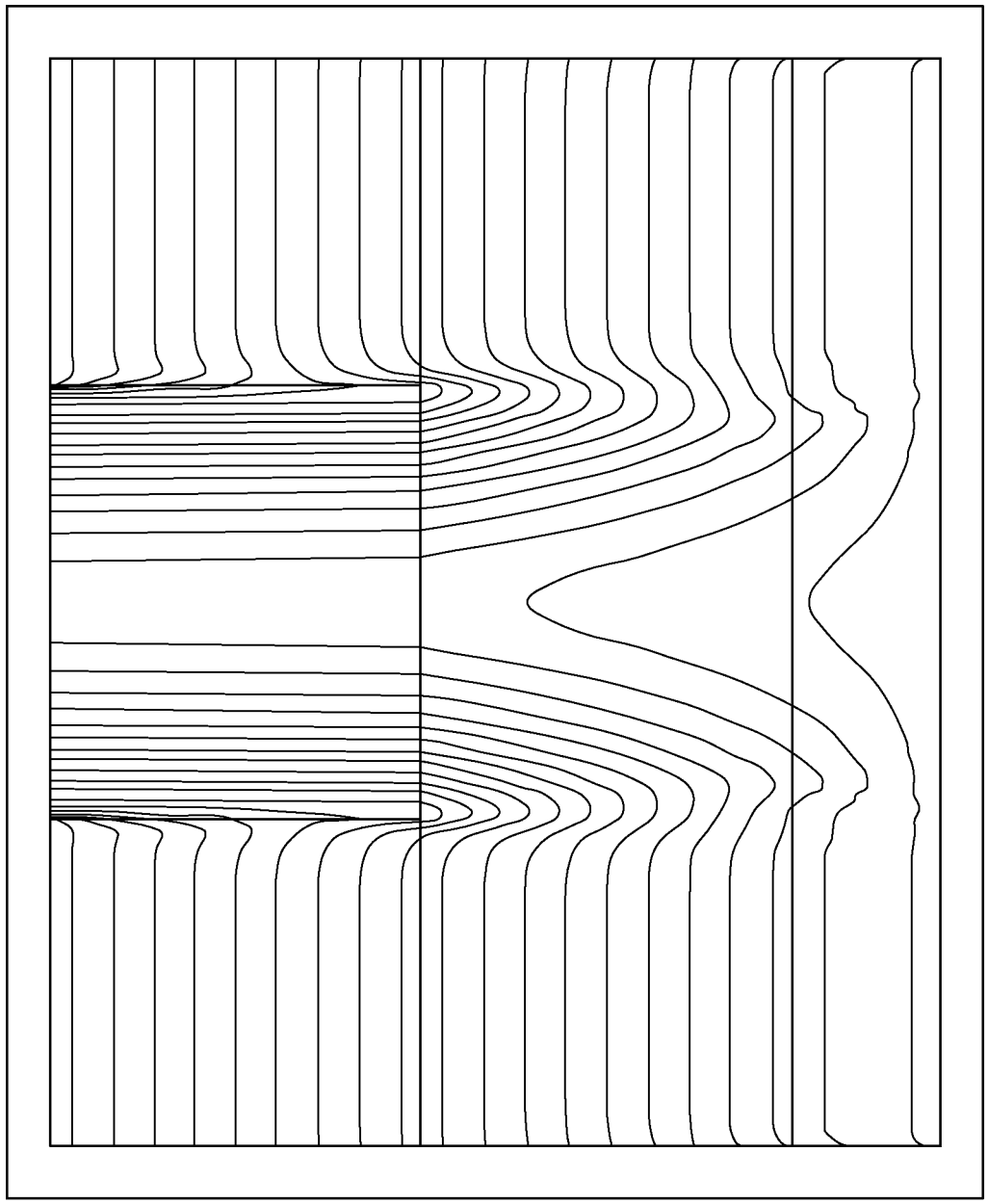
FIG. 21A is a graphical view showing equipotential planes for the configuration of FIG. 20 when using a drive signal having a relatively high frequency.
Figure 21B:
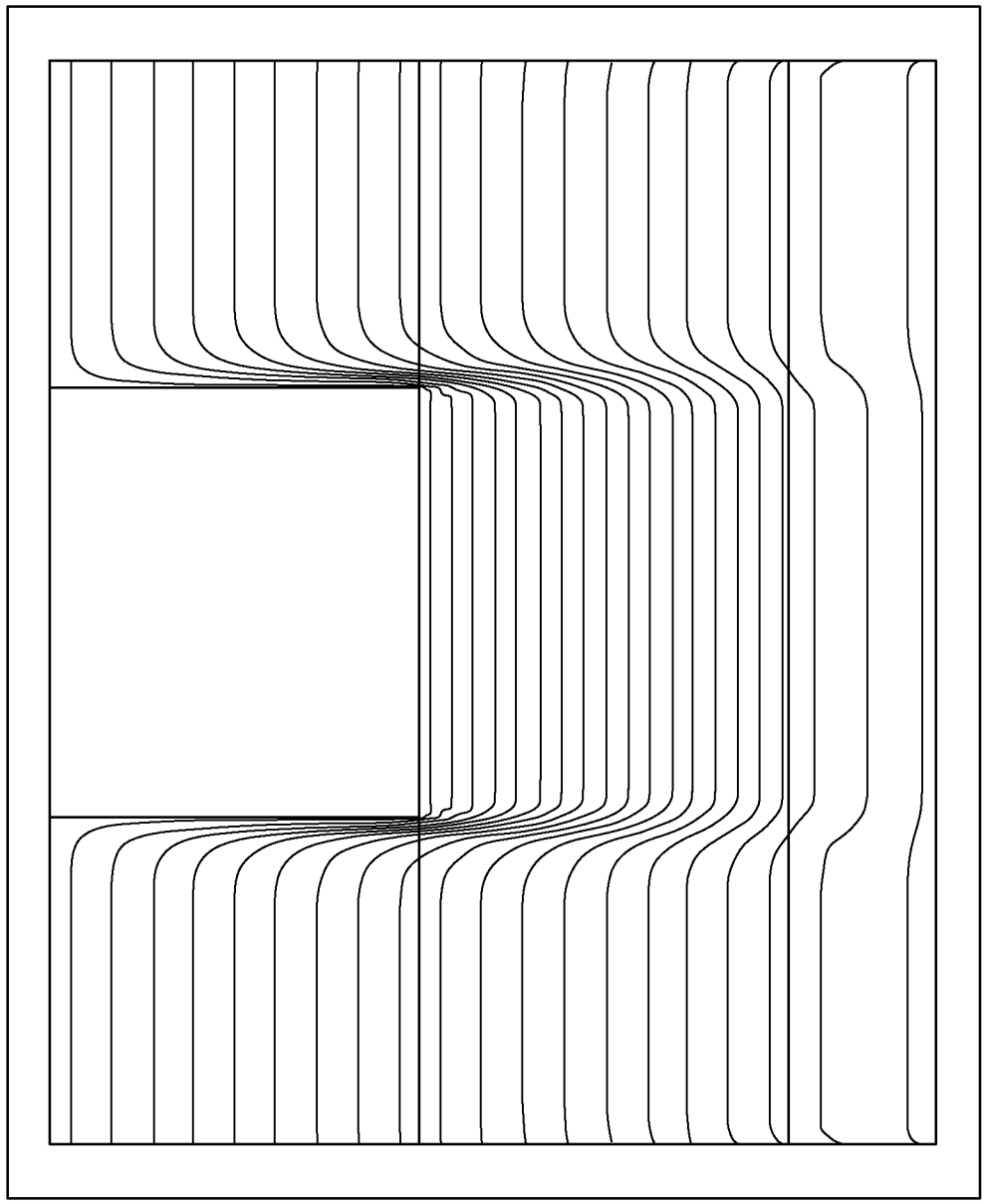
FIG. 21B is a graphical view showing equipotential planes for the configuration of FIG. 20 when using a drive signal having a relatively low frequency.

FIG. 20 is an embodiment having somewhat of an opposite geometry with respect to the embodiment of FIG. 18, with FIGS. 21A and 21B showing the corresponding equipotential lines for different driving frequencies, essentially as in FIGS. 19A and 19B. Whereas the FIG. 18 embodiment uses a disk-shaped electrode and a central region in the frequency dependent layer that is non-conductive, the FIG. 20 embodiment uses a hole-patterned electrode 2004 and a frequency dependent layer 2006 for which the conductive material is all located in a center region below the "hole" of the electrode. This embodiment may therefore be used to create an electric field response that is somewhat opposite to that of FIG. 18. Such a geometry can be useful, for example, for creating a tunable LC lens that may be changed from positive to negative in response to changing frequency. At a high frequency (e.g., 12 kHz at 25V), the frequency dependent material has no significant charge mobility, and the electric field appears as if generated by just the hole-patterned electrode. At low frequency (e.g., 200 Hz at 25V), the frequency dependent material has a much higher charge mobility, so the electric field appears as if generated by the electrode 2004 and a disk-shaped electrode located at the bottom of the frequency dependent material. Changing the frequency between these extremes creates a smooth range of curved electric field shapes suitable for tuning an LC lens. Thus, a lens with both positive and negative tenability is provided.

It is important to note that many other variant configurations of an LC lens using such a hidden electrode to provide for modulation of the electric field are possible and are included within the scope of the present invention.

Frequency-Dependent Material

As mentioned above, the present invention provides various chemical compositions of a frequency dependent material, suitable for use in tunable optical devices, such as the LC lenses described herein. Those skilled in the art will recognize that such materials may also be used in other frequency-dependent optical applications, such as beam steering devices, shutters, and the like. A uniform or non-uniform layer of the frequency dependent material may be incorporated into the lens, beam steering device, and/or shutter configuration, in order to provide for spatial modulation of an electric field via frequency tuning. Thus, tuning can be frequency controlled. Such a device may be used for tunable focusing, diffracting, steering, and the like.

For the different LC lens configurations discussed above, the frequency dependent layer is made of a material having a complex dielectric permittivity which is dependent (including the weakly conductive properties) on a driving frequency applied to the system electrodes. According to a non-limiting example of implementation, this material may be a thermally or photo polymerizable conductive material, whose composition may include the following elements:

(i) a polymerizable monomer (linear or cyclic) compound;
(ii) an initiator;
(iii) an additive to change the dielectric constant or conductivity of the final composition;
(iv) an adhesive to increase the adhesion of the polymer to a glass surface (the adhesive may be used as surface treatment agent or incorporated directly to the solution to increase the adhesion); and
(v) a filler to change the viscosity of the mixture.

In one example, 90 (wt.) of isodecyl acrylate (SR256) is mixed with 0.3% $Li^+ClO_4^-$ (wt %). Then 3% of an initiator; 2-hydroxyl 2-methyl 1,1-phenyl propanone (Darocure 1173) is added and the mixture stirred carefully at room temperature to obtain a homogeneous clear solution. Then a quantity of 10% of ECA (2-ethyl cyanoacrylate) (wt % of total mass of the monomers) was added and the final solution stirred carefully for 15 minutes at room temperature and dark conditions. The mixture can be polymerized by a UV source by exposing the material for three minutes at an intensity of 15 $mV/cm^2$.

In another example, in order to prepare a first part of the composition, 35% (wt.) of optical adhesive OA9352HT2 (HT) is mixed with 65% (wt.) of (2(2-Ethoxyethoxy) Ethylacrylate monomer) and the mixture is stirred carefully at room temperature to obtain a homogeneous clear solution. Then a quantity of 10% of 4-methylphenyl)[4-(2-methylpropyl)phenyl]-hexafluorophosphate (wt. of total mass of the monomers) is added and the final solution is stirred carefully for 15 minutes at room temperature and dark conditions.

A second part of the composition having low epsilon or conductivity is a 55% wt. of isodecyl acrylate (SR395) mixed with an optical adhesive (45% wt., AT6001). The solution is stirred carefully for 15 minutes at room temperature and dark conditions. The mixture can be polymerized by an UV source by exposing the material for 3 minutes with an intensity of 15 $mV/cm^2$. Optionally, an optical elastomer from the silicone family may be included in the thermal- or photo-polymerizable conductive material and used as a low epsilon part of the composition. This material may be classed as a thermally curable compound (and may be a one or two part silicone elastomer).

It should be noted that various material compositions, various LC layers, various electrodes, various director alignments, various geometrical forms, etc. may be used to fabricate the same optical device. That is, different combinations of materials and physical structures disclosed herein may be used for a particular application, although the use of a frequency dependent material, which allows for frequency tuning of the optical device, is common to each of these embodiments.

It has been determined that various different chemical compositions of a material with complex dielectric permittivity may be suitable for use in the above-described frequency tunable lens, beam steering device, and/or shutter configurations, where this material may be altered (including the weakly conductive properties) by modulating a driving frequency applied to the electrodes.

According to one embodiment of the present invention, the polymerizable monomer compound has at least one ethylenically unsaturated double bond and has a complex dielectric constant including an imaginary part which describes the conductivity, and the initiator is a combination of UV-Vis, NIR sensitive or thermally sensitive molecules.

On particular initiator compound may include, for example, mixed triarylsulfonium hexafluoroantimonate salts, hexafluorophosphate salts, and any other suitable initiators known to those skilled in the art. A preferred initiator compound is 4-methylphenyl[4-(2-methylpropyl) phenyl]-hexafluorophosphate.

The additive to change the dielectric constant or conductivity of the thermal- or photo-polymerizable conductive material may be an organic ionic compound (such as iodonium (4-methylphenyl)[4-(2-methylpropyl)phenyl]-hexafluorophosphate or triarylsulfonium hexafluoroantimonate salts, mixed in propylene carbonate), an inorganic ionic compound (such as $Li^+ClO_4^-$, $K^+ClO_4^-$ etc.), an ionic organometallic compound, or a mixture of any of these, and any other suitable additives known to those skilled in the art.

The adhesive is sensitive to UV-Vis, NIR, or is an adhesive that is polymerized using a thermal initiator and may be used as surface treatment agent, or incorporated directly to the solution to increase the adhesion. In the example above, the adhesive is optical adhesive OA9352HT2 (HT), but other suitable adhesives will be known to those skilled in the art.

The optical elastomer, as discussed in the example above, may be selected from a group including isodecyl acrylate (SR395) mixed with an optical adhesive (AT6001), and any other suitable optical elastomers known to those skilled in the art.

According to another embodiment of the present invention, the frequency dependent material is a high dielectric constant liquid, chosen from all transparent liquid materials having an epsilon value between 2.0 and 180.0 able to provide for charge mobility. Preferably, the high dielectric constant liquid has an epsilon value between 30.0 and 150.0. More preferably, the high dielectric constant liquid has an epsilon value between 60.0 and 120.0. The liquid may be pure, or a mixture of alkylene carbonates family, such as propylene carbonate (PC) or glycerin carbonate (GC) having epsilon of 67 and 111, respectively, alkyl group, a substituted alkyl group, an alkyl carbonyl group, an alkoxycarbonyl group, an aryl group, a substituted aryl group and an aryl carbonyl group. Furthermore, use of water, glycerol, and mixtures of water with an organic or inorganic compound such as glycerol, alkaline salts, or rare earth alkaline salts are also envisioned. One particular example is a mixture of 7% distilled water with 93% glycerol. The solution is stirred for fifteen minutes at room temperature (the refractive index of the solution is adjusted to a value of 1.4630 that is compared to the second part of the hidden layer).

According to another embodiment of the present invention, the frequency dependent material is an electrolyte gel, which includes a polymer material (used as a matrix), an ionic composition, and an ion transporter.

In general, all commercially available polymers (such as polyacrylic, epoxy material, polyurethane, polycarbonate, and polyphenylic material) which are miscible with the ionic composition and ion transporter material can be used as polymer matrix. The ionic composition having the anion and cationic species may be selected from the group including soluble alkaline or rare alkaline salts (such as $Li^+$, $K^+$, etc.), organic, or organometallic compound.

The ion transporter material may be a pure liquid such as propylene carbonate (PC), ethylene carbonate (EC) or a mixture of two or more liquids or a monomer having a polar group such as etheric or phenoxy group. This polar group can be a side chain or may be incorporated in polymer's main chain. For example: (2(2-ethoxyethoxy) ethylacrylate monomer), in which the etheric group is a long side chain and plays a role of ion transporter. An example of an electrolyte gel might be 10% wt. of PMMA dissolved in 80% propylene carbonate (PC). The solution is stirred over night at room temperature. Then a quantity of 10% wt. of $Li^+ClO_4^-$ is added to the solution and stirred at room temperature. The final gel like material is used as the high dielectric constant layer part of a tunable LC lens.

According to a further embodiment of the present invention, the frequency dependent material may be a conductive ionic liquid. This material is classed in different organic, inorganic or organometallic compounds having the ionic species such as chlorate, perchlorate, borate, phosphate and carbonate. Specific, non-limiting examples of such materials include (1-butyl-3-methylimidazolium tetrafluoroborate) and (1-butyl-3-methyl imidazolium hexafluorophosphate).

Yet another example of the frequency dependent material is an electronic conductive polymer. The most important aspect of conjugated polymers is their ability to act as electronic conductors. These materials range from conventional polymers (e.g., polythiophene, polyaniline, polypyrrole, poly acetylene) or PEDOT poly(3,4-ethylenedioxythiophene) and PEDT from Clevios to new polymers with specialized conductivity properties such as low band gap and intrinsically conducting polymers.

In a nano particle environment, materials may be dispersed in water, an organic solvent, monomer. For example, ATO $((SnO_2)_{0.9}(Sb_2O_5)_{0.1})$ dispersed in the water or in the polyethylene glycol diacrylate, or the nano particle used in a powder form coated by sputtering as a thin layer on the substrate. Or the carbon nanotubes (CNTs) that are allotropes of carbon with a cylindrical nanostructure. This material may be used as dispersed nanoparticles in the water or an organic material such as a monomer. The nanoparticles can be deposited by different techniques such as spin coating process on the surface of the glass.

Another possibility for preparing the frequency dependent layer is based on the deposition of metallic oxide as a thin film on the surface of a glass substrate. In this case, the metallic compound is deposited on the surface of the glass followed by an oxidation process. In this method, a metallic target is used for e-beam, sputtering or thermal evaporation process. For example, metallic oxide compounds such as $SnO2$, $Ti3O5$, $ZnS$, $ZnO2$, etc. prepared by e-beam technique can be used as a frequency dependent portion.

Conductive glass can also be used as a frequency dependent portion of a tunable LC lens. In this case, the conductive material can be doped in glass (bulk) and used as a target in a thin film deposition technique (such as e-beam, sputtering or sol-gel process, etc.). Examples include molybdenum, silver or a mixture of them doped directly into the glass and used as conductive glass target for thin film deposition technique. While a $Ti3O5$ (titanium oxide) layer may be about 10 nm thick, a polymer that provides some ionic conductivity can work well, although the thickness would be in the range of 0.1 to 30 microns.

Driving Signals

The specific materials used herein to provide frequency-dependent control of a corresponding optical device may make use of a variety of different driving signals having different characteristics. These signal characteristics include frequency variations, and may also include amplitude and duty cycle control. Some examples of these are discussed in more detail below.

Pulse-Width Modulation

Figure 22:
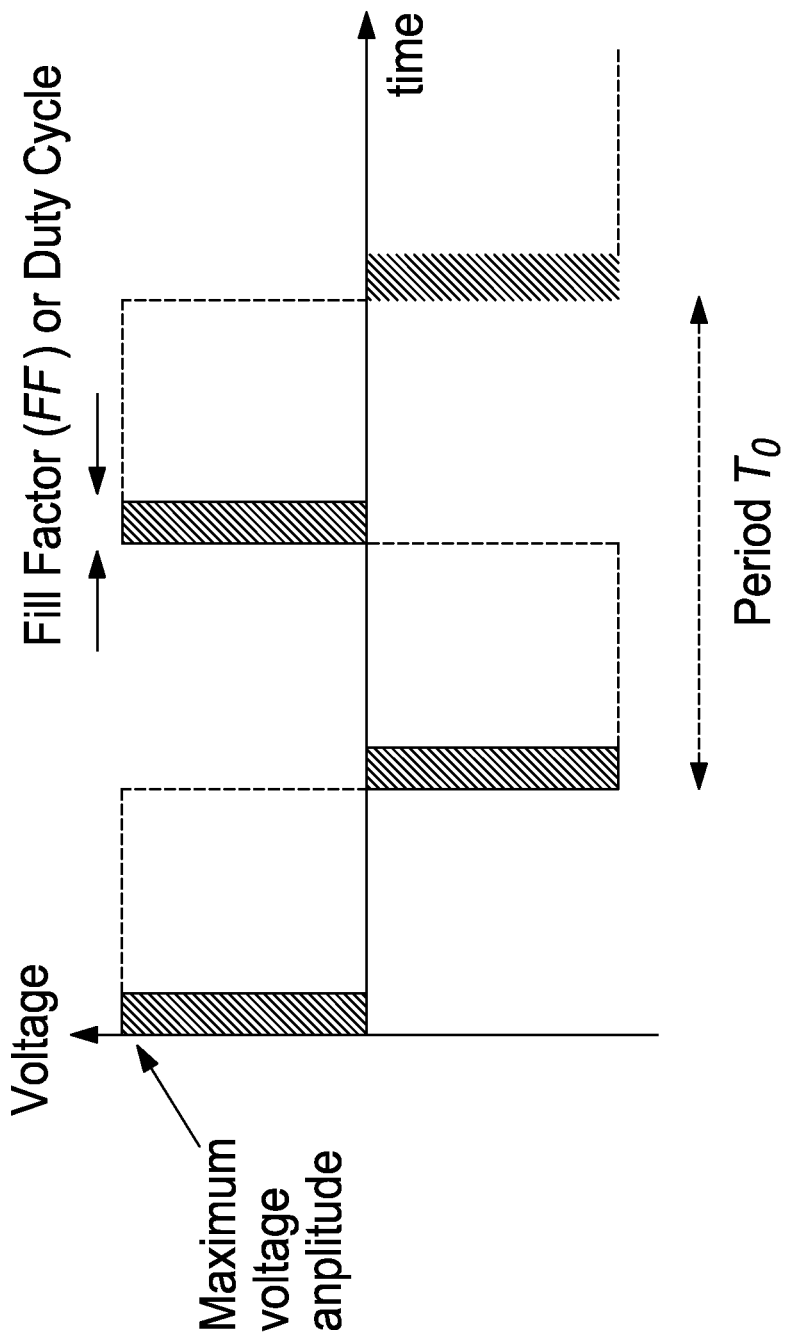
FIG. 22 is a graphical view showing the parameters of a pulse width modulated signal.
Figure 23:
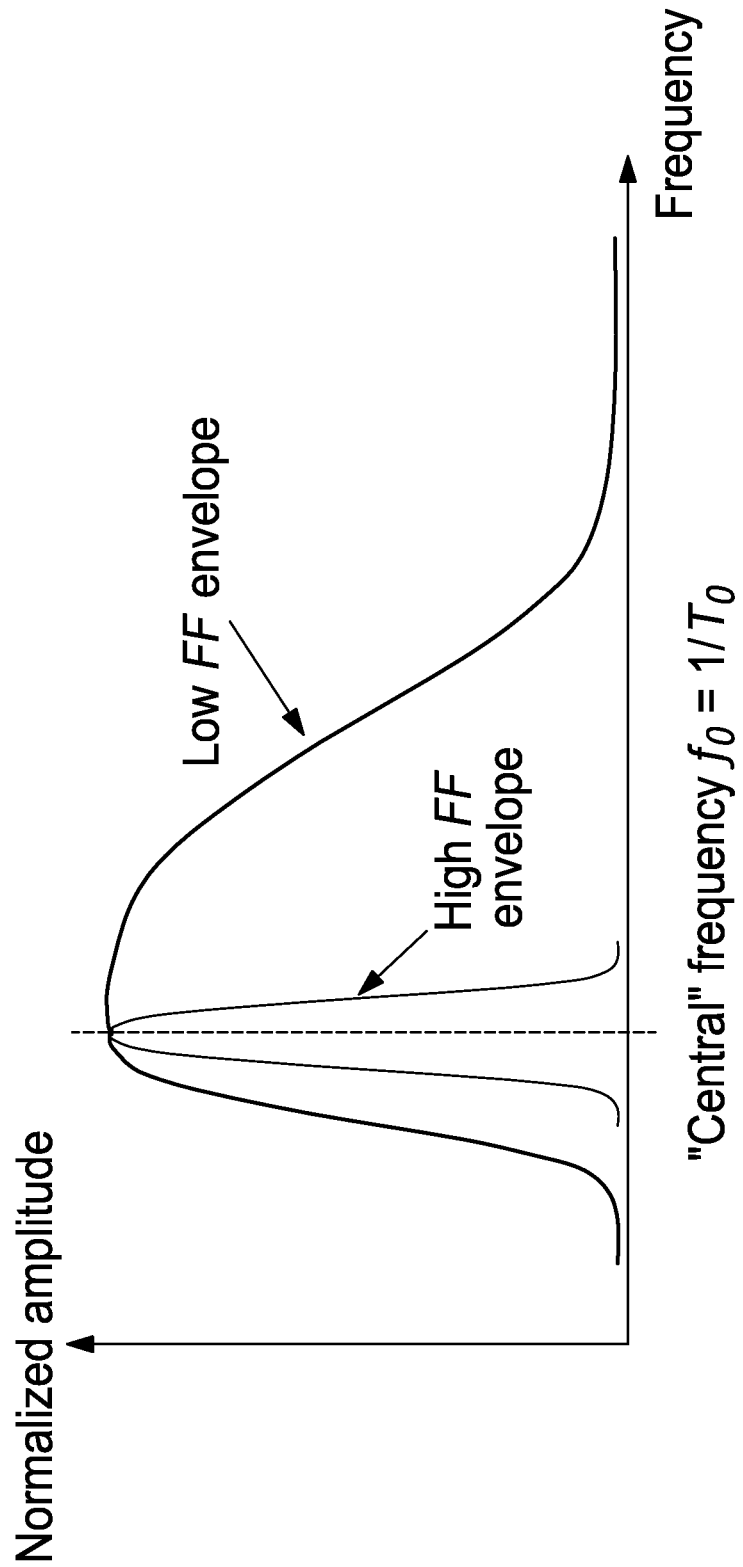
FIG. 23 is a graphical view showing the frequency domain characteristics of a pulse width modulated signal.

One way of doing frequency control is by using a signal with so-called "pulse width modulation" (PWM). FIG. 22 illustrates the parameters of a PWM signal, namely amplitude, period and duty cycle or fill factor ("FF"). As shown, the PWM signal has a characteristic defined by the total period, and the duration of the pulses determines the duty cycle. The frequency domain characteristics of the PWM signal are shown schematically in FIG. 23, which indicates the frequency content of a PWM waveform for different fill factors. It will be appreciated that a pulse train contains a dominant frequency corresponding to the waveform period. However, as the Fourier series for such a waveform demonstrates, higher frequency components of lower amplitude are contained in a square wave. Thus, while most of the energy of a 50% duty cycle square wave pulse train is contained in the "central" frequency corresponding to the PWM signal period, some energy is still carried in other frequencies. This is demonstrated by the fill factor shown in the "high FF" envelope indicated in FIG. 23. In the case of lower fill factors, the amount of energy in the PWM signal away from the central frequency is greater. This corresponds to a broader envelope that has more energy in the higher frequencies. In the case of higher duty cycles, the amount of energy in the PWM signal away from the central frequency is less. As an example, changing a PWM duty cycle from 50% duty cycle down to 5% would change RMS voltage by an order of magnitude from a normalized 1.0 down to 0.1, while at the same time causing a significant increase in the energy at higher frequencies.

The control of a TLCL may make use of PWM, for example, in certain applications such as lenses for cell phone cameras. PWM control provides certain advantages for such a TLCL and may be seen as having the following characteristics:

1) For a given "central" frequency, e.g., $f=f_1$, the driving "maximum amplitude" may be set such that a maximum of optical power is achieved at relatively low FF taking into account that the real spectra of driving signal will be significantly broadened. Then, simply increasing the FF will increase the RMS voltage and thus will decrease the optical power, but this decrease will not follow the curve for $f_1$ (FIG. 24A). In fact, due to the increase of FF, the spectral content of the driving signal will be significantly reduced, thus, the optical power will be reduced not only because of the growth of the RMS voltage but also because of the decrease of high frequency signal components. This will bring a much "faster" decrease of optical power, allowing the use of comparatively low voltages.

2) Once the maximum optical power is achieved for a given driving frequency and FF, the driving frequency can be shifted down, effectively changing from one transfer function to another (such as changing from $f_1$ to $f_2$ in FIG. 24A). This helps avoid the need for high RMS voltages to bring the optical power of the lens to a minimum.

3). Combined or simultaneous FF and frequency changes can also be used to achieve optical power control. The present invention is directed to a tunable LC lens using a hidden electrode system to provide spatial modulation of the electric field via frequency tuning. Thus, tuning of the lens can be frequency controlled, although adjustment of the FF also changes the relative frequency content of the driving signal. As such, both FF and frequency can be used to tune the lens. As mentioned above, the devices of the present invention may be used for a variety of different applications, including tunable focusing, diffracting, steering, etc.

In contrast to PWM mode, amplitude modulation (AM) mode may also be used to modulate the lens given a particular frequency. FIG. 24A schematically demonstrates the transfer functions showing RMS voltage versus optical power for different driving frequencies $f_1$-$f_3$ in the Amplitude Modulation mode. Different options of control are possible with the proposed TLCL in both amplitude modulation (AM) and PWM mode. AM mode differs from PWM mode in that the PWM signal relies on control of the RMS amplitude by changing the filling factor to determine the relative high or low frequency content of the signal. In contrast, AM uses a set frequency signal with 100% fill factor and changes only the amplitude of it. The different curves in FIG. 24A show how, for different selected frequencies, RMS voltage can be used to change optical power of a TLCL. Such behaviour is typical, e.g., for the lens shown in FIG. 14.

FIG. 24B is similar to FIG. 24A, but shows how a frequency controlled lens would behave for different control voltages. For the different voltages shown, the increase in frequency corresponds to an increase (and subsequent decrease) in the optical power of the lens. However, depending on the voltage, the optical power may have a higher maximum, and that maximum may occur at a higher frequency. Such behaviour is typical, e.g., for the lens shown in FIG. 5.

The control signal for tuning the optical device can be provided by a variable frequency control signal circuit configured to cause said device to control propagation of light in the device as a function of control signal frequency. As an example, in FIG. 25, there is shown schematically a camera having a LC lens 2502 combined with at least one fixed lens 2504 to focus an image onto an image sensor 2506 with the LC lens 2502 providing focus control. The image is fed to a camera controller 2508 that includes an autofocus function that outputs a desired focus value. An electric field controller 2510, typically using lookup tables (with possible/optional information about the geometry, material, temperature, sheet resistance, camera, etc.), translates the focus value into an electrical parameter, in this case a desired fill factor. In the case that tuning cannot be achieved only by the fill factor setting at a single PWM waveform amplitude and period, the controller 2510 can adjust a PWM amplitude setting and period setting. The PWM drive circuit 2512 itself may be a conventional PWM circuit. Those skilled in the art will appreciate that components 2508 and 2510 can be implemented using microcode executed on a microcontroller, while component 2512 can comprise voltage sources switched under the control of the microcontroller to pulse width modulation circuitry also controlled by the microcontroller to have a desired frequency and duty cycle.

In the case that the frequency content is to be controlled to reduce the presence of the higher frequencies, the PWM amplitude can be stepped down while the duty cycle is then increased to achieve the same RMS voltage as a mechanism to avoid the creation of the higher frequencies that the electrode system or the LC cell will respond to in an undesirable manner.

Complex Frequency Signals

Although PWM or AM signals are specifically discussed above, it is possible to use a driving signal that is simply carried on one frequency or is the combination of multiple individual frequency components. Such a "complex frequency" signal can be, for example a combination of individual signals at different frequencies all mixed together in a predetermined ratio (but dynamically variable). Unlike the PWM method, the complex frequency signal does not rely exclusively on square wave type signal shapes, and does not use an adjustment of filling factor to change the level of high and low frequency components.

Figure 25:
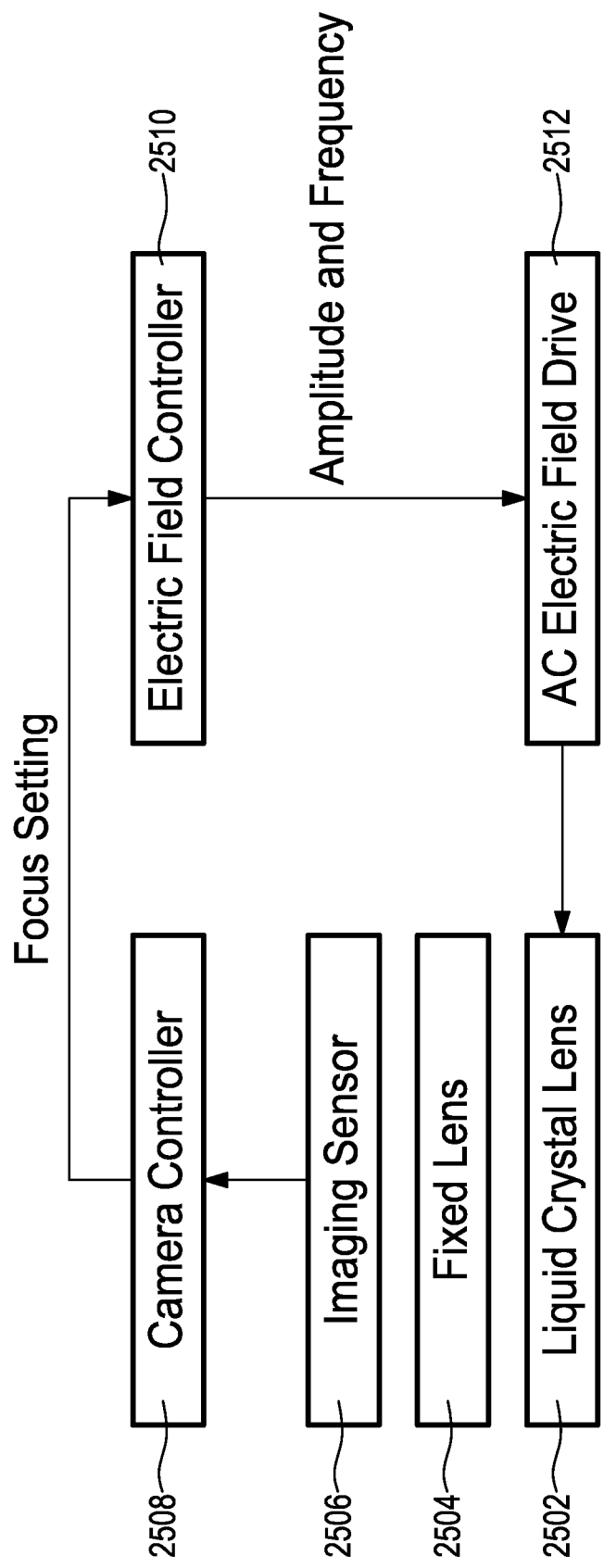
FIG. 25 is a schematic view of a camera having a frequency tunable LC lens.
Figure 26:
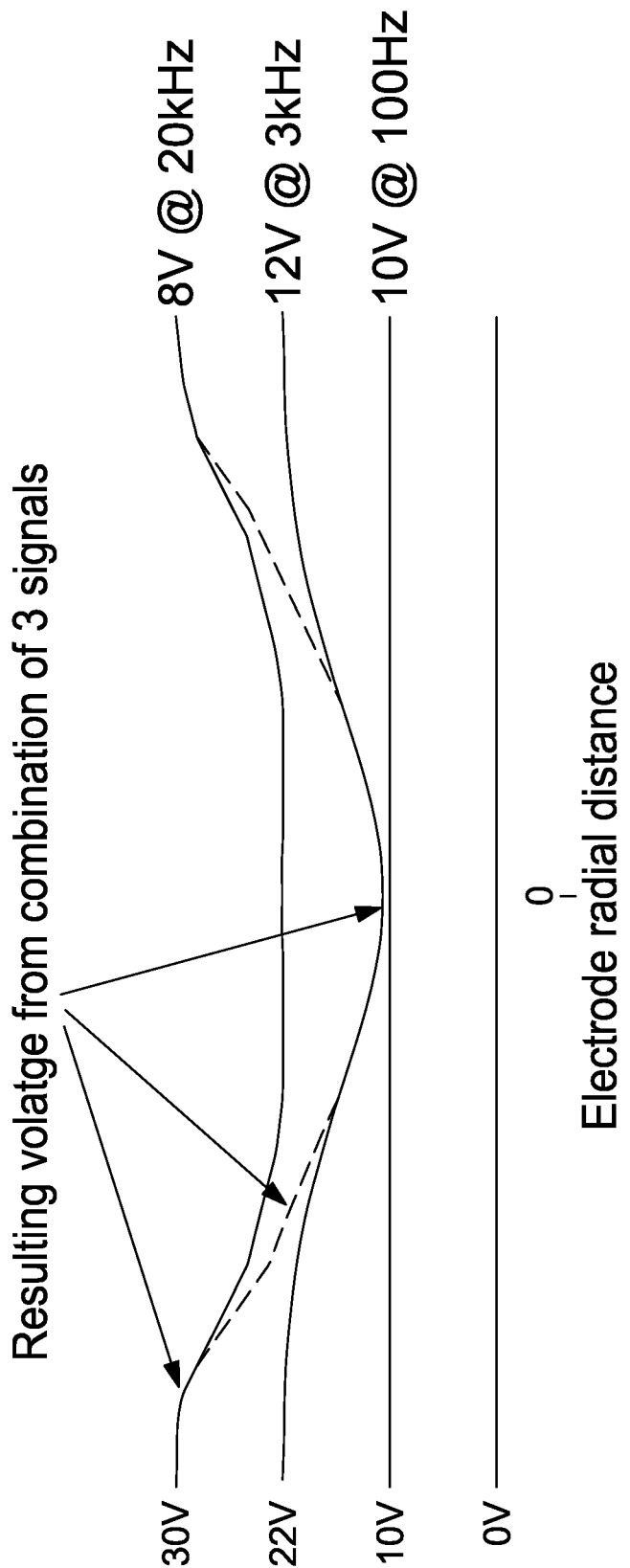
FIG. 26 is a graphical view showing how three control signals at different frequencies can be used together to shape an electric field profile for a frequency tunable LC lens.

FIG. 26 illustrates how three control signals of three different frequencies can work together to shape the electrode voltage profile for a frequency tunable lens structure such as that of FIG. 25, where the complex frequency signal generator would replace the PWM signal generator 2512 shown in that figure. Referring again to FIG. 26, the figure shows an effective voltage across a LC lens with a center point of an electrode radial position shown in the center of the range. The values for amplitude and frequency used in this description are just for example.

A first signal of 100 Hz at 10V is active to reduce disclinations across the lens, as it produces very little variation in effective voltage relative to radial position. A second signal of 3 kHz at 12V provides a general shape to the lens. Finally, the third signal of 20 kHz at 8V contributes to the overall voltage profile in a manner that improves the lenticular (spheric or aspheric) properties of the profile. Thus, the combination of the three signals shape the electrode voltage profile in a way that is better than a single frequency. The first signal can be used to ensure that the whole aperture of the LC layer is subjected to a minimum voltage to begin orientation of the LC molecules. The second signal has a smooth transition between the outside and the center, and provides a good smooth profile. The addition of a third signal at a higher frequency may provide a more spherical, lenticular, aspheric or other desired profile.

Those skilled in the art will recognize that the addition of more signals at other frequencies can be used to further shape the electric field in a way that is desirous for the lens properties. In addition, once a desired voltage profile is achieved, tuning of the lens can be done also by voltage adjustment alone. Voltage adjustment can be done for all signals together, or a different adjustment can be used for each of the different frequencies.

Shaped Electrodes

Figure 27A:
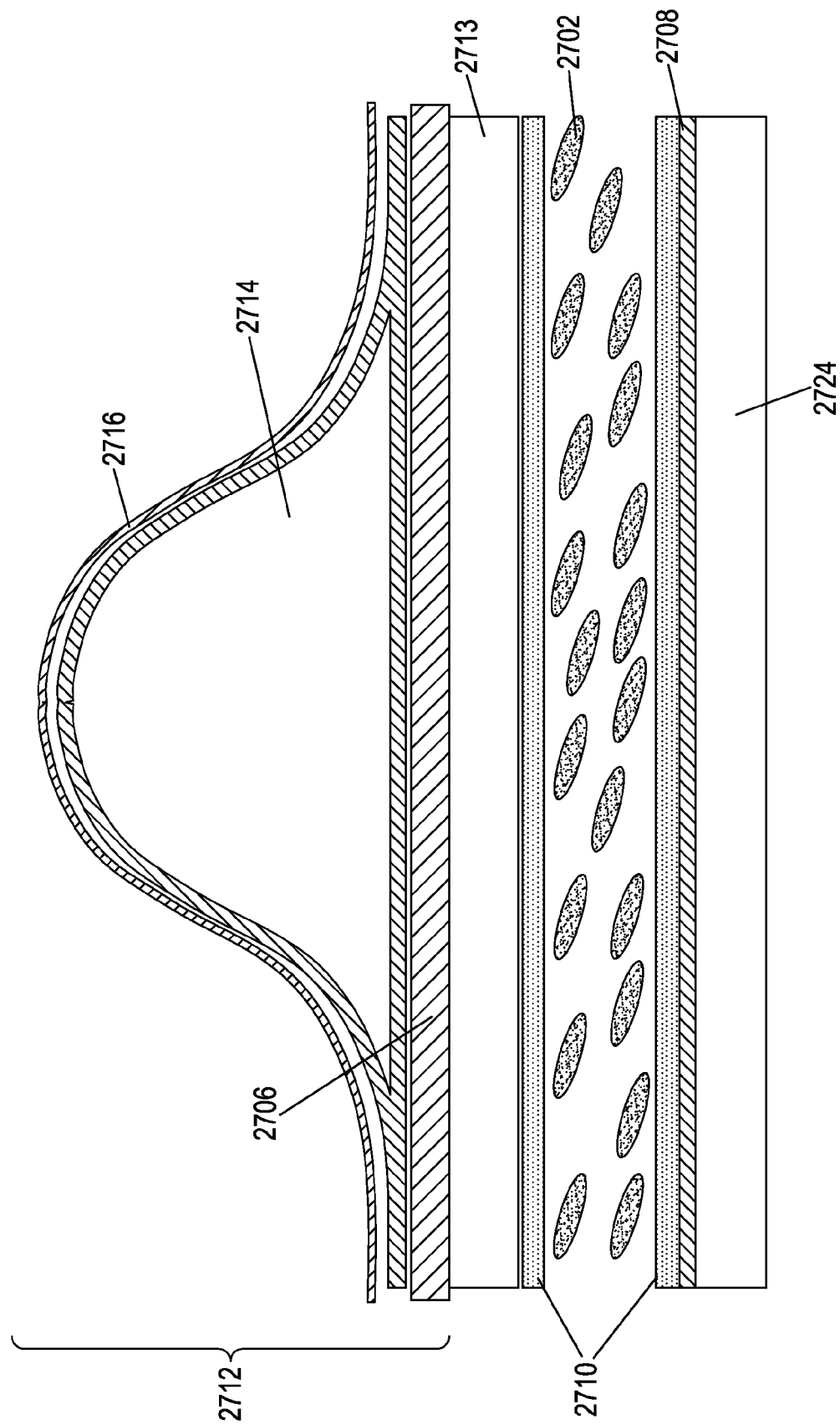
FIG. 27A is a schematic view of a structure having a shaped top electrode, a lens like polymer structure and a frequency dependent layer.

FIG. 27A schematically illustrates a tunable LC lens according to the present invention that uses a geometrically shaped fixed electrode. As shown, a layer of LC 2702 is sandwiched between top and bottom substrates 2713 and 2724, respectively. A flat bottom electrode 2708 (which may be a layer of ITO) is provided on the bottom substrate, and is coated by an orienting coating 2710 (e.g., rubbed polyimide) for aligning the LC molecules of the LC layer 2702 in a predetermined direction. The surface of the top substrate that is adjacent the LC layer is also coated with an orienting coating 2710 for aligning the LC molecules. In addition to the bottom electrode 2708, the electrode system includes a top electrode structure 2712 that is formed of a lens-like polymer structure 2714 coated by a curved electrode 2716 (which may also be an ITO layer). The top electrode structure 2712 is a combined variable electrode structure (CVES) and also includes a layer 2706 of material having a frequency dependent complex permittivity. Although not necessary, this may be an index matched layer with variable conductivity (IMLVC)), where this material is arranged between the top substrate of the LC cell 2713 and the lens-like polymer structure 2714. The permittivity of this material, and thus the charge mobility, may be changed dynamically (e.g. by a change of drive frequency in a voltage applied between the top and bottom electrodes).

The frequency dependent material may be a weakly conductive material such as those described above, whose charge mobility is variable as a function of an electrical signal frequency applied to the electrodes, such that it can be used to spatially modulate the electric field resulting therefrom. More specifically, the weakly conductive material may be a complex dielectric material having a permittivity/conductivity that is dependent on frequency. Therefore, by varying the frequency of the AC excitation voltage between the electrodes 2708 and 2716, one can vary the degree of charge mobility in the frequency dependent layer. This provides for a variable (frequency controllable) transformation/adjustment of the electrical field that is generated in the LC cell by the bottom flat and top curved electrodes.

In the present embodiment, the form of the lens-like polymer structure of the top electrode structure can be selected to optimize its optical function while its electrical function (generating the electrical field in the LC cell) can be adjusted by the flat IMLVC layer and the choice of the driving frequency. Furthermore, the curvature of the electric field generated in the LC layer may be changed from a lens-like form at a relatively high driving frequency to a flat electric field distribution at a low driving frequency (as if, effectively, one were using two flat electrodes). That is, the high charge mobility state of the frequency dependent layer, which results from the low drive frequency, makes the top structure appear as if the curved electrode did not exist and as if the layer 2706 was the top electrode. Accordingly, it is possible to avoid the generation of disclinations (abrupt orientation changes in space). Finally, the transformation of the electric field profile by the dynamic reorientation of LC molecules (and corresponding aberrations) may be compensated by the dynamic change of the charge mobility of the hidden layer of the frequency dependent material, which will reshape the profile of the electric field.

Alternatively, for relatively high driving frequencies, where the movement of charges is very limited in material 2706, the profile of the electric field will not be affected, and will be defined primarily by the curvature of the lens like polymer structure 2714. In a variation of this embodiment, the lens like polymer structure may be fabricated from the same material as the layer 2706. The operation of such a structure will be very similar to that defined above, but there will be no need of a separate layer of material 2706.

Although the layer of frequency dependent material is described in the given examples as being a part of the electrode system of the tunable LC lens, it may also be considered as being separate from the electrode system, simply as an additional element of the tunable LC lens. As part of the lens, it allows for the shape of the electric field generated by the electrode system to be dynamically controlled by varying a frequency of a drive signal applied to the electrode system.

FIG. 27B shows the electric equipotential planes of the LC lens shown in FIG. 27A, for a high driving frequency (in this case, 100 kHz at 35 Vrms). By applying a high frequency driving signal, the charge mobility of the hidden layer (IMLVC) is minimized. This low charge mobility state allows the creation of a gradually varying electric field within the LC layer, corresponding to a spatially non-uniform reorientation of the LC molecules and a non-uniform refractive index distribution in a lens-like form (i.e., the LC lens becomes tunable).

Figure 27C:
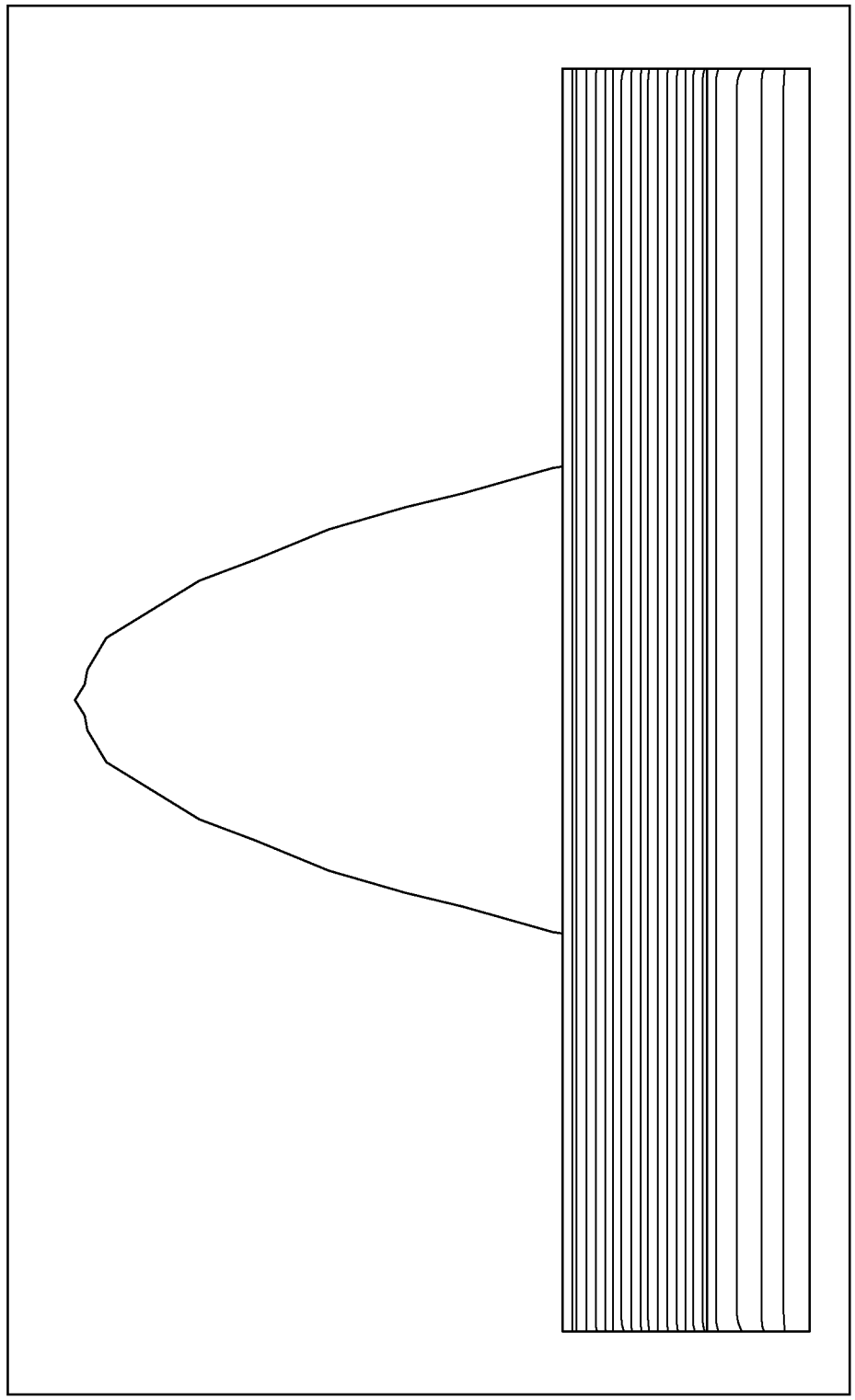
FIG. 27C is a graphical view showing equipotential planes for the configuration of FIG. 27A when using a drive signal having a relatively low frequency.

FIG. 27C shows the electric equipotential planes of the LC lens shown in FIG. 27A, for a low driving frequency (in this case, 100 Hz at 35 Vrms). By applying a low frequency driving signal, the charge mobility of the hidden layer (IMLVC) is maximized. This high charge mobility state allows the creation of a uniform electric field within the LC layer, corresponding to a spatially uniform reorientation of the LC molecules and a uniform refractive index distribution. It is therefore possible to start the reorientation process with such a uniform excitation, in order to avoid the formation of disclination defects, after which the driving frequency can be adjusted to higher values to form the lens-like structure. The frequency of the driving signal can then be adjusted to come back to the uniform excitation, in order to gradually remove the lens-like structure without going to the ground state (V=0 volt), which is usually very slow.

It should also be noted that, during the reorientation of the LC molecules, the profile of the electric field (within the LC layer) will be changed. However, the LC lens configuration shown in FIG. 27A allows for the correction of any undesired transformations of the electrical field by adjusting the frequency and the rms voltage of the driving signal, thus keeping the lens aberrations below the desired value (which could not be done with fixed pairs of electrodes). It should be understood that the use of a frequency dependent layer and frequency control enable a unique possibility of "reconciling" the optical functions (with good "fixed" optical power and low aberrations) of the element 2714 with the generation of a good profile of electric field (seen by the LC) using electrode 2716 and frequency dependent layer 2706.

Figure 28A:
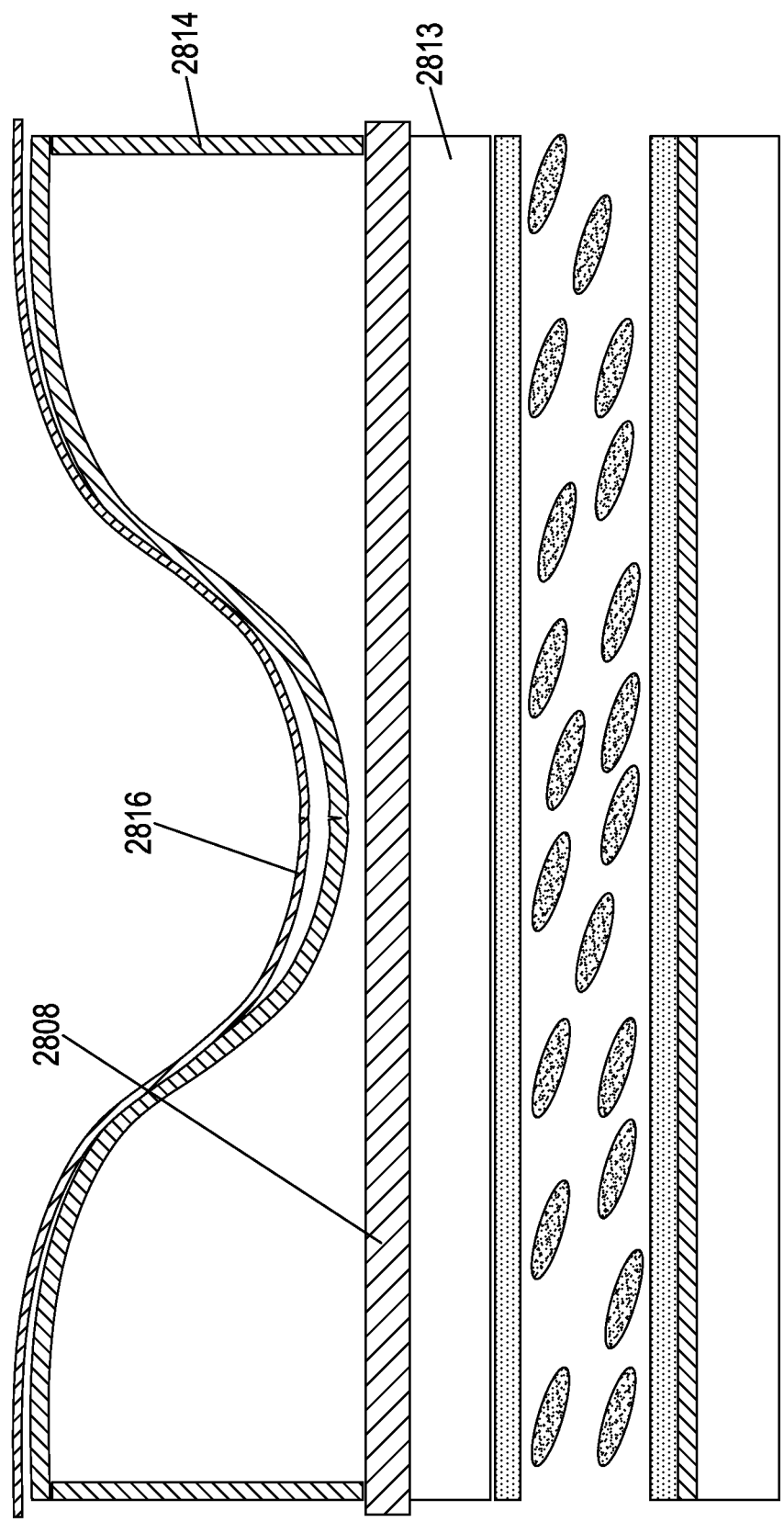
FIG. 28A is a schematic view of a structure similar to that of FIG. 27A but with a shaped top electrode having an inverted shape to provide an opposite tunability.

FIG. 28A schematically illustrates a variant configuration of a tunable LC lens according to the present invention. As seen in the figure, the shape of the lens-like polymer structure 2814 that is arranged on the top substrate 2813 and coated by a curved electrode 2816 (which may be an ITO layer) differs from that of FIG. 27A. The top electrode structure still includes a layer 2806 of material having a frequency dependent permittivity, where this material is arranged between the top substrate 2813 of the LC cell and the lens-like polymer structure. Accordingly, the lens shown in FIG. 28A has a similar operation as that of the lens of FIG. 27A, but with the opposite tunability. That is, the effective electric field shape induced by the structure creates an opposite lensing effect to that of FIG. 27A, allowing the optical power of the lens to be modified in an inverse sense with changes in the drive frequency. This opposite tenability may be desirable in certain lens applications.

Figure 28B:
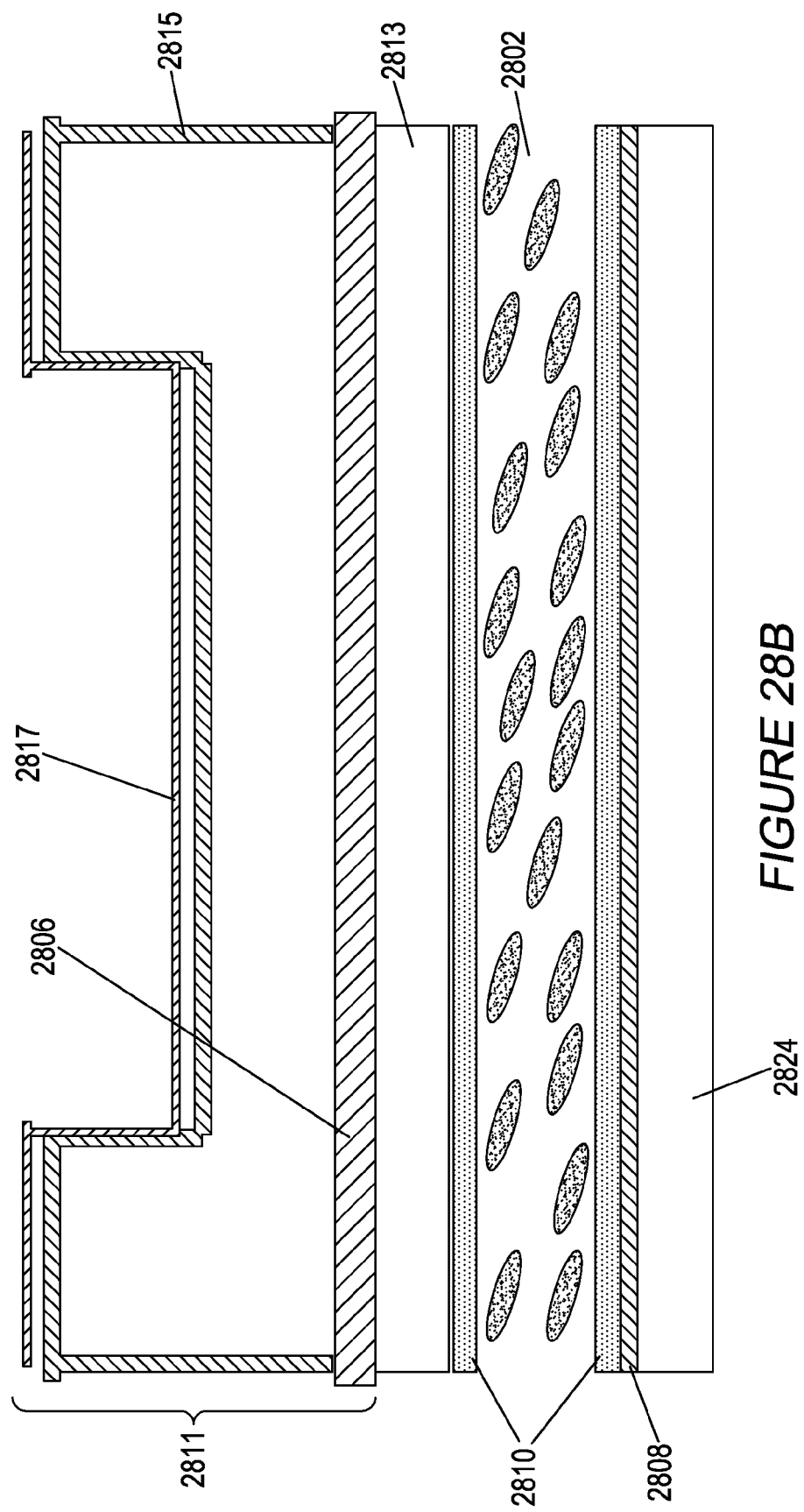
FIG. 28B is a schematic view of a structure having a top electrode with a shape having all flat surfaces, and a flat aperture polymer structure.

FIG. 28B schematically illustrates another variant configuration of the tunable LC lens, according to the present invention. In FIG. 28B there is shown a LC lens configuration in which a layer of LC 2802 is sandwiched between top and bottom substrates 2813, 2824. A flat bottom electrode 2808 (e.g., an ITO layer) is provided on the bottom substrate, coated by an orienting coating 2810 (e.g., rubbed polyimide) for aligning the LC molecules of the LC layer 2802 in a predetermined direction. The surface of the top substrate 2813 that is adjacent the LC layer is also coated with an orienting coating 2810 for aligning the LC molecules. In addition to the bottom electrode, the electrode system includes a top electrode structure 2811 that is formed of a non-uniform "flat aperture" polymer (or other) structure 2815 coated by a non-uniform flat-surface electrode 2817 (e.g., an ITO layer), where this top electrode structure is arranged on the top substrate 2813. The top electrode structure 2811 also includes a planar layer 2806 of frequency dependent material, where this material is arranged between the top substrate of the LC cell and the "flat aperture" polymer structure.

The choice of the "flat aperture" shape for the polymer structure means that the top electrode structure 2811, and thus the electrode system in its entirety, becomes optically "invisible," such that this layer no longer performs an optical function (lensing) and is solely responsible for the electrical function (generating a spatially non-uniform electric field in LC layer). As in the previously discussed lens configurations, the flat IMLVC layer and the choice of driving frequency provide for adjustment of this electrical function, such that tuning of the LC lens is frequency controllable. Another important advantage arising from the fact that all of the surfaces in the LC lens configuration of FIG. 28B are flat is that coating of the polymer structure with a uniform ITO layer can be done without difficulty.

Figure 28C:
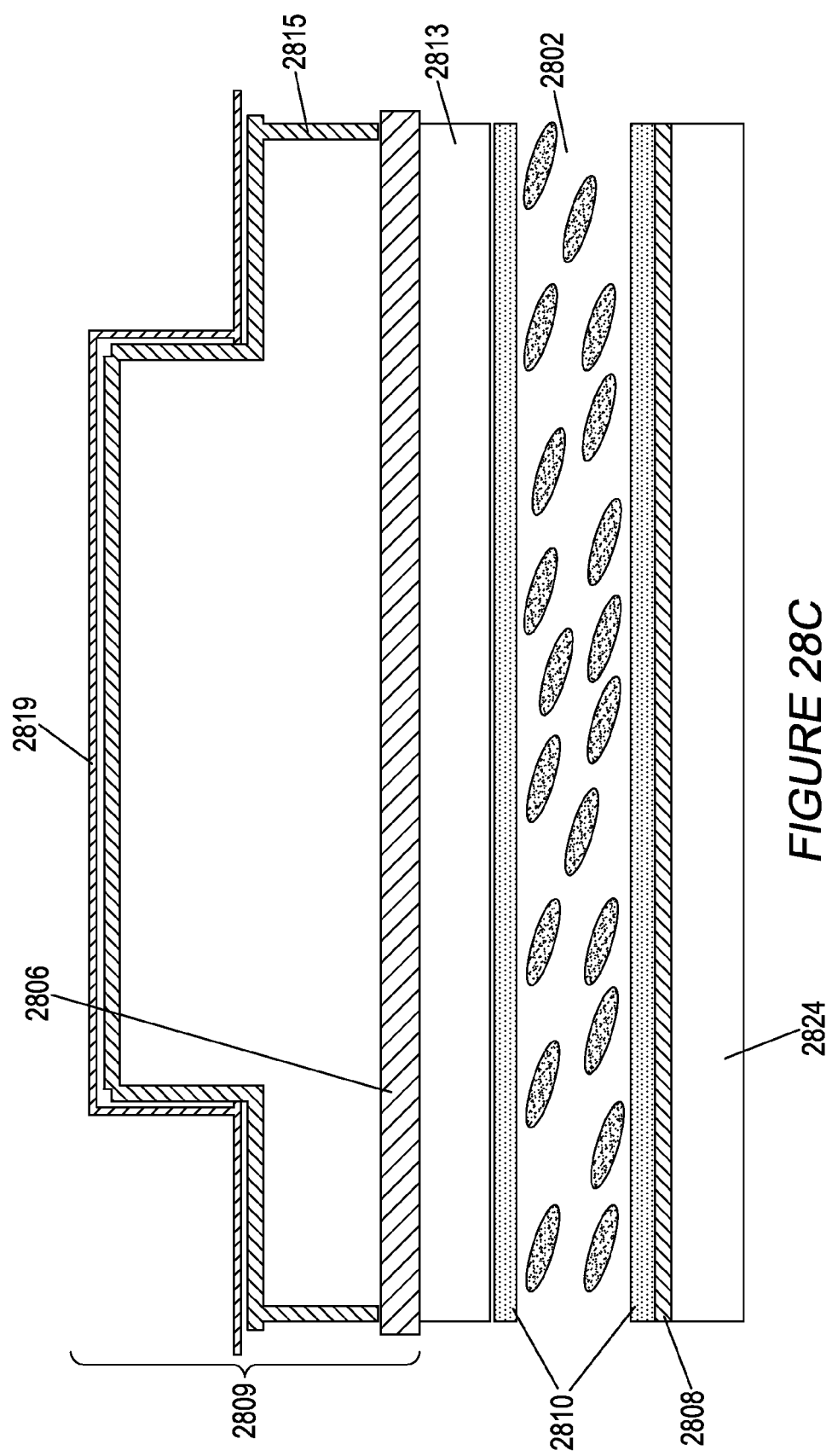
FIG. 28C is a schematic view of a structure similar to that of FIG. 28B, but for which the positions of the flat surfaces are reversed so as to provide an opposite tunability.

FIG. 28C schematically illustrates yet another variant configuration of the tunable LC lens according to the present invention. The configuration shown in FIG. 28C is similar to that of FIG. 28B, in that all of the surfaces of the combined variable electrode structure are flat. Accordingly, the lens configuration shown in FIG. 28C provides for the same de-coupling of the optical and electrical functions of the electrode system, as well as for the same operational advantages, as discussed above with regard to FIG. 28B. However, this structure differs from that of FIG. 28B in that the position of the surfaces are reversed such that the electrode 2819 is further from the LC layer in the center of the structure than it is near the outside of the lens. This creates a frequency tunable lens, like that of FIG. 28B, except that it has an opposite optical tunability. That is, the optical power versus frequency curve of the lens of FIG. 28C is opposite to that of FIG. 28B.

Figure 29A:
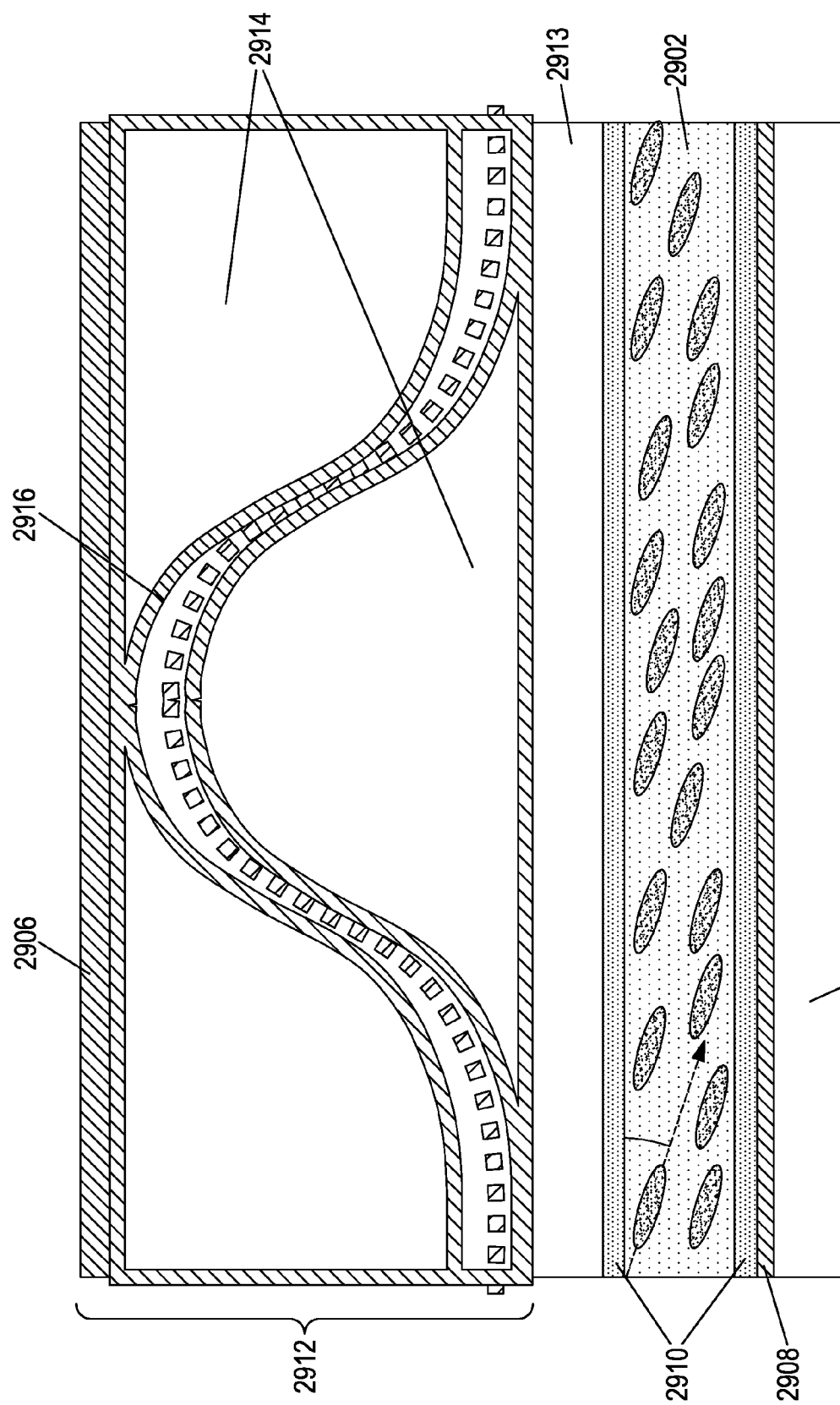
FIG. 29A is a schematic view of a structure having a top electrode with a curved layer of frequency dependent material encased in a top layer of polymer material.

FIG. 29A schematically illustrates still another variant configuration of the tunable LC lens according to the present invention. As shown, a layer of LC 2902 is sandwiched between top and bottom substrates 2913, 2924. A flat bottom electrode 2908 (e.g., an ITO layer) is provided on the bottom substrate 2924, and coated by an orienting coating 2910 (e.g. rubbed polyimide) for aligning the LC molecules of the LC layer in a predetermined direction. The surface of the top substrate 2913 that is adjacent the LC layer 2902 is also coated with an orienting coating 2910 for aligning the LC molecules. Specific to the present embodiment, the top electrode structure 2912 of the electrode system includes a curved layer 2916 of variable permittivity material (IMLVC) encased in a flat-top layer 2914 of polymer (or other) material, which is arranged on top of the top substrate. As discussed above, the charge mobility of the IMLVC material may be changed dynamically (e.g., by the change of driving frequency). The top electrode structure also includes a flat and optically transparent layer 2906 (e.g., an ITO layer), which is arranged on top of the flat-top layer of polymer material.

Accordingly, in the variant configuration shown in FIG. 29A, it is the curved layer 2916 of weakly conductive material that operationally replaces the top curved ITO layer of FIG. 27A. The form of the lens-like structure is not restricted since it is optically hidden and it has only one function: generating a non-uniform electric field. Furthermore, there are no curved surfaces to be coated by ITO. Optically transparent glue (with variable conductivity) is used to attach the replicated surfaces (with opposed but same/matching curvature) of the polymer structure with encased curved IMLVC. Also, the curvature of the electric field generated in the LC layer 2902 may be changed from a lens-like form at low driving frequency (when the IMLVC is in the high charge mobility state) up to obtaining a flat electric field distribution at higher driving frequency (when the charge mobility of the IMLVC is very small, in which case it becomes a thin layer of simple dielectric, where even index matching is unnecessary (unless it is desired to reduce Fresnel reflection losses), thus avoiding the generation of disclinations (abrupt spatial orientation changes). Finally, the transformation of the electric field profile by the dynamic reorientation of LC molecules (and corresponding aberrations) may be compensated by the dynamic change of the charge mobility of the hidden layer, which will reshape the profile of the electric field.

Figure 29B:
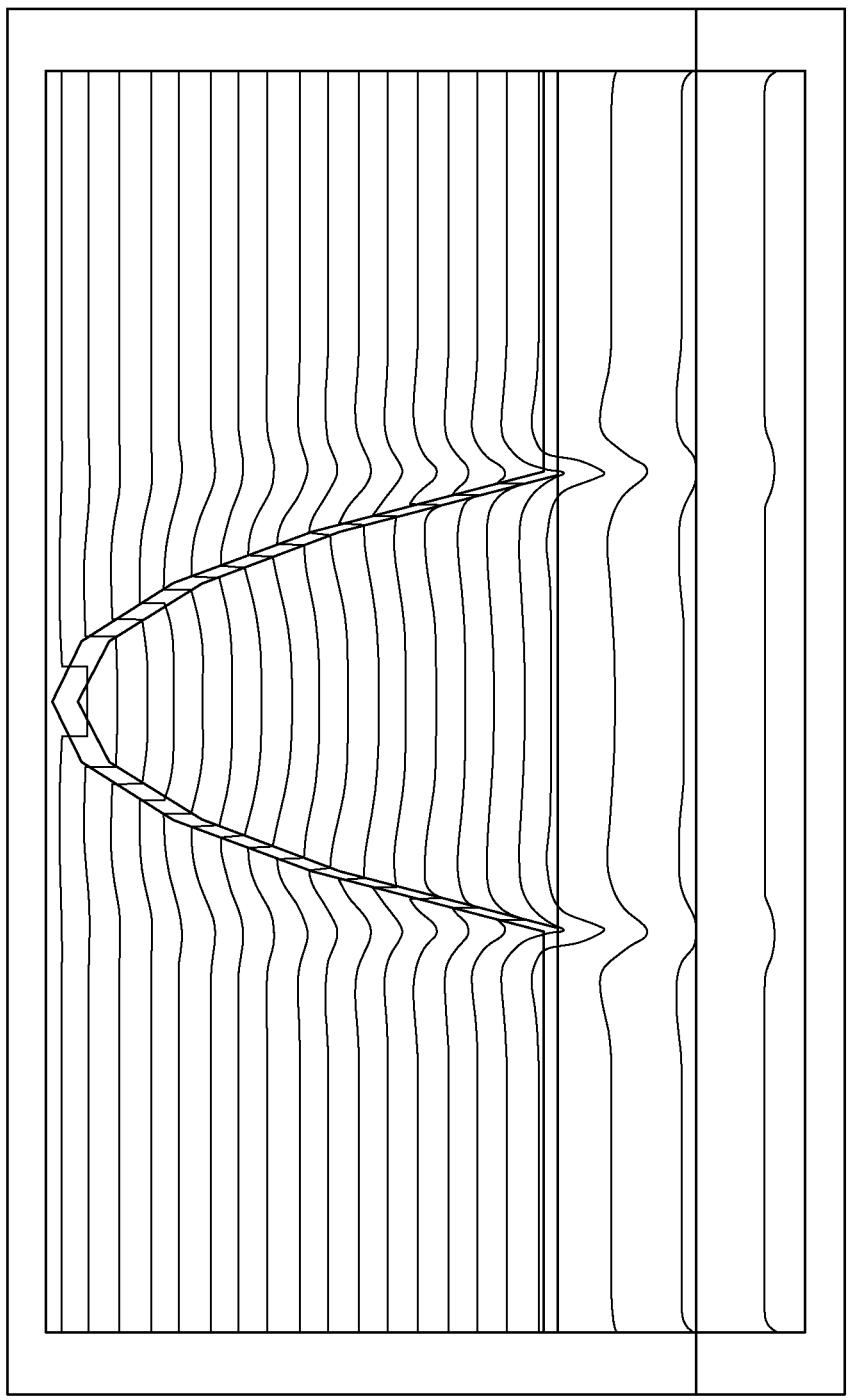
FIG. 29B is a graphical view showing the maximum angle of reorientation of LC molecules for the lens configuration of FIG. 29A when driven at a relatively high frequency.
Figure 29C:
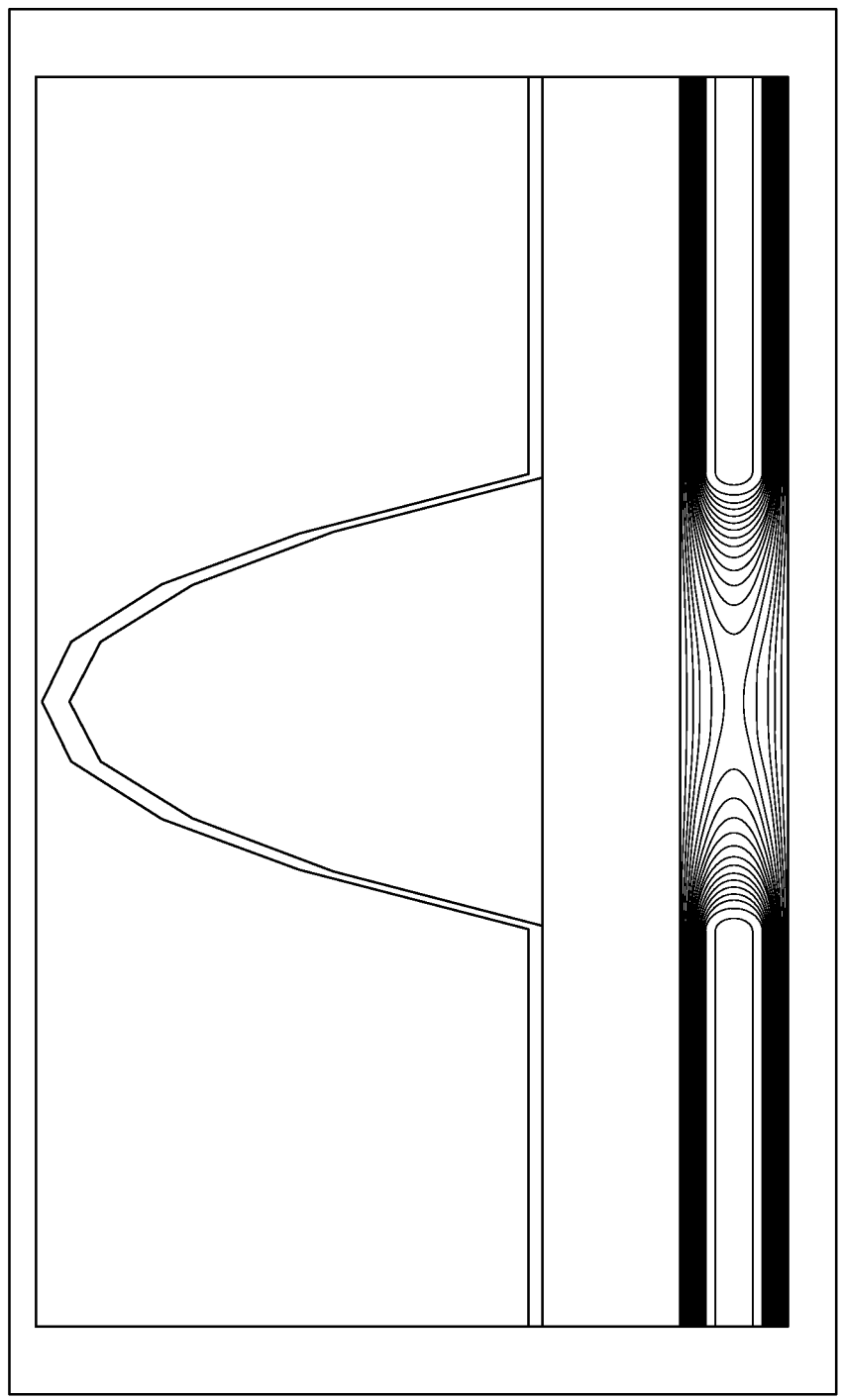
FIG. 29C is a graphical view showing the maximum angle of reorientation of LC molecules for the lens configuration of FIG. 29A when driven at a relatively low frequency.

FIGS. 29B and 29C show the maximum angle of reorientation of the LC molecules in the lens at high and low driving frequency, respectively, for the lens configuration shown in FIG. 29A. The output shown in FIG. 29B (no lensing effect) was produced using a driving voltage of 40V at 100 kHz, while the output shown in FIG. 29C was produced using a driving voltage of 40V at 100 Hz (with lensing effect).

Figure 30B:
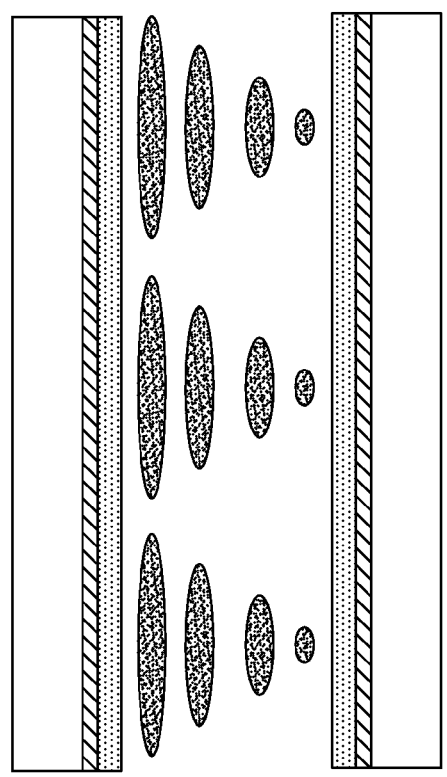
FIG. 30B is a schematic view of a "twist" type LC cell.
Figure 30A:
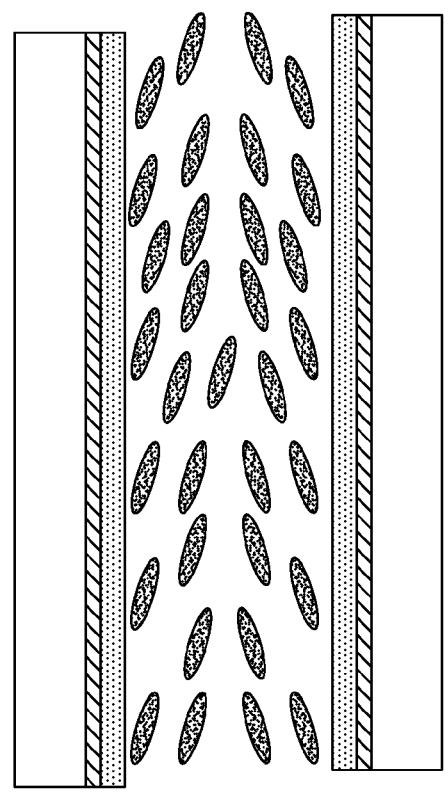
FIG. 30A is a schematic view of a "pi" type LC cell.

FIGS. 30A and 30B, respectively, illustrate two examples of different types of conventional LC cells that could be used in the LC lens configurations described above. In particular, FIG. 30A shows a "pi" type cell and FIG. 30B shows a "twist" type cell. Other types of LC alignment, including hybrid alignments may be considered too.

FIGS. 31A and 31B illustrate, respectively, two possible configurations combining the novel electrode structure of the present invention with LC cells in order to handle s and p polarizations of light. In the configuration of FIG. 31A, two liquid crystal cells ($LCC_x$ and $LCC_y$) are oriented in the cross directions to handle the perpendicular light polarizations, and a CVES is located to either side of the LCC layers. In this example, each of the CVES layers is used to control a different one of the LCC layers. The alternative configuration of FIG. 31B is similar, but uses only one electrode structure to control two cross oriented LCCs. In this case, the bottom flat electrode of the top LCCx is oriented such as to allow the creation of the control electric field by the top electrode structure and the bottom flat electrode of the LCCy. It is also possible to use a configuration as shown in FIG. 31C, for which the CVES layer is adapted and located in the middle of the final device (between two cross oriented LC cells).

Any of the frequency dependent materials discussed herein may be used in the different LC lens configurations above. Such materials have a complex dielectric permittivity that may be varied (including the weakly conductive properties) by the change of driving frequency. The specific characteristics of the material may be selected according to the particular lens structure in question. It should be noted that various material compositions, various LC layers, various electrodes, various geometrical forms, etc. may be used to fabricate the above-described LC lens, without departing from the scope of the claimed invention. It should also be appreciated by the reader that various optical devices can be developed using the LC lens described herein. In addition, all of the "curved" surface geometries discussed herein (e.g., FIGS. 27, 28A) may be covered, or "filled," with optional passive materials with the same optical properties as the top surface to eliminate their purely optical role, as shown in FIG. 29A.

Those skilled in the art will also recognize that certain devices may make use of materials that have low, or no, frequency dependence, but that may still be "sensitive" to the frequency of the excitation signal. This is the case where the combination of different elements provides electric field attenuation (in the transverse plane) depending upon the frequency, such as in distributed RCL electronic circuits.

Doped LC Layer

Figure 32A:
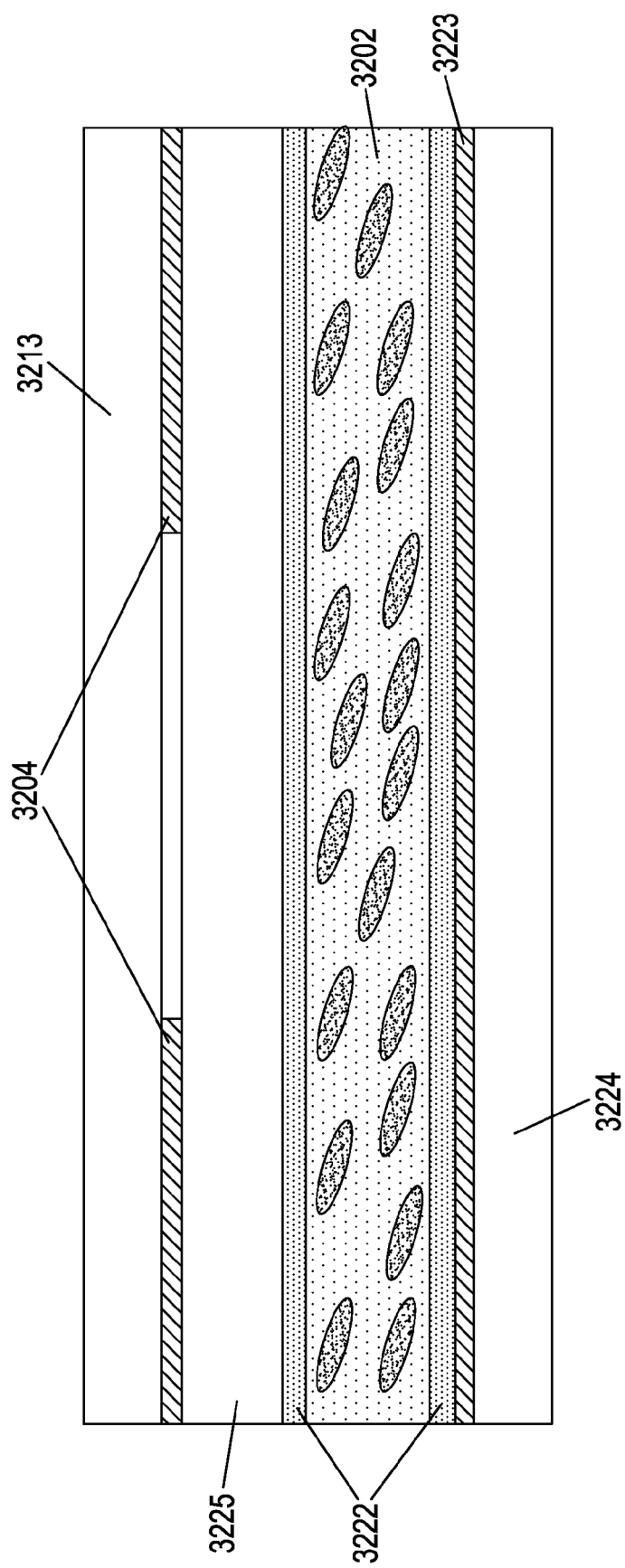
FIG. 32A is a schematic view of a structure for which a LC layer is used that itself has frequency dependent properties.
Figure 32B:
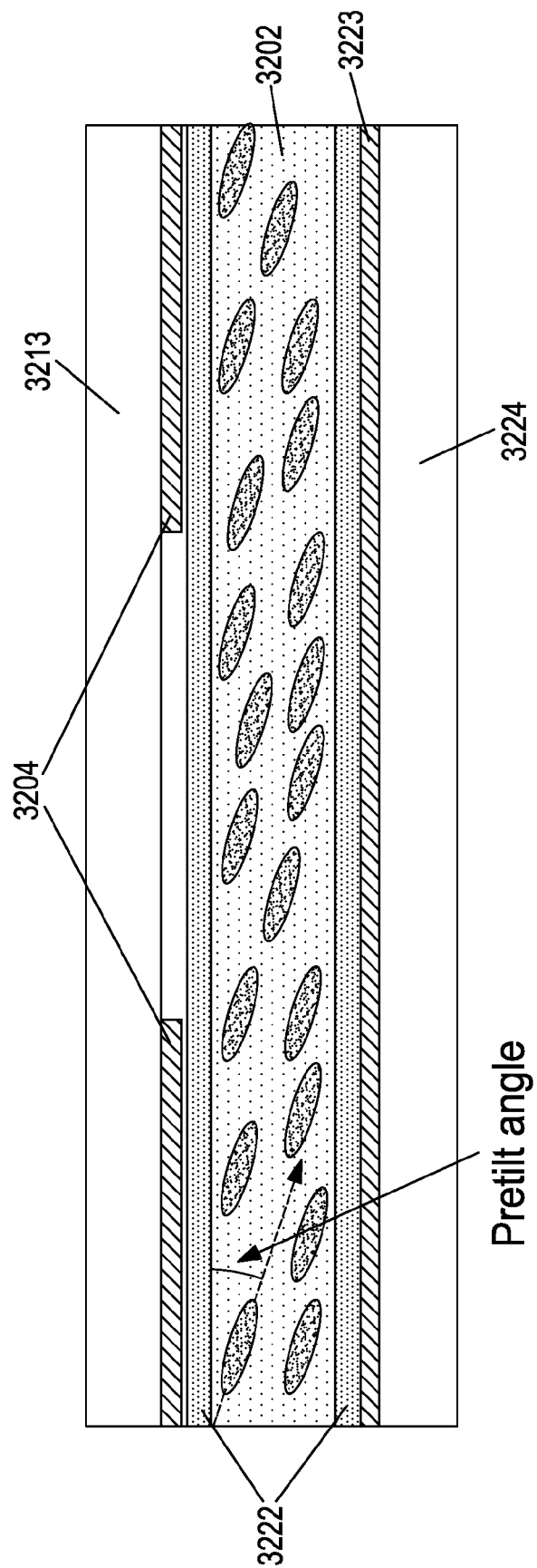
FIG. 32B is a schematic view of a structure similar to that of FIG. 32A, but for which a mid layer is not used.
Figure 33:
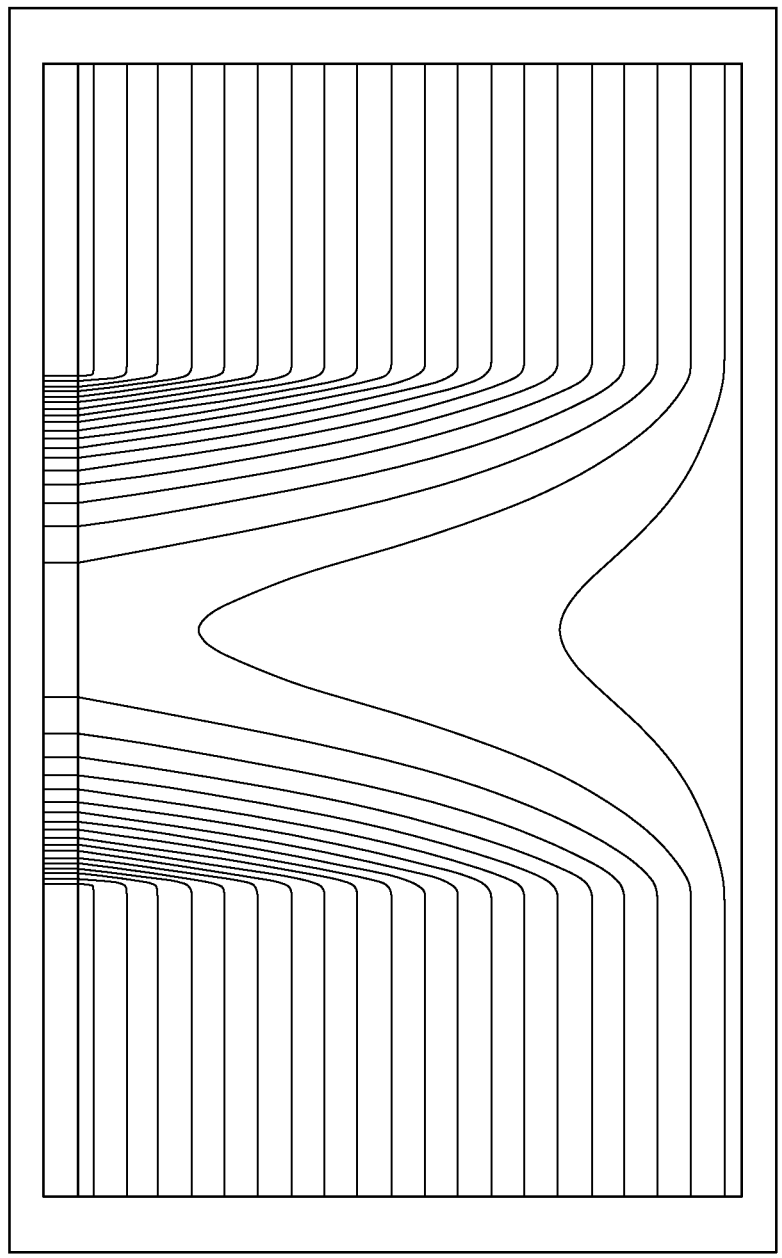
FIG. 33 is a graphical view showing equipotential planes for the configuration of FIG. 32A when using a frequency dependent layer that is weakly conductive.

Shown in FIG. 32A is another alternative embodiment of the present invention. In this embodiment, a frequency dependent material separate from the LC layer is absent and, instead, a LC material 3202 is used that itself has the desired frequency dependent properties. Although the frequency dependent material is part of the liquid crystal itself, the desired shaping of the electric field within the LC layer is achieved. A hole patterned conductive ring 3204 serves as the top electrode while a planar bottom electrode 3223 is located to the other side of the LC layer 3202. Oriented coatings 3222 may be of rubbed polyimide and the structure has top and bottom substrates 3213 and 3224, respectively. In this example, the structure uses an optional mid layer 3225 which has the effect of additionally shaping the electric field created by electrodes 3204 and 3223. Another embodiment, shown in FIG. 32B, is essentially the same, but has no such mid layer. In this embodiment, the electric field (created with the hole patterned electrode) is softened by the charge mobility of the LC layer, thus allowing the creation of a field that would generate a lens-like refractive distribution in spite of the close position of the hole patterned electrode to the LC layer. As illustrated in the results of FIG. 33, the shaping of the electric field from a patterned electrode is significant when a liquid crystal having charge mobility is used. The simulation of equipotential lines presumes using a relatively standard ITO electrode layer (<100 k$\Omega$/sq) in the area between the hole patterned electrode in combination with a weakly conductive liquid crystal having conductivities on the order of $10^{-3}$ S/m.

The annular electrode of FIGS. 32A and 32B may be opaque, such as aluminum with the central aperture or hole in the top electrode defining the optical aperture of the lens. Typically, the LC materials are purified after their synthesis to reduce their conductivity. If the natural conductivity of the liquid crystals, for example due to some ionic impurities, is not sufficient, then they can also be doped. For example, metal or metal oxide nano particles, carbon nanotubes, and ions such as lithium can be added to increase conductivity of the liquid crystal without harming the liquid crystal properties. There are also LC materials which have metal complexes in their basic molecular structure or assemblies that have sufficient weak conductivity. Such weak conductivity, while not desirable if too great, does not impair operation of the liquid crystal between planar electrodes. When the electric field is from patterned electrodes, the charge mobility of the liquid crystal changes operation significantly by shaping the electric field.

Figure 34:
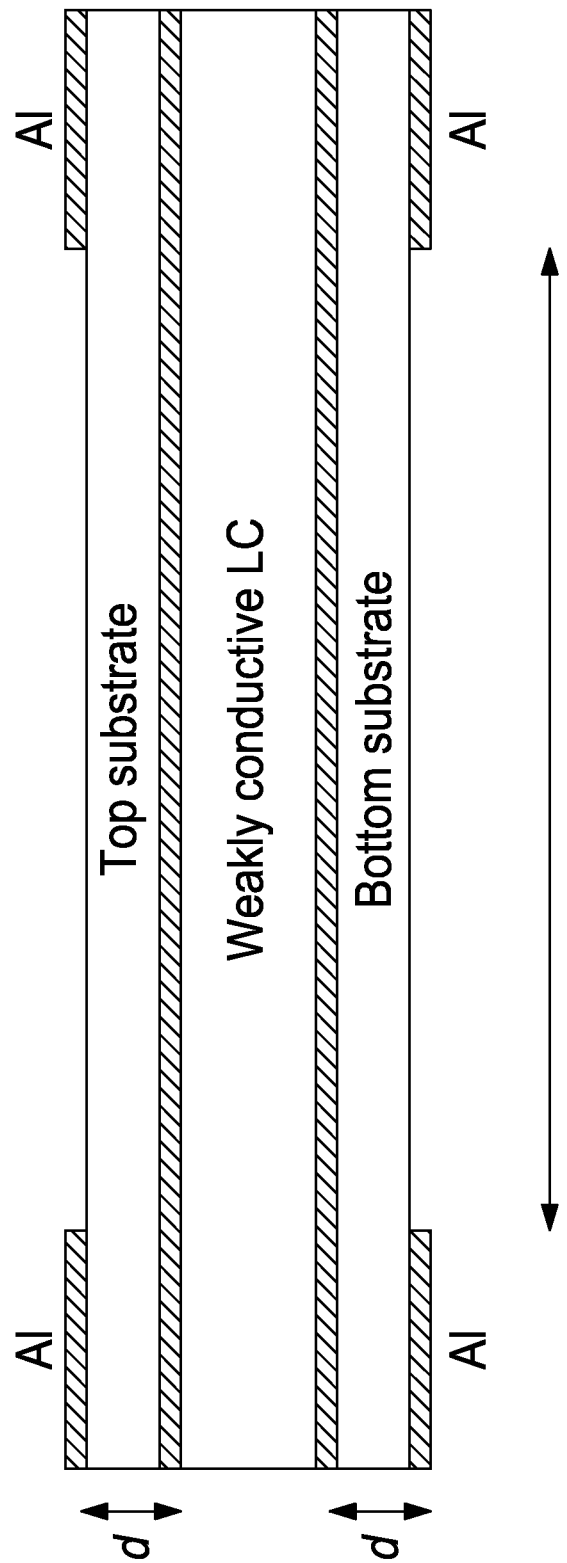
FIG. 34 is a schematic view of a general representation of the use of a liquid crystal having a weakly conductive frequency dependent characteristic.

It will be appreciated that the parameters of the LC are to be chosen in a way to avoid non-desired effects, such as electrohydrodynamic instabilities of the liquid crystal materials. FIG. 34 is another possible way of using a liquid crystal with limited conductivity for the tunable lens application. At least several different situations may be distinguished (for simplicity, the presence of internal layers is omitted). With regard to the figure, the top and bottom substrates may be referred to, respectively, as "zone 1" and "zone 2". In one variation, one of zones 1&2 is a non conductive material. Then for a LC having a 2 mm diameter and a 40 micrometer thickness, the electric field profile would be too sharp for a lens application (given any reasonable LC conductivities). In another possibility, zones 1&2 are both conductive materials. Then the electric field profile would be too flat for a lens application (given any reasonable LC conductivities). In one variation, zones 1&2 are electrically highly resistive materials, e.g., with 100 k$\Omega$/sq sheet resistance (or materials having a high complex polarisability, but not being good conductors . . . ). In this case, the electric field profile could be appropriate for a lens application (given any reasonable LC conductivities or even pure/non conductive LCs). Finally, one of zones 1 & 2 could be an electrically highly resistive material, while the other is non conductive. In that case, the electric field profile could be appropriate for a lens application (given any reasonable LC conductivities or even pure/non conductive LCs). The proposed combination of hole patterned electrodes with highly resistive zones would eventually reduce the level of conductivity of liquid crystal required.

It will be appreciated that weakly conductive liquid crystal materials can be combined with a layer of complex dielectric material to work together to shape the desired electric field, whether using frequency as a control mechanism to change the shape of the electric field or whether frequency is constant and voltage is used to control the electric field and optical state of the device.

While the invention has been shown and described with referenced to preferred embodiments thereof, it will be recognized by those skilled in the art that various changes in form and detail may be made therein without departing from the spirit and scope of the invention as defined by the appended claims.

What is claimed is:

1. A method of controlling a variable optical device for controlling the propagation of light passing through the device, said optical device comprising:
- a liquid crystal layer having a ground state alignment through which said light passes;
- an electrode system comprising a hole patterned electrode arranged on a first substrate of the liquid crystal layer and an opposed electrode arranged on an opposed substrate of the liquid crystal layer to generate a spatially modulated electric field acting on said liquid crystal layer, said first substrate having a layer of weakly conductive material arranged thereon and said hole patterned electrode is additionally patterned to permit measuring sheet resistance of the weakly conductive layer; and
- an electrical signal generator for generating a drive signal at a plurality of different frequencies and applying the drive signal to the electrode system;

the method comprising:
- measuring a sheet resistance of the weakly conductive layer using said hole patterned electrode; and
- adapting the drive signal in accordance with the sheet resistance measured.

2. The method as defined in claim 1, wherein the electrode system is configured to provide a heater and temperature sensor, the method comprising using said heater and said temperature sensor to keep the temperature of the device at a desired level.

3. The method as defined in claim 1, including using a heater and a temperature sensor to keep the temperature of the device at a desired level.

\* \* \* \* \*